(12) United States Patent
Kocienda et al.

(10) Patent No.: US 12,411,542 B2
(45) Date of Patent: Sep. 9, 2025

(54) ELECTRONIC DEVICES USING OBJECT RECOGNITION AND/OR VOICE RECOGNITION TO PROVIDE PERSONAL AND HEALTH ASSISTANCE TO USERS

(71) Applicant: Hewlett-Packard Development Company, L.P., Spring, TX (US)

(72) Inventors: Kenneth Luke Kocienda, Mill Valley, CA (US); Yanir Nulman, San Francisco, CA (US); Lilynaz Hashemi, San Francisco, CA (US); Imran A Chaudhri, San Francisco, CA (US); Jane Koo, San Francisco, CA (US); Adam Binsz, San Francisco, CA (US); Eugene Bistolas, Mountain View, CA (US); George Kedenburg, San Francisco, CA (US); Jenna Arnost, Kamas, UT (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/607,296

(22) Filed: Mar. 15, 2024

(65) Prior Publication Data
US 2024/0310900 A1    Sep. 19, 2024

Related U.S. Application Data

(60) Provisional application No. 63/496,677, filed on Apr. 17, 2023, provisional application No. 63/454,937, (Continued)

(51) Int. Cl.
*G06F 3/01*    (2006.01)
*G06F 3/16*    (2006.01)
(Continued)

(52) U.S. Cl.
CPC .............. *G06F 3/011* (2013.01); *G06F 3/167* (2013.01); *G06V 10/82* (2022.01); *G06V 20/50* (2022.01);
(Continued)

(58) Field of Classification Search
CPC .......... G06F 3/011; G06F 3/012; G06F 3/013; G06F 3/167; G06F 3/01; G06F 3/16;
(Continued)

(56) References Cited

U.S. PATENT DOCUMENTS

| 11,128,636 | B1 | 9/2021 | Jorasch et al. |
| 2013/0016070 | A1* | 1/2013 | Starner .................. G06F 3/011 345/175 |

(Continued)

OTHER PUBLICATIONS

Kanel, "Sixth Sense Technology," Thesis for the Bachelor Degree of Engineering in Information and Technology, Centria University of Applied Sciences, May 2014, 46 pages.

(Continued)

*Primary Examiner* — Deeprose Subedi
(74) *Attorney, Agent, or Firm* — Fish & Richardson P.C.

(57) ABSTRACT

In an example method, a wearable multimedia device is worn by a user. Further, the device receives one or more communications during a first period of time; receives information regarding one or more events during the first period of time; receives a first spoken command from the user during a second period of time, where the second period of item is subsequent to the first period of time, and where the first spoken command includes a request to summarize the one or more communications and the one or more events; generates, using one or more of machine learning models, a summary of the one or more communications and the one or more events; and presents at least a portion of the summary to the user.

26 Claims, 38 Drawing Sheets

Related U.S. Application Data filed on Mar. 27, 2023, provisional application No. 63/453,333, filed on Mar. 20, 2023, provisional application No. 63/453,045, filed on Mar. 17, 2023.

(51) Int. Cl.
| | |
|---|---|
| *G06V 10/82* | (2022.01) |
| *G06V 20/50* | (2022.01) |
| *G06V 20/68* | (2022.01) |
| *G09G 3/00* | (2006.01) |

(52) U.S. Cl.
CPC ............. *G06V 20/68* (2022.01); *G09G 3/001* (2013.01); *G09G 2354/00* (2013.01)

(58) Field of Classification Search
CPC ........ G06V 20/68; G06V 10/82; G06V 20/50; G09G 3/001; G09G 2354/00
See application file for complete search history.

(56) References Cited

U.S. PATENT DOCUMENTS

| | | | |
|---|---|---|---|
| 2013/0336519 A1 | 12/2013 | Connor | |
| 2016/0027329 A1* | 1/2016 | Jerauld | G02B 27/017 |
| | | | 434/127 |
| 2016/0360970 A1 | 12/2016 | Tzvieli et al. | |
| 2018/0136465 A1* | 5/2018 | Chi | G06F 3/0416 |
| 2019/0037173 A1 | 1/2019 | Lee et al. | |
| 2019/0179487 A1 | 6/2019 | Kong et al. | |
| 2021/0373676 A1 | 12/2021 | Jorasch et al. | |
| 2022/0415476 A1* | 12/2022 | Connor | G06V 20/20 |
| 2024/0070993 A1* | 2/2024 | Tiku | G06V 20/10 |

OTHER PUBLICATIONS

Mann et al., "Telepointer: Hands-Free Completely Self Contained Wearable Visual Augmented Reality without Headwear and without any Infrastructural Reliance," IEEE Fourth International Symposium on Wearable Computers, Atlanta, GA, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

Vaswani et al., "Attention is All You Need," CoRR, submitted on Jun. 2017, arXiv:1706.03762, 15 pages.

International Search Report and Written Opinion in International Appln. No. PCT/US24/20280, mailed on Aug. 7, 2024, 14 pages.

\* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

ELECTRONIC DEVICES USING OBJECT RECOGNITION AND/OR VOICE RECOGNITION TO PROVIDE PERSONAL AND HEALTH ASSISTANCE TO USERS

CROSS-REFERENCE TO RELATED APPLICATIONS

This application claims priority to U.S. Provisional Patent Application No. 63/453,045, filed Mar. 17, 2023, U.S. Provisional Patent Application No. 63/453,333, filed Mar. 20, 2023, U.S. Provisional Patent Application No. 63/496,677, filed Apr. 17, 2023 and U.S. Provisional Patent Application No. 63/454,937, filed Mar. 27, 2023, the entire contents of each of which are incorporated herein by reference.

TECHNICAL FIELD

This disclosure relates generally to electronic devices, such as wearable multimedia devices.

BACKGROUND

High-precision laser scanners (e.g., MEMS scanners) have been developed that can turn any surface into a virtual interface. For example, a laser projected virtual interface (VI) can be projected onto the palm of a user's hand or other surface. Three-dimensional (3D) depth sensors (e.g., a time of flight (TOF) camera) can be used to detect user gestures that are interacting with one or more VI elements projected on the surface.

SUMMARY

Systems, methods, devices and non-transitory, computer-readable storage media are disclosed for assisting users using an electronic device and computerized object recognition.

In at least some embodiments, a method includes one or more of the actions or operations described herein.

In at least some embodiments, an electronic device includes at least one processor, and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

In an aspect, a method includes: accessing, by a wearable multimedia device worn by a user, image data regarding an environment of the user, where the image data is generated using one or more image sensors of the wearable multimedia device; determining, by the wearable multiple device based on the image data, an item of interest in the environment of the user; receiving, by the wearable multimedia device, a first user input from the user, where the first user input includes a first command with respect to the item of interest, and where the first user input is received using one or more microphones of the wearable multimedia device; performing, by the wearable multiple device using one or more of machine learning models, the first command with respect to the item of interest, where performing the first command comprises generating first output data using the one or more machine learning models; and presenting, by the wearable multimedia device, at least a portion of the first output data to the user.

Implementations of this aspect can include one or more of the following features.

In some implementations, the first command can include a request for information regarding the item of interest. Further, the first output data include an identity of the item of interest and/or at least one of a make or a model of the item of interest.

In some implementations, the item of interest can include an article of clothing, and the first command can include a request for information regarding the article of clothing. Further, the first output data can include at least one of a size or a fit of the article of clothing, at least one of a color of a style of the article of clothing, and/or an indication of a least one additional article of clothing to complement the article of clothing.

In some implementations, the item of interest can include a food item, and the first command can include a request for information regarding the food item. Further, the first output data can include a nutritional value of the food item, one or more ingredients of the food item, one or more allergens of the food item, one or more serving sizes of the food item, at least one of a place of origin or a place of production of the food item, a recipe having the food item as an ingredient, and/or an indication of a least one additional food item to complement the food item.

In some implementations, the process 3700 can include determining, based on the image data, that the user consumed the food item, and storing, in a database, an indication that the user consumed the food item and the nutritional value of the food item. The database can represent a plurality of food items consumed by the user over a period of time.

In some implementations, the process 3700 can include determining, based on the image data, a portion size of the food item, and determining the nutritional value of the food item based on the portion size.

In some implementations, the first command can include a request for information regarding a purchase of the item of interest. Further, the first output data can include an indication of one or more retailers offering the item of interest for purchase.

In some implementations, the first output data can include, for each of the one or more retailers, a distance of the retailer from the user, a purchase price associated with the item of interest at that retailer, an availability of the item of interest at the retailer, and/or a shipping item associated with the item of interest by the retailer.

In some implementations, the process 3700 can include receiving a second user input include a second command with respect to the item of interest, where the second user input includes an indication to purchase the item of interest, and initiating a purchase of the item of interest.

In some implementations, initiating the purchase of the item of interest can include determining a payment method associated with the user, selecting a retailer from among the one or more retailers, and initiating the purchase of the item at the selected retailer using the payment method.

In some implementations, the one or more machine learning models can include one or more computerized neural networks.

In some implementations, the image sensors can include one or more cameras and/or one or more depth sensors.

In some implementations, presenting at least the portion of the first output data to the user can include projecting, using a laser projector of the wearable multimedia device, a user interface on a surface of the user. The user interface can include at least the portion of the first output data.

In some implementations, the surface can be a surface of a hand of a user.

In some implementations, the surface can be a surface of a palm of a user.

In some implementations, presenting at least the portion of the first output data to the user can include projecting, using a laser projector of the wearable multimedia device, at least a portion of the first output data on a surface of the item of interest.

In some implementations, presenting at least the portion of the first output data to the user can include projecting, using a laser projector of the wearable multimedia device, at least a portion of the first output data on a surface in a proximity of the item of interest.

In some implementations, presenting at least the portion of the first output data to the user can include generating, using one or more audio speakers of the wearable multimedia device, audio output comprising at least the portion of the first output data.

In some implementations, the process 3700 can include (i) receiving a second user input from the user, where the second user input includes a second command with respect to the environment, and where the second user input is received using the one or more microphones of the wearable multimedia device, (ii) performing using the one or more of machine learning models, the second command with respect to the environment, where performing the second command includes generating second output data using the one or more machine learning models, and (iii) presenting at least a portion of the second output data to the user.

In some implementations, the second command can include a request for a description of the environment. The second output data can include the description of the environment.

In some implementations, the second command can include a request for contents of a sign in the environment. The second output data can include the contents of the sign.

In some implementations, the second command can include a request for information regarding a business in the environment. The second output data can include the information regarding the business.

In some implementations, the information regarding the business can include operating hours of the business.

In another aspect, a method includes: receiving, by a wearable multimedia device worn by a user, one or more communications during a first period of time; receiving, by the wearable multimedia device, information regarding one or more events during the first period of time; receiving, by the wearable multimedia device, a first spoken command from the user during a second period of time, where the second period of item is subsequent to the first period of time, and where the first spoken command includes a request to summarize the one or more communications and the one or more events; generating, by the wearable multimedia device using one or more of machine learning models, a summary of the one or more communications and the one or more events; and presenting, by the wearable multimedia device, at least a portion of the summary to the user.

Implementations of this aspect can include one or more of the following features.

In some implementations, the first period of time can be determined by determining, based on calendar data from a calendar application of the wearable multimedia device, that the user is busy during the first period of time.

In some implementations, presenting at least the portion of the summary to the user can include projecting, using a laser projector of the wearable multimedia device, a user interface on a surface of the user. The user interface can include at least the portion of the summary.

In some implementations, the surface can be a surface of a hand of a user.

In some implementations, the surface can be a surface of a palm of a user.

In some implementations, presenting at least the portion of the summary to the user can include generating, using one or more audio speakers of the wearable multimedia device, audio output including at least the portion of the summary.

In some implementations, the one or more communications can include an email message, a text message, a chat message, a social media post, a voicemail, and/or a telephone call.

In some implementations, the information regarding the one or more events can include an invitation of at least one event of the one or more events, a modification to at least one event of the one or more events, and/or a cancelation of at least one event of the one or more events.

In some implementations, the process 3740 can include refraining from presenting the or more communications and the information regarding one or more events to the user during the first period of time.

In some implementations, at least some of the information regarding the one or more events can be retrieved from a calendar application of the wearable multimedia device.

In some implementations, generating the summary of the one or more communications and the one or more events can include estimating, using the one or more machine learning models, an importance of each of the one or more communications and the one or more events to the user.

In some implementations, the process 3740 can include filtering items in the summary based on the estimated importance of each of the one or more communications and the one or more events to the user.

In some implementations, the process 3740 can include determining a priority of items in the summary based on the estimated importance of each of the one or more communications and the one or more events to the user.

In some implementations, the importance can be estimated based on contextual information regarding the one or more communications and the one or more events.

In some implementations, the contextual information can include a sender of each of the one or more communications, contents of each of the one or more communications, and/or a message type associated with each of the one or more communications.

In some implementations, the contextual information can include a time associated with each of the one or more events, a location associated with each of the one or more events, one or more first activities previous performed by the user, and/or one or more second activities scheduled to be performed by the user.

In some implementations, the importance can be estimated based on preference data received from the user.

In some implementations, the importance can be estimated based on user feedback received from the user regarding a previous summary presented to the user prior to the first period of time.

In another aspect, method includes: capturing, by a wearable multimedia device, sensor data; detecting, by the wearable multimedia device, an object in the sensor data; detecting, by the wearable multimedia device, a gesture by the user that is indicative of the user consuming the object; identifying, by the wearable multimedia device, the object based on the sensor data; determining, by the wearable multimedia device, at least one of a size or a volume of the identified object based on the sensor data; gathering, by the wearable multimedia device, nutritional information associated with the identified object; determining, by the wearable multimedia device, one or more health metrics based on at least one of the size or volume of the identified object and the nutritional information associated with the identified object; and storing, by the wearable multimedia device, the health metrics for display to the user or for use by other applications or services.

Implementations of this aspect can include one or more of the following features.

In some implementations, the sensor data can be captured using one or more cameras, and/or one or more depth sensors.

In some implementations, the gesture by the user that is indicative of the user consuming the object can include a grasping of the object by a hand of the user and a movement of the object towards as mouth of the user.

In some implementations, the gesture by the user that is indicative of the user consuming the object can include a grasping of the object by a hand of the user and a spoken command by a user.

In some implementations, the object can be a food item.

In some implementations, the nutritional information can be determined based on at least one of the size or the volume of the object.

In some implementations, the nutritional information of the object can include a number of calories in the food item, an amount of protein in the food item, an amount of fat in the food item, an amount of carbohydrates in the food item, an amount of vitamins in the food item, and/or an amount of minerals in the food item.

In some implementations, the nutritional information of the object can include one or more ingredients of the food item, one or more allergens of the food item, one or more serving sizes of the food item, and/or at least one of a place of origin or a place of production of the food item.

In some implementations, the health metrics can include historical nutrition information associated with one or more objects that the user has consumed during a period of time.

In some implementations, the health metrics can include a minimal goal associated with the historical nutrition information and/or a maximum goal associated with the historical nutrition information.

In some implementations, at least one of the minimal goal or the maximum goal can be determined based on input from the user.

In some implementations, the process 3740 can include presenting at least a portion of the nutrition information or the health metrics to the user.

In some implementations, presenting at least the portion of the nutrition information or the health metrics to the user can include projecting, using a laser projector of the wearable multimedia device, a user interface on a surface of the user. The user interface can include at least the portion of the nutrition information or the health metrics.

In some implementations, the surface can be a surface of a hand of a user.

In some implementations, the surface can be a surface of a palm of a user.

In some implementations, presenting at least the portion of the nutrition information or the health metrics to the user can include projecting, using a laser projector of the wearable multimedia device, at least a portion of the nutrition information or on a surface of the item of interest.

In some implementations, presenting at least the portion of the nutrition information or the health metrics to the user can include projecting, using a laser projector of the wearable multimedia device, at least a portion of the nutrition information on a surface in a proximity of the item of interest.

In some implementations, presenting at least the portion of the nutrition information or the health metrics to the user can include generating, using one or more audio speakers of the wearable multimedia device, audio output comprising at least the portion of the nutrition information or the health metrics.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

FIGS. 34-36 illustrate additional "health center" user interfaces that can be presented on, for example, a website that allows the user to adjust their health/nutritional/consumption goals.

The same reference symbol used in various drawings indicates like elements.

DETAILED DESCRIPTION

Example Wearable Multimedia Device

Figure 1:
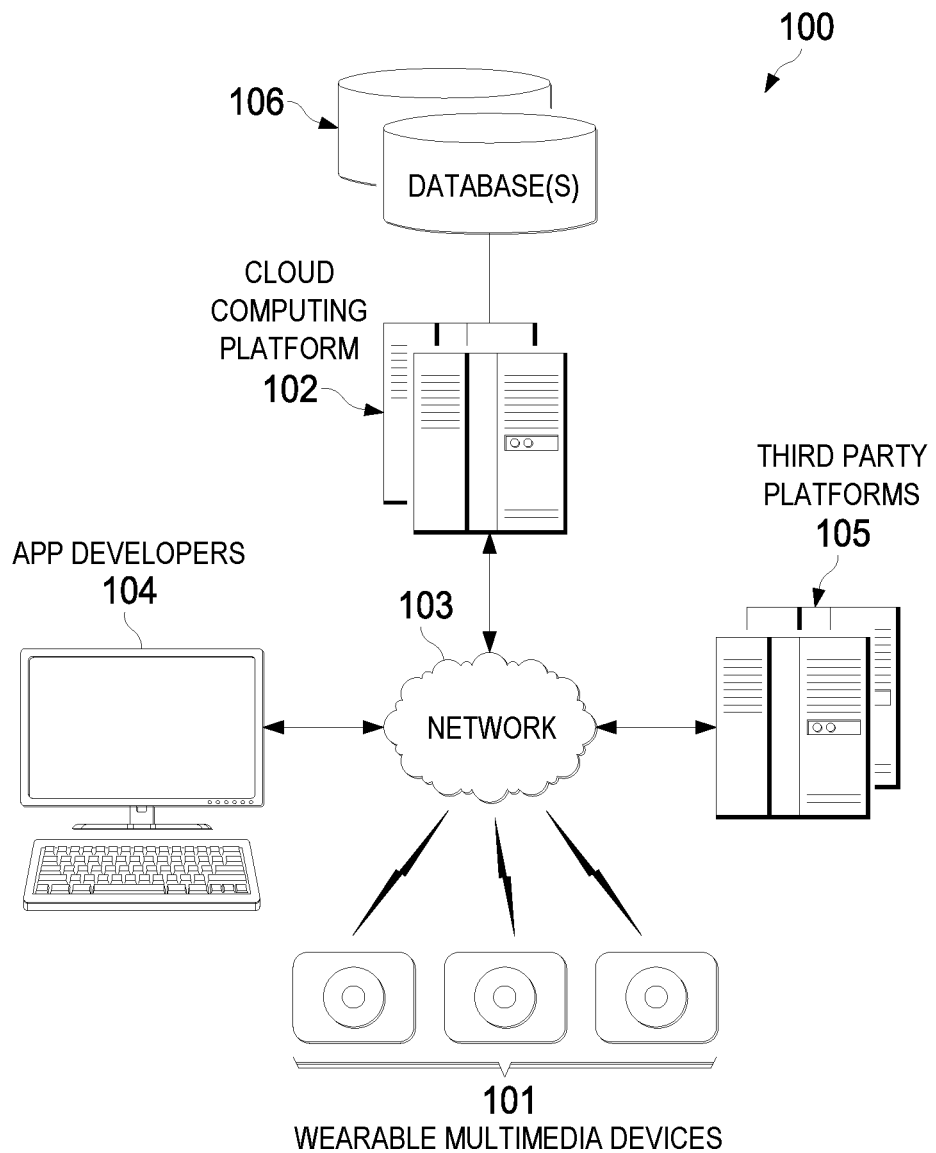
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCOS, DLP, LCD), or can be wired or wirelessly coupled to an external projector, that allows the user to replay a moment on a surface such as a wall or tabletop or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of everyday transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third-party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document everyday transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server-side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
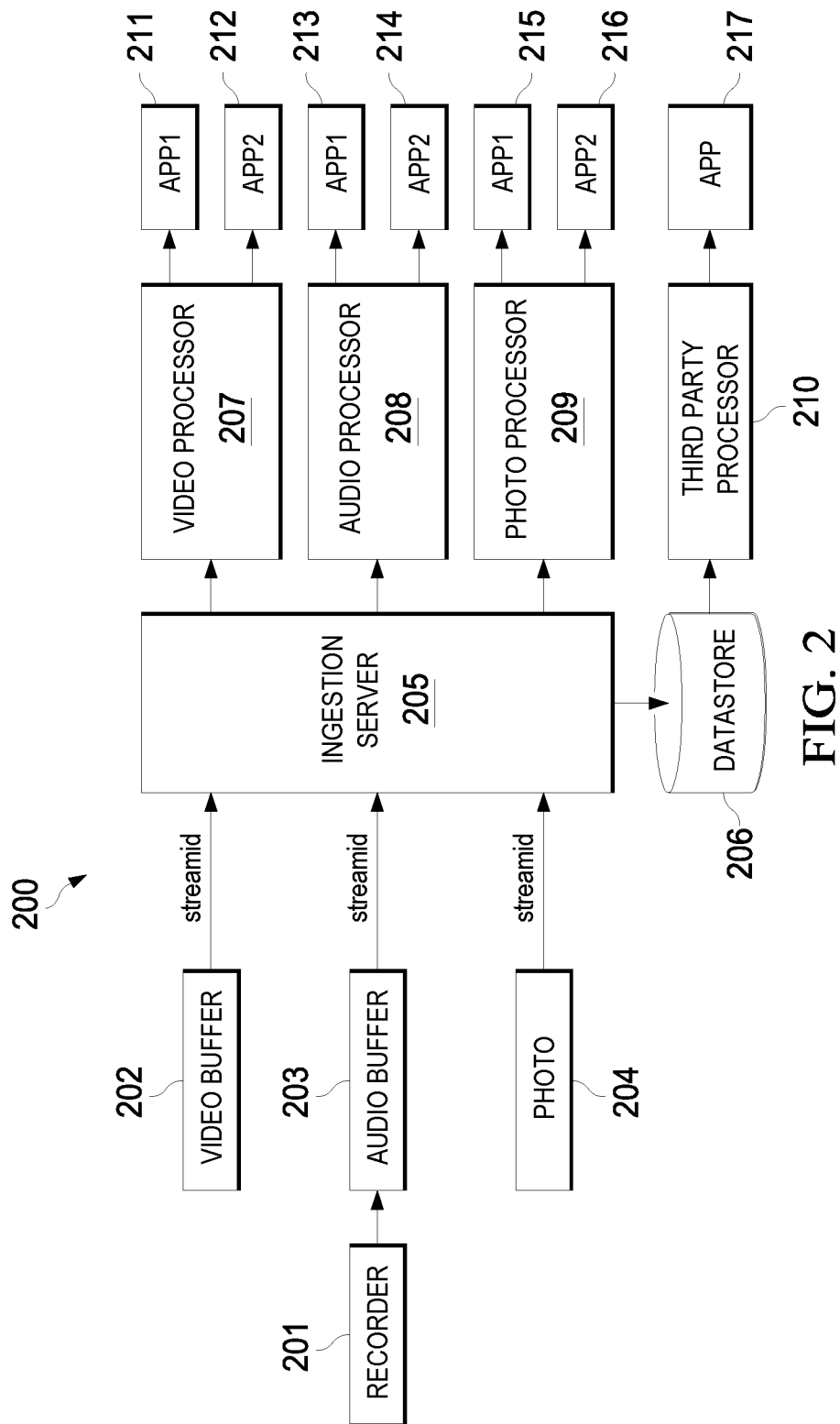
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
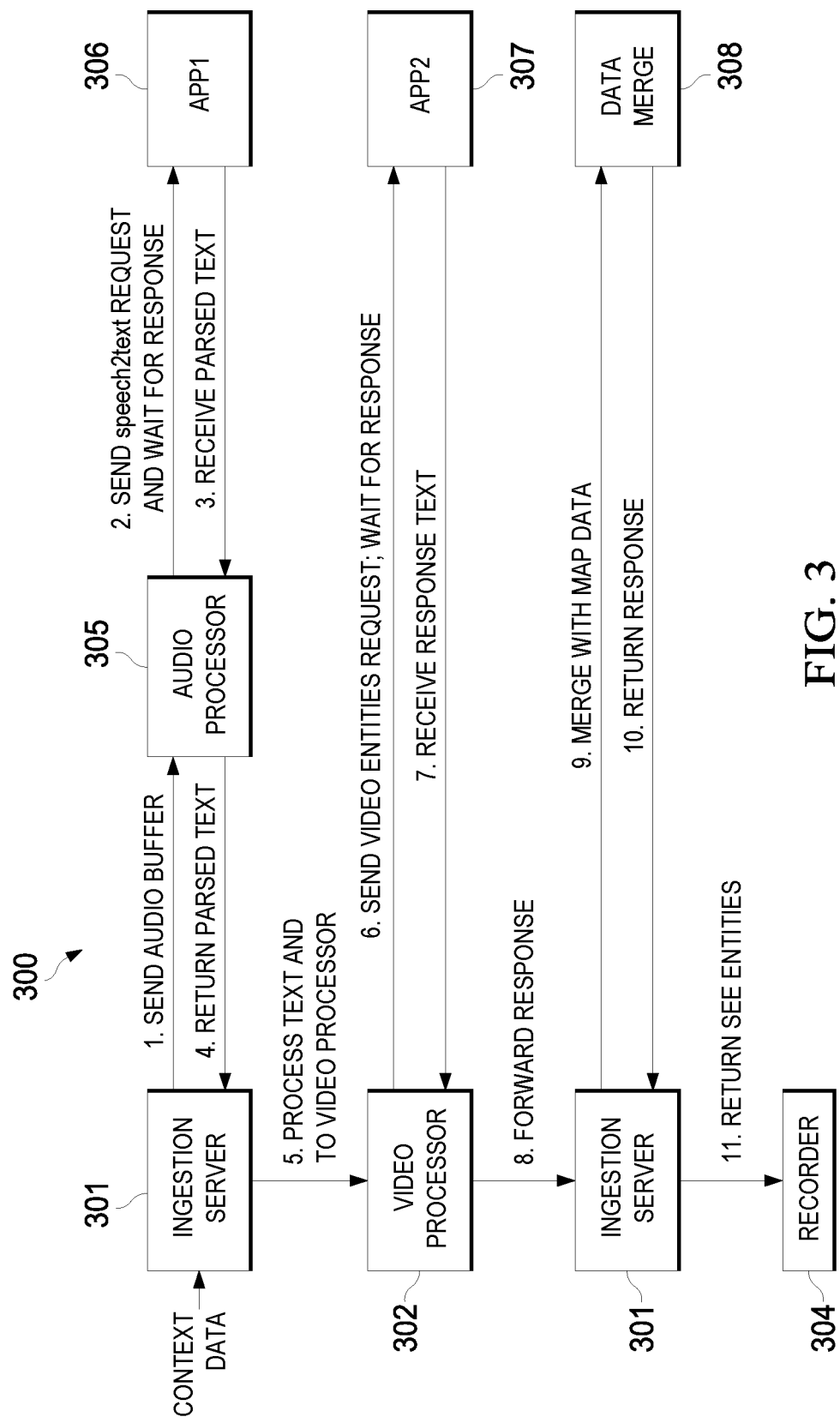
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
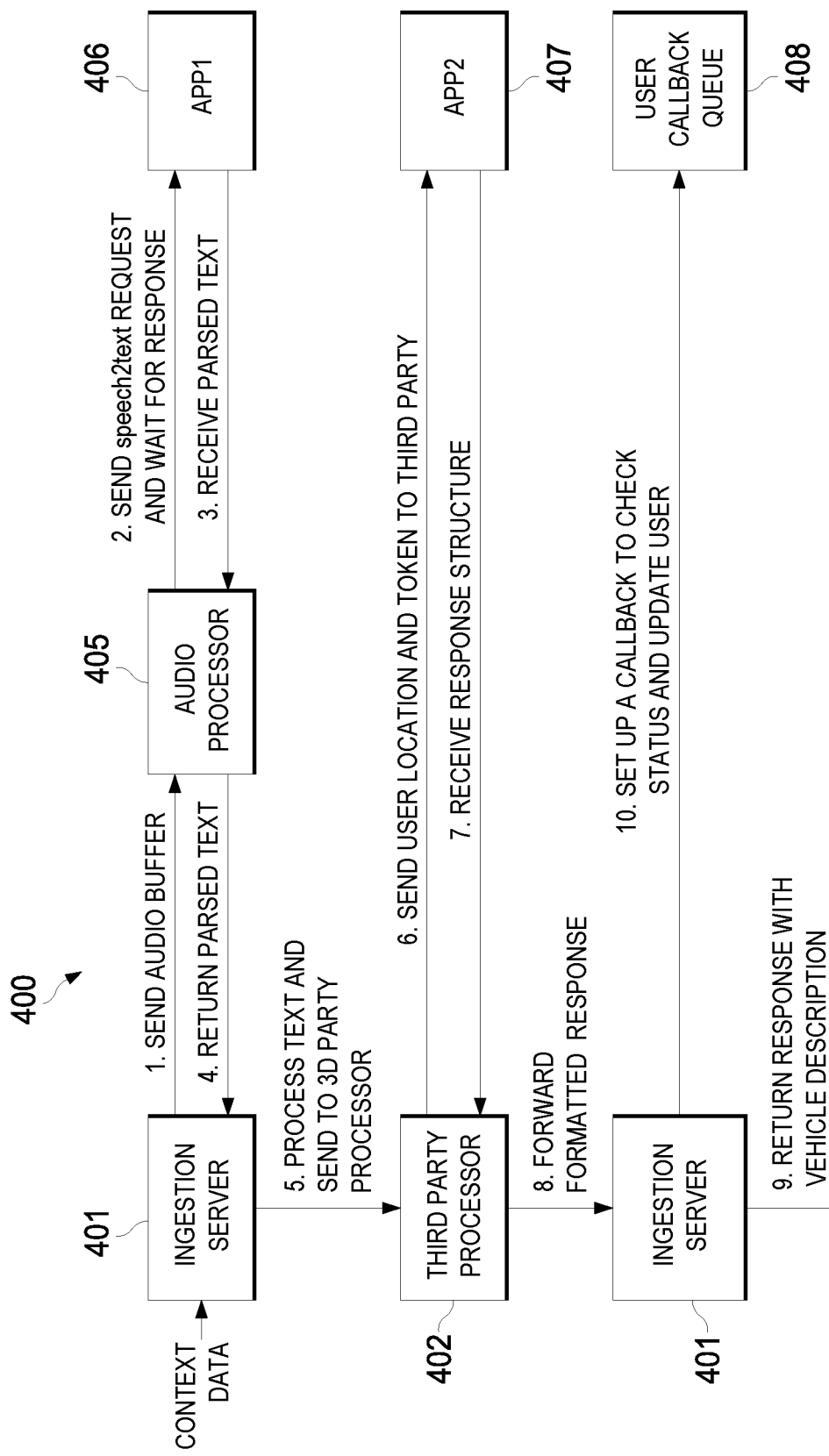
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id: 15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entity Attribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. Entity Attribute is an array of attributes about the entity that are specific to the user identifier's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
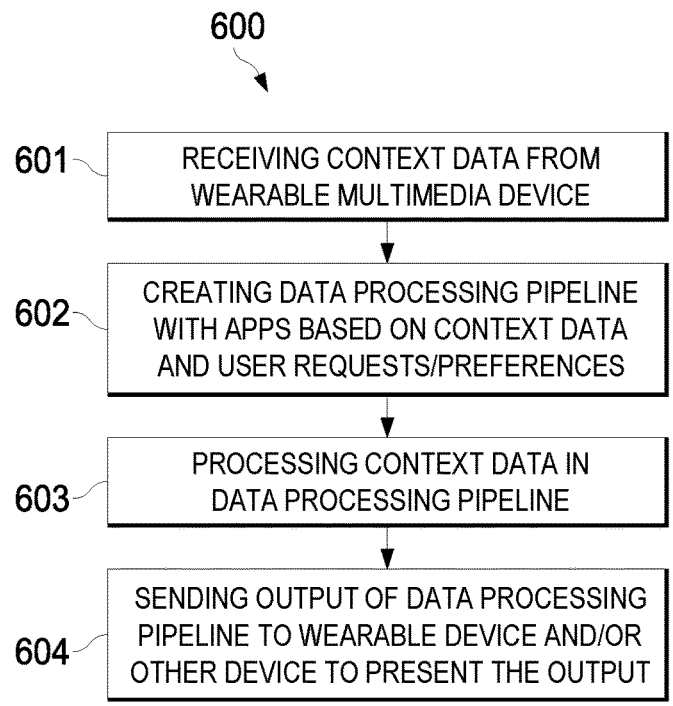
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
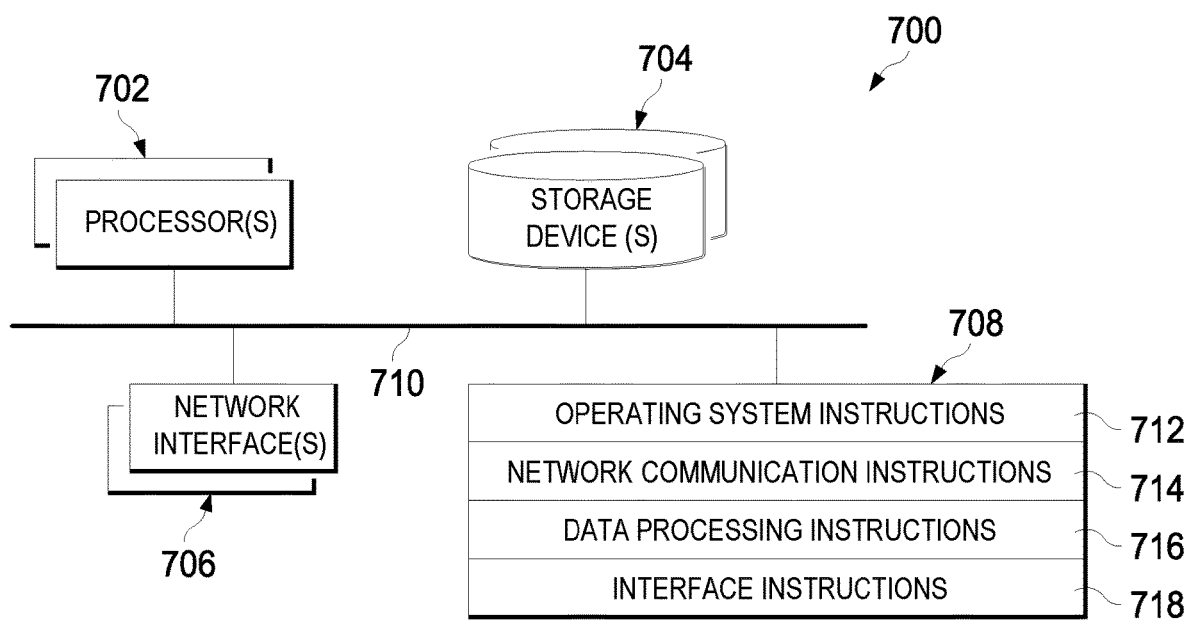
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
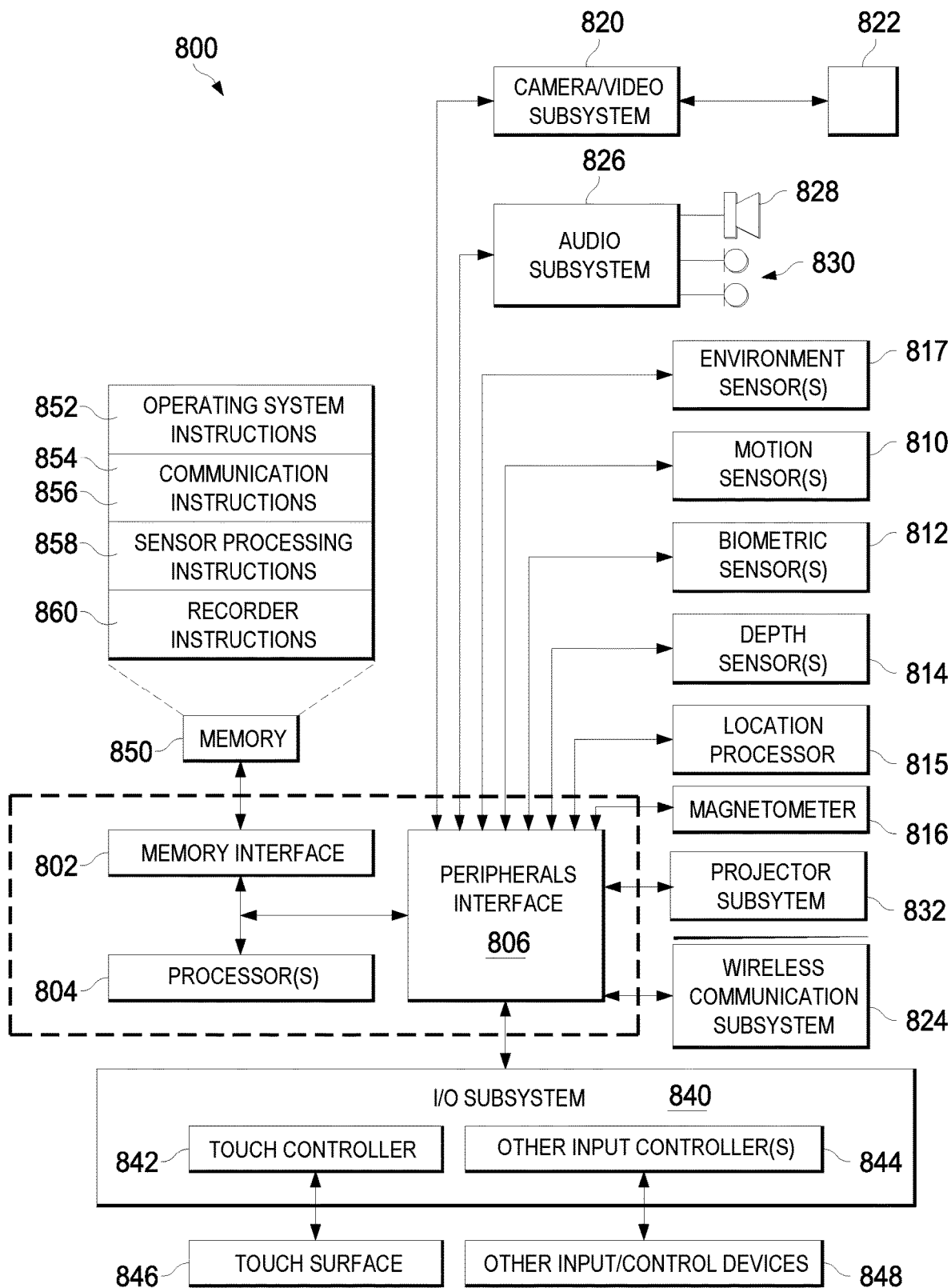
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user. In some implementations, the touch surface 946 can include a display screen to displaying information graphically to a user (e.g., using a graphical user interface). For example, the touch surface 946 can include one or more touch sensitive displays, such as liquid crystal display (LCD) screens, light emitting diode (LED) screens, and/or organic light emitting diode (OLED) screens, among others.

Other input controller(s) 844 may be coupled to other input/control devices 848, such as one or more buttons, rocker switches, thumbwheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm) is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, the wearable multimedia device 101 can include both a projector subsystem 832 and one or more other display devices (e.g., a display device of the touch surface 846). Other display devices include liquid crystal display (LCD) screens, light emitting diode (LED) screens, and organic light emitting diode (OLED) screens, among others. In some implementations, the wearable multimedia device 101 can include a projector subsystem 832, but not other display device. In some implementations, the wearable multimedia device 101 can include one or more of the other display devices, but not a projector subsystem 832.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, IOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
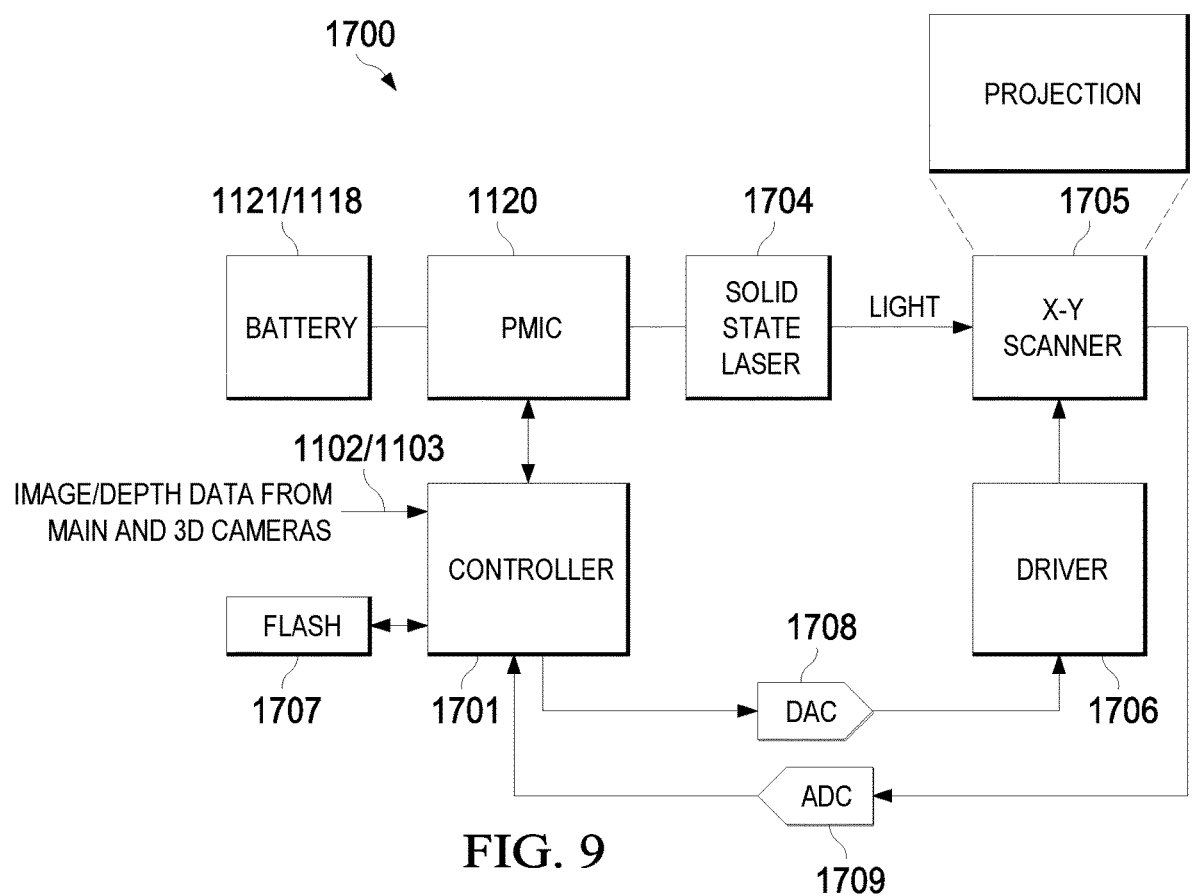
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Graphical User Interface

Figure 10:
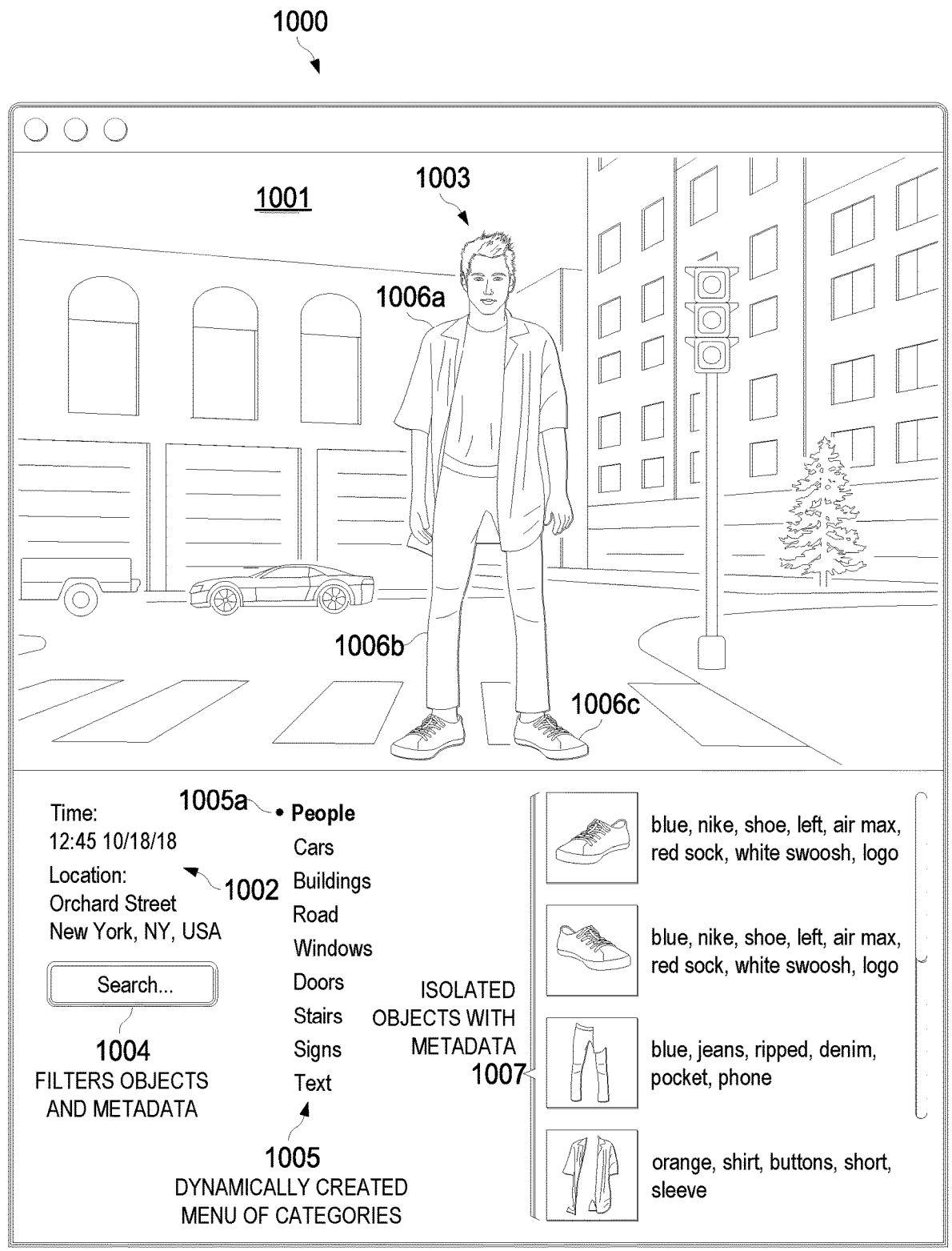
FIG. 10 is a diagram of an example graphical user interface (GUI) for the scene identification application described in reference to FIG. 3.

FIG. 10 is a screen shot of an example graphical user interface (GUI) 1000 for use with the scene identification application described in reference to FIG. 10, according to an embodiment. GUI 1000 includes video pane 1001, time/location data 1002, objects 1003, 1006a, 1006b, 1006c, search button 1004, menu of categories 1005 and thumbnail images 1007. GUI 1000 can be presented on a user device (e.g., a smartphone, tablet computer, wearable device, desktop computer, notebook computer) through, for example, a client application or through web page provided by a web server of cloud computing platform 102. In this example, a user has captured a digital image of a young man in video pane 1001 standing on Orchard Street, New York, New York on Oct. 18, 2018 at 12:45 PM, as indicated by time/location data 902.

In an embodiment, the image is processed through an object detection framework implemented on cloud computing platform 102, such as the Viola-Jones object detection network. For example, a model or algorithm is used to generate regions of interest or region proposals that include a set of bounding boxes that span the full digital image. Visual features are extracted for each of the bounding boxes and evaluated to determine whether and which objects are present in the region proposals based on visual features. Overlapping boxes are combined into a single bounding box (e.g., using non-maximum suppression). In an embodiment, overlapping boxes are also used to organize objects into categories in big data storage. For example, object 1003 (the young man) is considered a parent object and objects 1006a-1006c (the articles of clothing he is wearing) are considered child objects (shoes, shirt, pants) to object 1003 due to overlapping bounding boxes. Thus, a search on "people" using a search engine results in all objects labeled as "people" and their child objects, if any, being included in the search results.

In an embodiment, rather than bounding boxes complex polygons are used to identify objects in an image. The complex polygon is used to determine the highlight/hotspot region in the image where, for example, the user is pointing. Because only a complex poly segmentation piece is sent to the cloud computing platform (rather than the whole image), privacy, security and speed are improved.

Other examples of object detection frameworks that can be implemented by cloud computing platform 102 to detect and label objects in a digital image include but are not limited to: region convolutional neural networks (R-CNN), Fast R-CNN and Faster R-CNN.

In this example, the objects identified in the digital image include people, cars, buildings, road, windows, doors, stairs signs text. The identified objects are organized and presented as categories for the user to search. The user has selected the category "People" using a cursor or finger (if using a touch sensitive screen). By selecting the category "People," the object 1003 (i.e., the young man in the image) is isolated from the rest of the objects of the digital image, and a subset of objects 1006a-1006c are displayed in thumbnail images 1007 with their respective metadata. Object 1006a is a labeled as "orange, shirt, buttons, short sleeve." object 1006b is labeled as "blue, jeans, ripped, denim, pocket, phone," and object 1006c is labeled as "blue, Nike, shoe, left, air max, red sock, white swoosh, log."

Search button 1004 when pressed initiates a new search based on the category selected by the user and the particular image in the video pane 1001. The search results include thumbnail images 1007. Similarly, if the user selects the category "Cars" and then presses search button 1004, a new set of thumbnails 1007 are displayed showing all the cars captured in the image together with their respective metadata.

Figure 11:
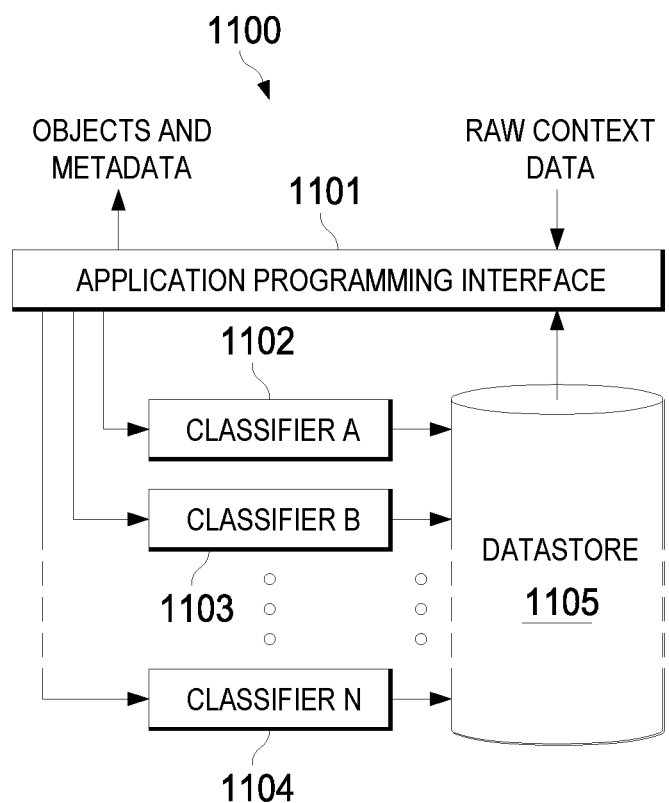
FIG. 11 is a diagram of an example classifier framework for classifying raw or preprocessed context data into objects and metadata that can be searched using a GUI.

FIG. 11 illustrates a classifier framework 1100 for classifying raw or preprocessed context data into objects and metadata that can be searched using the GUI 1000 of FIG. 10, according to an embodiment. Framework 1000 includes API 1101, classifiers 1102a-1102n and datastore 1105. Raw or preprocessed context data captured on the wearable multimedia device is uploaded through API 1101. The context data is run through classifiers 1102a-1102n (e.g., neural networks). In an embodiment, classifiers 1102a-1102n are trained using context data crowd-sourced from a large number of wearable multimedia devices. Outputs of classifiers 1102a-1102n are objects and metadata (e.g., labels) which are stored in datastore 1105. A search index is generated for the objects/metadata in datastore 1105 which can be used by a search engine to search for objects/metadata that satisfy a search query entered using GUI 1000. Various types of search indexes can be used, including but not limited to: tree index, suffix tree index, inverted index, citation index analysis and an n-gram index.

Classifiers 1102a-1102n are selected and added into a dynamic data processing pipeline based on one or more of the data type, data quantity, data quality, user preferences, user initiated or application initiated search queries, speech commands, application(s) requirements, templates and/or any other information to generate a desired presentation. Any known classifier can be used, including neural networks, Support Vector Machines (SVMs), Random Forests, Boosted Decision Trees, and any combination of these individual classifiers using voting, stacking and grading techniques. In an embodiment, some of the classifiers are personal to the user, i.e., the classifier is trained only on context data from a specific user device. Such classifiers can be trained to detect and label people and objects that are personal to the user. For example, one classifier can be used for face detection to detect faces in images of individuals known to the user (e.g., family members, friends) and that have been labeled by, for example, user input.

By way of example, a user can speak multiple phrases, such as: "create a movie from my videos that includes my mom and dad in New Orleans;" "add Jazz music as a soundtrack;" "send me a drink recipe for making a Hurricane;" and "send me directions to the nearest liquor store." The speech phrases are parsed into words with are used by the cloud computing platform 102 to assemble a personalized processing pipeline to perform the requested tasks, including adding a classifier for detecting the faces of the user's mom and dad.

In an embodiment, AI is used to determine how the user interacts with the cloud computing platform during a messaging session. For example, if a user speaks the message, "Bob, have you seen Toy Story 4?", the cloud computing platform determines who Bob is and parses "Bob" from the string sent to a message relay server on the cloud computing platform. Similarly, if the message says "Bob, look at this," the platform device sends an image with the message in one step without having to attach the image as separate transaction. The image can be visually confirmed by the user before sending to Bob using a projector (e.g., the projector subsystem 832) and any desired surface. Also, the platform maintains a persistent and personal channel of communication with Bob for a period of time, so the name "Bob" does not have to precede each communication during a message session.

Figure 12:
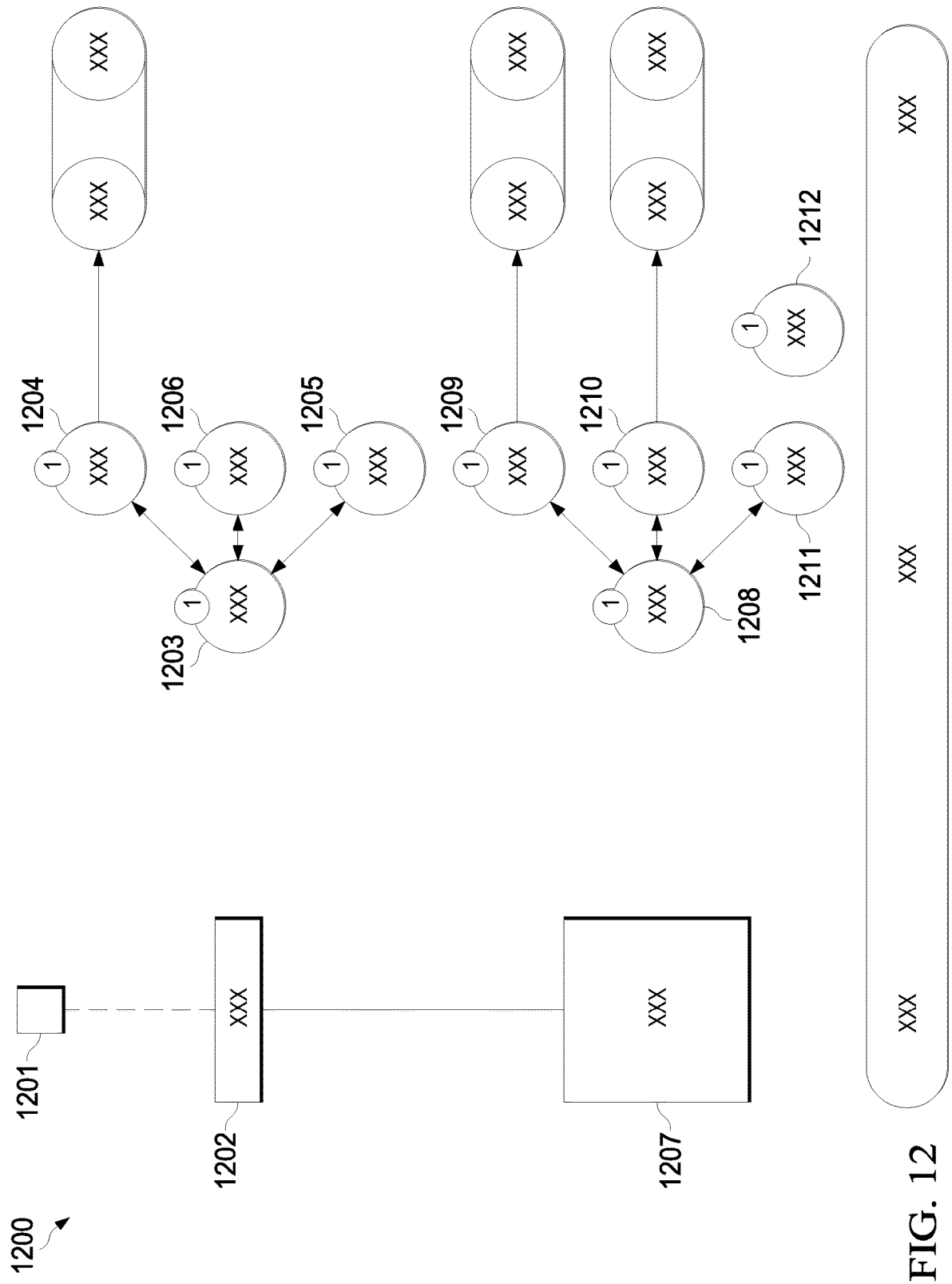
FIG. 12 is a system block diagram showing an example processing framework implemented in the cloud computing platform for processing raw or preprocessed context data received from the wearable multimedia device.

FIG. 12 is a system block diagram showing an alternative cloud computing platform 1200 for processing raw or preprocessed context data received from wearable multimedia devices, according to an embodiment. Edge server 1201 receives raw or preprocessed context data from wearable multimedia devices 1202 over a wireless communication link. Edge server 1201 provides limited local preprocessing, such as AI or camera video (CV) processing and gesture detection. At edge server 1201, dispatcher 1203 directs the raw or preprocessed context data to state/context detector 1204, first party handler 1205 and/or limited AI resolver 1206 for performing limited AI tasks. State/context detector 1204 uses GNSS data provided by, for example, a GPS receiver or other positioning technology (e.g., Wi-Fi, cellular, visual odometry) of wearable multimedia device 1202 to determine the location where the context data was captured. State/context detector 1204 also uses image and speech technology and AI to analyze image, audio and sensor data (e.g., motion sensor data, biometric data) that is included in the context data to determine user activity, mood and interest.

Edge server 1201 is coupled to regional data center 1207 by fiber and routers. Regional data center 1207 performs full AI and/or CV processing of the preprocessed or raw context data. At regional data center 1207, dispatcher 1208 directs the raw or preprocessed context data to state/context detector 1209, full AI resolver 1210, first handler 1211 and/or second handler 1212. State/context detector 1209 uses GNSS data provided by, for example, the GPS receiver or other positioning technology (e.g., Wi-Fi, cellular, visual odometry) of wearable multimedia device 1202 to determine the location where the context data was captured. State/context detector 1209 also uses image and speech recognition technology and AI to analyze image, audio and sensor data (e.g., motion sensor data, biometric data) that is included in the context data to determine user activity, mood and interest.

Figure 13:
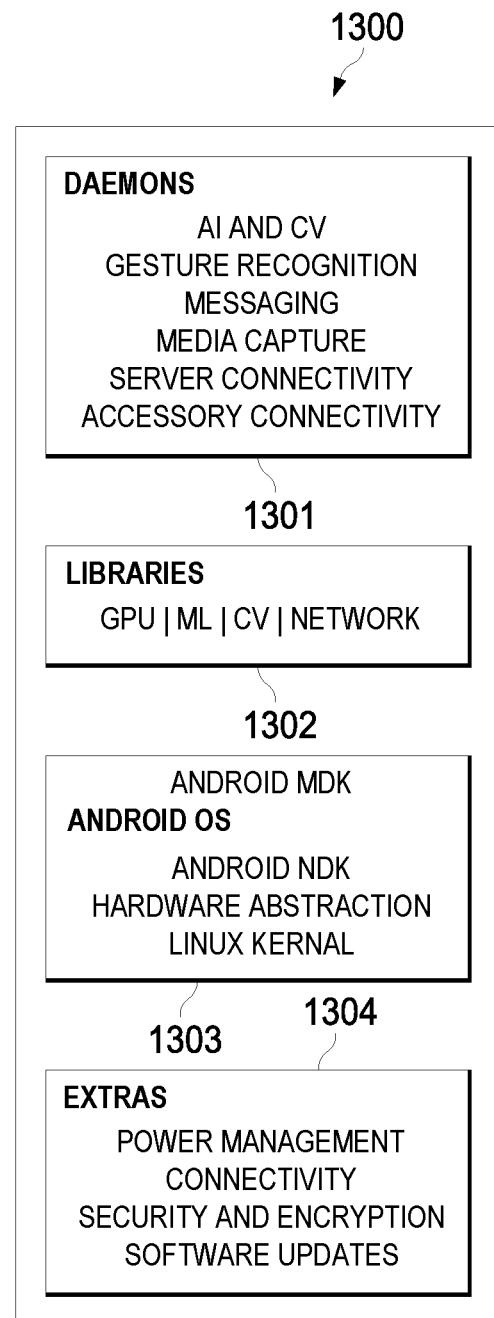
FIG. 13 is a diagram of example software components for the wearable multimedia device.

FIG. 13 illustrates software components 1300 for the wearable multimedia device, according to an embodiment. For example, software components include daemons 1301 for AI and CV, gesture recognition, messaging, media capture, server connectivity and accessory connectivity. Software components further include libraries 1302 for graphics processing units (GPU), machine learning (ML), camera video (CV) and network services. Software components includes an operating system 1303, such as Android® Native Development Kit (NDK), including hardware abstractions and a Linux kernel. Other software components 1304 include components for power management, connectivity, security+encryption and software updates.

Example Uses of Object Recognition to Provide Personal Assistance to Users

In general, the wearable multimedia device 101 can capture sensor data regarding a user's environment and/or a user's behavior (e.g., a user's gestures, movements, actions, speech, etc.), and perform or infer various actions based on the sensor data. In particular, the wearable multimedia device 101 can capture sensor data regarding one or more objects of interest, identify the objects, and perform actions to facilitate the user purchasing those objects and/or other related objects.

In some implementations, the wearable electronic device can perform at least some of the operations described herein to assist a user while shopping. For example, the wearable electronic device can assist the user in reviewing, comparing, and/or selecting objects for purchase, such as products, merchandise, food items, vehicles, clothing, housing, medications, or any other item or good that may be offered for sale to the user.

In some implementations, the wearable electronic device can perform at least some of the operations described herein to assist a user in selecting and maintaining a nutritional goal or diet. For example, the wearable electronic device can assist the user in reviewing, comparing, and/or selecting food items for purchase and/or consumption (e.g., based on the food items' nutritional value, the user's nutritional goals or diet, budget, the user's personal preferences, etc.). Food items can include any types of food, including solid foods, beverages, etc.

In some implementations, the wearable electronic device can perform at least some of the operations described herein to assist a user in selecting which medication to take at the moment depending on their medical consumption history and nutritional consumption history.

As an example, based on the sensor data, the wearable multimedia device 101 can detect a particular object of interest, such as an object that is being held by the user and/or is before the user (e.g., in the user's line of sight). In some implementations, the object can be an object that is being offered to sale to a user (e.g., by a physical retailer) or an object that a user has otherwise observing or handling. Further, based on the sensor data, the wearable multimedia device 101 can identify the object, retrieve information regarding the object, and present at least a portion of the information to a user (e.g., using the using the projector subsystem 832, a display screen of the touch surface 846, a speaker 828, etc.). Example information includes a description of the object, the object's price, the objects' fit or sizing (e.g., for clothing, shoes, etc.), the object's make and model, the object's color or style, and/or any other information pertaining to the object. This information can also include information regarding other object that are similar or related to that object (e.g., competing products on the marketplace, objects of a different make and/or model, objects having different fit of sizing, objects having different color or style, etc.).

As another example, based on the sensor data, the wearable multimedia device 101 can detect one or more food items being held by the user and/or is before the user (e.g., on a plate, on a bowl, on a dish, on a shelf or table, in a refrigerator or freezer, in a pantry or drawer, being served to the user by another, etc.). In some implementations, the food items can be food items that are being offered for sale to the user (e.g., at a grocery store, restaurant, buffet, etc.). In some implementations, the food items can be food items that the user is considering consuming. Based on the sensor data, the wearable multimedia device 101 can identify the food items, retrieve information regarding the food items, and present at least a portion of the information to a user (e.g., using the using the projector subsystem 832, a display screen of the touch surface 846, a speaker 828, etc.). Example information includes a description of the food items, the food items' nutritional value (e.g., calories, fat, carbohydrates, protein, fiber sodium content, minerals, vitamins, etc.), ingredients, allergens, serving sizes, places of origin or production, and/or any other information pertaining to the food item. Additional example information includes whether the food items conform to a particular diet (e.g., Kosher, Halal, vegan, ketogenic, etc.). This information can also include information regarding other food items that are similar or related to those food items (e.g., competing products on the marketplace, food items from a different producer, food items having different nutritional value, food items having different and/or no allergens, food items having different flavor profiles, food items having different places of origin or production, food items having different serving sizes, etc.).

As another example, based on the sensor data, the wearable multimedia device 101 can detect one or more food items that have been consumed by a user, and track the nutritional value of those food items. In some implementations, the wearable multimedia device 101 can determine that a user has consumed food items based on sensor data. For example, the wearable multimedia device 101 can determine that a user consumed a beverage by detecting a cup and determining that the user brought the cup towards her mouth to drink. As another example, the wearable multimedia device 101 can determine that a user consumed a solid food item by detecting the food item, and determining that the user brought the food item towards her mouth to eat. In some implementations, the wearable multimedia device 101 can determine that a user has consumed food items based on manual input from a user.

In some implementations, the wearable multimedia device 101 can also estimate a size, weight, mass, and/or volume of an object based on the sensor data (e.g., using a three-dimensional camera). For example, the wearable multimedia device 101 can estimate the dimensions of the object, and estimate its weight or mass based on known information regarding the object (e.g., known density, known weight or mass given particular reference dimensions, etc.).

In some implementations, the wearable multimedia device 101 can estimate a portion size of a food item based on the sensor data (e.g., based on the estimated size, weight, mass, and/or volume), and estimate the nutritional value of that food item based on the estimated portion size. For example, the electronic device can determine the nutritional value of the food item for a reference portion size (e.g., based on reference materials or data records), and scale that nutritional value in proportion to the estimated portion size of that food item.

In some implementations, the wearable multimedia device 101 can display information regarding food items in a persistent or semi-persistent manner on a UI or VI (e.g., a banner or other user interface element overlaid on the VI or UI) or play audio through a loudspeaker or earbuds to convey information or use some other feedback mechanism (e.g., LED lights, force feedback using a haptic engine). A user can interact with the UI or VI to selectively obtain information regarding the food items (e.g., by touching or otherwise selecting the user interface element). In some implementations, the wearable multimedia device 101 can detect and/or identify an object using one or more of the techniques described herein.

In some implementations, at least some of the information can be stored locally on the wearable multimedia device 101. In some implementations, at least some of the information can be stored remotely from the wearable multimedia device 101, and retrieved using a communications network (e.g., the network 103).

Further, the wearable multimedia device 101 can perform one or more operations to facilitate the user purchasing the object.

As an example, the wearable multimedia device 101 can conduct a transaction with an online retailer to purchase the object on behalf of the user. For example, the wearable multimedia device 101 can conduct a transaction with an online retailer using a pre-selected payment method (e.g., a credit card, debit card, bank account, payment application, etc. previously selected by the user). As another example, the wearable multimedia device 101 can prompt the user for a payment method, and conduct a transaction with an online retailer using the provided payment method.

As an example, the wearable multimedia device 101 can add the object to the user's electronic shopping cart at the online retailer, such that the user can manually complete the purchase.

As another example, the wearable multimedia device 101 can suggest to the user alternative objects for purchase. In some implementations, alternative objects can include objects that are similar to the object (e.g., having a similar purpose, usage, etc.), but having a different make, model, color, fit, sizing, style, or any other characteristic. For example, the object of interest can be a set of headphones marketed by a particular company, and the wearable multimedia device 101 can suggest another set of headphones marketed by another company. As another example, the object of interest can be a green shirt, and the wearable multimedia device 101 can suggest a blue shirt. As another example, the object can be a food item, and the wearable multimedia device 101 can suggest another food item (e.g., having a different nutritional content, flavor profile, serving size, etc.).

As another example, the wearable multimedia device 101 can suggest to the user additional objects for purchase. In some implementations, additional objects can include objects that complement the object of interest. For example, the object of interest can be shirt, and the wearable multimedia device 101 can suggest a matching pair of pants. As another example, the object of interest can be food item, and the wearable multimedia device 101 can suggest a beverage to pair with that food item.

As another example, the wearable multimedia device 101 can identify online retailers that are offering the object for sale, and identify those online retailers to the user. For example, the wearable multimedia device 101 can identify one or more online retailers that are offering the object for sale, determine the price of the object at each of the online retailers, and display a list of at least some of the online retailers and/or the prices to the user (e.g., using the using the projector subsystem 832, a display screen of the touch surface 846, a speaker 828, etc.).

As another example, the wearable multimedia device 101 can identify physical retailers that are offering the object for sale nearby the user's current location, and identify those physical retailers and their locations to the user. For example, the wearable multimedia device 101 can identify one or more physical retailers that are offering the object for sale within a particular threshold value of the user's current location (e.g., within a threshold distance), determine the price of the object at each of the physical retailers, and display a list of at least some of the physical retailers and/or the prices to the user (e.g., using the using the projector subsystem 832, a display screen of the touch surface 846, a speaker 828, etc.).

In some implementations, a retailer may offer multiple options for purchasing an object. For example, an object may be offered in different colors, configurations, sizes, fits, editions, formats, etc. The wearable multimedia device 101 can identify each of the options for purchasing the object, and determine information regarding those options (e.g., availability, price, shipping time, etc.), and display a list of at least some of the options and information regarding those options to the user (e.g., using the using the projector subsystem 832, a display screen of the touch surface 846, a speaker 828, etc.).

For instance, a user can hold a book before the wearable multimedia device 101, and ask "how much is this book?" In response, the wearable multimedia device 101 can identify the book and the formats of the book that are available for sale at a retailer (e.g., audio book, physical book, digital book, collector's edition book, etc.), and the prices of each of the formats. Further, wearable multimedia device 101 can present a list of at least some of the formats and information regarding those formats to the user).

In some implementations, the wearable multimedia device 101 can identify multiple objects in the user's environment, and suggest that the user purchase a subset of those objects. For example, the wearable multimedia device 101 can identify several objects of a similar type of a shelf, select one of the objects for the user (e.g., based on the user's preferences, purchase history, interests, etc.), and indicate the selected object the user. In some implementations, the wearable multimedia device 101 can indicate the selected object by projecting light onto the selected object (e.g., using the projector subsystem 832). In some implementations, the wearable multimedia device 101 can indicate the selected object by displaying the selected object on a display screen (e.g., a display screen of the touch surface 846).

In some implementations, the wearable multimedia device 101 can identify multiple food items in the user's environment, and suggest that the user purchase and/or consume a subset of those food items. For example, the wearable multimedia device 101 can identify several food items in front of a user, select one of the food items for the user (e.g., based on the user's preferences, nutritional goals, medical history, etc.), and indicate the selected food item the user. In some implementations, the wearable multimedia device 101 can indicate the selected food item by projecting light onto the selected food item (e.g., using the projector subsystem 832). In some implementations, the wearable multimedia device 101 can indicate the selected object by displaying the selected food item on a display screen (e.g., a display screen of the touch surface 846).

In some implementations, the wearable multimedia device 101 can indicate the selected object by projecting light to highlight that object, while refraining from projecting light on the other objects.

In some implementations, the wearable multimedia device 101 can indicate the selected object by projecting light to present an icon or pattern on or next to that object (e.g., a check mark icon, a green pattern, etc.). In some implementations, the wearable multimedia device 101 can project light to present other icons or patterns on or next to the other objects (e.g., a X-mark icon, a red pattern, etc.), to distinguish from the selected object.

In some implementations, the wearable multimedia device 101 can indicate the selected object by outputting audio (e.g., synthesized speech or some other sound) identified that selected object to the user, such as using the speaker 828.

In some implementations, the wearable multimedia device 101 can also present information regarding the object (e.g., using the projector subsystem 832, a display screen of the touch surface 846, a speaker 828, etc.), either instead of or alongside the indication of the selected object.

In some implementations, the wearable multimedia device can perform operations based on actions by the user.

For example, the user can perform one or more gestures (e.g., using his arms, hands, fingers, etc.) corresponding to one or more commands. The wearable multimedia device 101 can detect those gestures based on the sensor data, and perform the corresponding commands.

As another example, the user can verbally speak one or more commands. The wearable multimedia device 101 can detect the speech based on the sensor data, and perform the corresponding commands.

Commands can include instructions to the wearable multimedia device 101 to perform one or more operation. As an example, commands can instruct the wearable multimedia device 101 to purchase a particular object, present information regarding a object, place the object in an electronic shopping cart, suggest alternative objects for purchase, suggest additional objects for purchase (e.g., complementary objects), find retailers that are selling the object, and/or any other operation.

In some implementations, commands can be phrased in the form of a question or query. As an example, a user can ask the wearable multimedia device 101 for certain information regarding the object. In response, the wearable multimedia device 101 can determine an answer to the question (e.g., by retrieving the answer from a local data and/or remote data base, by synthesizing the answer using machine learning techniques, by requesting the answer from a remote machine learning system, etc.), and present the answer to the user. In some implementations, the wearable multimedia device 101 can present the answer using the projector subsystem 832 and/or a display screen of the touch surface 846.

As an example, the user can open a storage area (e.g., a closet, refrigerator, freezer, pantry, drawer, etc.), and ask the wearable multimedia device to identify objects that are missing or in short supply in the storage are (e.g., "what am I missing?"). In response, the wearable multimedia device 101 can identify the objects that are in the storage area and generate an inventory of those objects. Further, the wearable multimedia device 101 can compare the inventory to a shopping list (e.g., a shopping list maintained by the user) to determine whether any of the objects on the shopping list are missing from in the storage area or are otherwise in short supply in the storage area. Further, the wearable multimedia device 101 can suggest to the user one or more objects for the user to purchase (e.g., objects that are missing and/or are in short supply).

As another example, the user can open a food storage area (e.g., a refrigerator, freezer, pantry, etc.), and ask the wearable multimedia device to identify alternatives to the food items that are in the food storage area. For instance, the user can ask the wearable multimedia device to identify alternatives food items that are healthier than those that are in the food storage area (e.g., "what are healthier options?"). In response, the wearable multimedia device 101 can identify the food items that are in the storage area, determine the nutritional value of those food items, and compare the nutritional value to the user's nutritional goals, diet, and/or preferences. Further, the wearable multimedia device 101 can identify alternative food items that satisfy and/or are more consistent with the user's nutritional goals, diet, and/or preferences. In some implementations, the wearable multimedia device 101 can obtain information regarding the user's nutritional goals, diet, and/or preferences by retrieving previously inputted data from the user. In some implementations, the use can provide the wearable multimedia device 101 with information regarding the user's nutritional goals, diet, and/or preferences as a part of the query to the wearable multimedia device 101 (e.g., "what are options that have less fat?", "what are alternatives that would help me hit my goals?").

As another example, the user can open a food storage area (e.g., a refrigerator, freezer, pantry, etc.), and ask the wearable multimedia device to identify food recipes that the user can perform using the food items in the food storage area (e.g., "what can I make with the tuff in here?'). In response, the wearable multimedia device 101 can identify the food items that are in the storage area, generate an inventory of those food items, and determine one or more food recipes that can be performed using those food items. In some implementations, the wearable multimedia device 101 can determine food recipes based on a database of recipes and/or using machine learning.

As another example, the user can select a food item from a food storage area (e.g., a refrigerator, freezer, pantry, etc.), and ask the wearable multimedia device to identify an alternative food item in the storage area to select instead (e.g., "what else should I pick from the fridge?"). In response, the wearable multimedia device 101 can identify the food items that are in the storage area, and identify the specific food item that was selected by the user. Further, the wearable multiple media can determine the nutritional value of those food items, and compare the nutritional value to the user's nutritional goals, diet, and/or preferences. Further, the wearable multimedia device 101 can identify an alternative food item to replace the food item selected by the user (e.g., a food item that satisfies and/or is more consistent with the user's nutritional goals, diet, and/or preferences. In some implementations, the wearable multimedia device 101 can proactively suggest an alternative food item to a user (e.g., without the user having to expressly ask the wearable multimedia device 101 for the suggestion). In some implementations, the wearable multimedia device 101 can suggest an alternative food item to a user specifically in response to a user's request.

As another example, the user can open a food storage area (e.g., a refrigerator, freezer, pantry, etc.), and ask the wearable multimedia device to identify any food items that have been recalled (e.g., due to health or safety concerns). In response, the wearable multimedia device 101 can identify the food items that are in the storage area, determine whether any of the food items are subject to a recall (e.g., by comparing the food item to a database of recalled food items), and identify any recalled food items to the user. In some implementations, the wearable multimedia device 101 can proactively identify recalled food items to a user (e.g., without the user having to expressly ask the wearable multimedia device 101 to perform the identification). In some implementations, the wearable multimedia device 101 can identify recalled food items specifically in response to a user's request.

As another example, the user can open a food storage area (e.g., a refrigerator, freezer, pantry, etc.), and ask the wearable multimedia device to identify any food items that have expired (or are about to expire). In response, the wearable multimedia device 101 can identify the food items that are in the storage area, determine whether any of the food items have expired (or are about to expire), and identify any expired food items to the user. In some implementations, the wearable multimedia device 101 can determine whether a food item has expired (or is about to expire) by identifying an expiration date displayed on the food item and comparing the expiration date to the current date. In some implementations, the wearable multimedia device 101 can determine whether a food item has expired (or is about to expire) by determining a date of purchase of the food item (e.g., based on transaction data, sensor data, etc.), and determining the length of time since the food item was purchased. In some implementations, the wearable multimedia device 101 can determine whether a food item has expired (or is about to expire) by determining the length of time between a first detection of the food item by the wearable multimedia device 101 (e.g., using sensor data) and the current date. In some implementations, the wearable multimedia device 101 can proactively identify expired food items and/or soon to expire food items to a user (e.g., without the user having to expressly ask the wearable multimedia device 101 to perform the identification). In some implementations, the wearable multimedia device 101 can identify expired food items and/or soon to expire food items specifically in response to a user's request.

In some implementations, the wearable multimedia device 101 can infer aspects of a user's commands or questions, without requiring that the user expressly provide that information. For example, a user can ask the wearable multimedia device 101 to purchase a particular object from a retailer and deliver the item to a particular location, without providing a specific identifying information for that object and/or without providing a specific address for that location (e.g., "send some toothpaste to my hotel"). In response, the wearable multimedia device 101 can infer the object that the user intended to purchase (e.g., based on the user's historical purchases, preferences, etc.). Further, the wearable multimedia device 101 can infer the address that the user intended to receive the object (e.g., based on the user's known addresses, calendars, emails, web searches of the location's address, preferences, etc., or some combination thereof). Further, the wearable multimedia device 101 can perform a transaction to purchase the identified object and to deliver the object to the determined address.

In some implementations, the user can hold an object in front of the wearable multimedia device 101 or otherwise orient the wearable multimedia device 101 towards the object, and ask the wearable multimedia device 101 to purchase the object. In response, the wearable multimedia device 101 can identify the object, identify one or more online retailers that are offering the object for sale, and purchase the object from one of the online retailers. In some implementations, the wearable multimedia device 101 can immediately purchase the item without further input from the user (e.g., using the user's default form of payment and shipping address). Further, the wearable multimedia device 101 can present information regarding the purchase (e.g., using the projector subsystem 832 and/or the display screen of the touch surface 846) and enable the user to revise aspects of the purchase (e.g., shipping address, form of payment, etc.) and/or cancel the purchase.

In some implementations, a user can identify an object to the wearable multimedia device 101 using one or more gestures. For example, the user can hold an object up to the wearable multimedia device 101, point to the object using her finger or hand, wave at the object, etc.). In response, the wearable multimedia device 101 can identify the object in the user's environment corresponding to the user's gesture (e.g., the object being held by the user, the object that is aligned with the user's finger or hand, the object that is aligned with the user's waving motion, etc.). Further, the wearable multimedia device 101 can performed one or more of the operations described herein with respect to the identified object.

In some implementations, the wearable multimedia device 101 can present different types of information to the user and/or perform difference types of operations, depending on the identified object. For example, if the identified object is a vinyl record, the wearable multimedia device 101 can suggest playing the contents of the vinyl record to the user, or suggest adding the contents of the vinyl record to a playlist or saved songs (e.g., by retrieving the corresponding song or album from a music provider). As another example, if the identified object is a food item, the wearable multimedia device 101 can suggest tracking the nutritional value of the food item. As another example, if the identified object is a product being offered for sale, the wearable multimedia device 101 can suggest adding the product to a shopping list and/or purchasing the product.

In some implementations, the wearable multimedia device 101 can assist the user in managing a list of objects that she is considering obtaining (e.g., purchasing, obtaining as a gift, etc.). In some implementations, this may be referred to as a shopping list, grocery list, wish list, gift list, etc. In some implementations, a list can be maintained locally by the multimedia device 101. In some implementations, a list can be maintained remotely (e.g., by a cloud computing system, remote server, online retailer, etc.).

For example, the user can hold up one or more items before the wearable multimedia device 101, and tell the wearable multimedia device 101 to "add this to my shopping list." In response, the wearable multimedia device 101 can identify the object(s), categorizes the object(s), and add the object to the user's shopping list.

As another example, the user can hold up one or more items before the wearable multimedia device 101, and tell the wearable multimedia device 101 to "remove this from my shopping list." In response, the wearable multimedia device 101 can identify the object(s), and remove the object from the user's shopping list.

As another example, the user can hold up one or more items before the wearable multimedia device 101, and tell the wearable multimedia device 101 to "check this off my shopping list." In response, the wearable multimedia device 101 can identify the object(s), and revise the user's shopping list to indicate that the object has been purchased and/or will be purchased by the user.

As another example, the user can hold up one or more items before the wearable multimedia device 101, and ask the wearable multimedia device 101 "is this on my shopping list?" In response, the wearable multimedia device 101 can identify the object(s), and determine whether the object is on the user's shopping list. Further, the wearable multimedia device 101 can indicate to the user whether the object is on the shopping list.

As another example, the wearable multimedia device 101 can assist the user in identifying objects that are on her shopping list. As an example, a user can orient the wearable multimedia device 101 towards one or more objects (e.g., objects on a store shelf or display), and ask the wearable multimedia device 101 "is there anything here that I need from my shopping list?" In response, the wearable multimedia device 101 can identify each of the object(s), and determine whether those object(s) are listed on the user's shopping list. Further, the wearable multimedia device 101 can indicate each of the objects that are on the user's shopping list to the user. For instance, the wearable multimedia device 101 can project light onto a surface of the user's hand indicating the object(s) that are on the shopping list (e.g., using the projector subsystem 832), project light onto the object(s) that are on the shopping list (e.g., using the projector subsystem 832), render a graphical user interface indicating that object(s) that are on the shopping list (e.g., using the touch surface 846), and/or output sound indicating the object(s) that are on the shopping list (e.g., using the speaker 828). In some implementations, the wearable multimedia device 101 can indicate each of the objects that are not on the user's shopping list (e.g., to assist the user in distinguishing between the objects that are on the shopping list and the objects that are not on the shopping list).

As another example, a user can orient the wearable multimedia device 101 towards a one or more objects selected by the user (e.g., one or more objects collected in a physical shopping cart or basket), ask the wearable multimedia device 101 "is there anything missing from my shopping list?" In response, the wearable multimedia device 101 can identify each of the object(s) selected by the user, and identify any object(s) in the shopping list that have not yet been selected by the user. Further, the wearable multimedia device 101 can indicate each of the objects in the shopping list that have not yet been selected to the user. For instance, the wearable multimedia device 101 can project light onto a surface of the user's hand indicating these object(s) (e.g., using the projector subsystem 832), render a graphical user interface indicating these object(s) (e.g., using the touch surface 846), and/or output sound indicating these object(s) to the user.

As another example, a user can instruct the wearable multimedia device 101 to purchase some or all of the objects listed in her shopping list. In response, the wearable multimedia device 101 can conduct a transaction (e.g., with an online retailer) to purchase some or all of the objects listed in her shopping list.

In some implementations, the wearable multimedia device 101 can present the shopping list to the user (e.g., using the projector subsystem 832, touch surface 846, and/or speaker 828), and request the user to select one or more objects from the shopping list for purchase. Upon receiving a selection from the user, the wearable multimedia device 101 can conduct a transaction (e.g., with an online retailer) to purchase the selected object(s).

In some implementations, the wearable multimedia device 101 can track various aspects of a user's health and present a summary of the user's health to the user (e.g., using a graphical dashboard). For example, using one or more sensors (e.g., cameras, microphones, motion sensors, biometric sensors, etc.), the wearable multimedia device 101 can gather information regarding a user's eating activities, physical activities (e.g., exercise), sleep activities, and/or any other health data. Further, the wearable multimedia device 101 can present a summary of the gathered information to the user using a graphical user interface (GUI) (e.g., using the using the projector subsystem 832 and/or a display screen of the touch surface 846), which can be navigated by the user through touch input or speech input (e.g., through microphones and an audio interface).

In some implementations, the GUI can indicate a user's metrics with respect to multiple different types of activities (e.g., eating, exercising, sleeping, etc.), and show the user's progress with respect to certain goals (e.g., using charts, graphs, rings, etc.). For example, if a user has consumed too many calories in the current day, the user interface can include a chart, graph, ring, pie chart, Venn diagram, etc. visually depicting that the user's consumed calories have exceeded a particular threshold amount. For example, if a user has not taken enough steps in the current day, the user interface can include a chart, graph, ring, pie chart, Venn diagram, etc. visually depicting that the user's steps are less than a particular threshold amount. A user's metrics and/or goals can change over time (e.g., based on the user's activities, preferences, instructions, etc.).

In some implementations, tracking progress can occur if a user sets minimum and/or maximum goals. For example, the user could set a minimum goal to reach for Vitamin C intake without caring about a maximum. As another example, there the user could set a maximum for sugar intake without caring for a minimum sugar intake. As another example, a user can set minimum and maximum goals for something such as iron intake (e.g., if the user is iron deficient but cannot ingest too much iron). Minimums and maximums can also apply to other metrics like physical activity.

In some embodiments, progress and goals can be tracked without the need for minimum and maximum but can be compared to behaviors. More specifically, the device could have a model of behavior given a person's health goals. The person's intake and output are then compared to the model to determine how far away from the model the person is diverging from. The model may also be influenced by previous user behavior and can be tuned and influenced by user behavior.

For example, if a user cats a donut in the morning, that may put them at a disadvantage for consuming sugars later in the day if they habitually cat sugars later in the day. The device would indicate that they have strayed away from their health goal, but if they continue to not cat sugar as much as they do through the day, the GUI/feedback would indicate that their sugar intake is balancing out again when compared to the behavior model. The balance can also be influenced by other factors, such as exercise, so if the user were to get a workout in after the donut, they would see their balance align more quickly.

In some implementations, the GUI can indicate relationship or interdependence between two or more metrics. For example, the wearable multimedia device 101 can determine that a person is walking more than usual, and in response, can inform the user to consume more water. As another example, the wearable multimedia device 101 can determine that a person is eating more salty foods than usual, and in response, can inform the user to consume more water.

As described above, a wearable multimedia device 101 can include a projector subsystem 832 configured to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the surface can be a surface of the user's body, such as the user's hand, palm, etc. In some implementations, the surface can be a surface in the user's environment, such as a surface of a wall, table, desk, etc. In some implementations, the surface can be a surface of an object or object of interest (e.g., an object being held by a user and/or before the user, such as in the user's line of sight).

Figure 14:
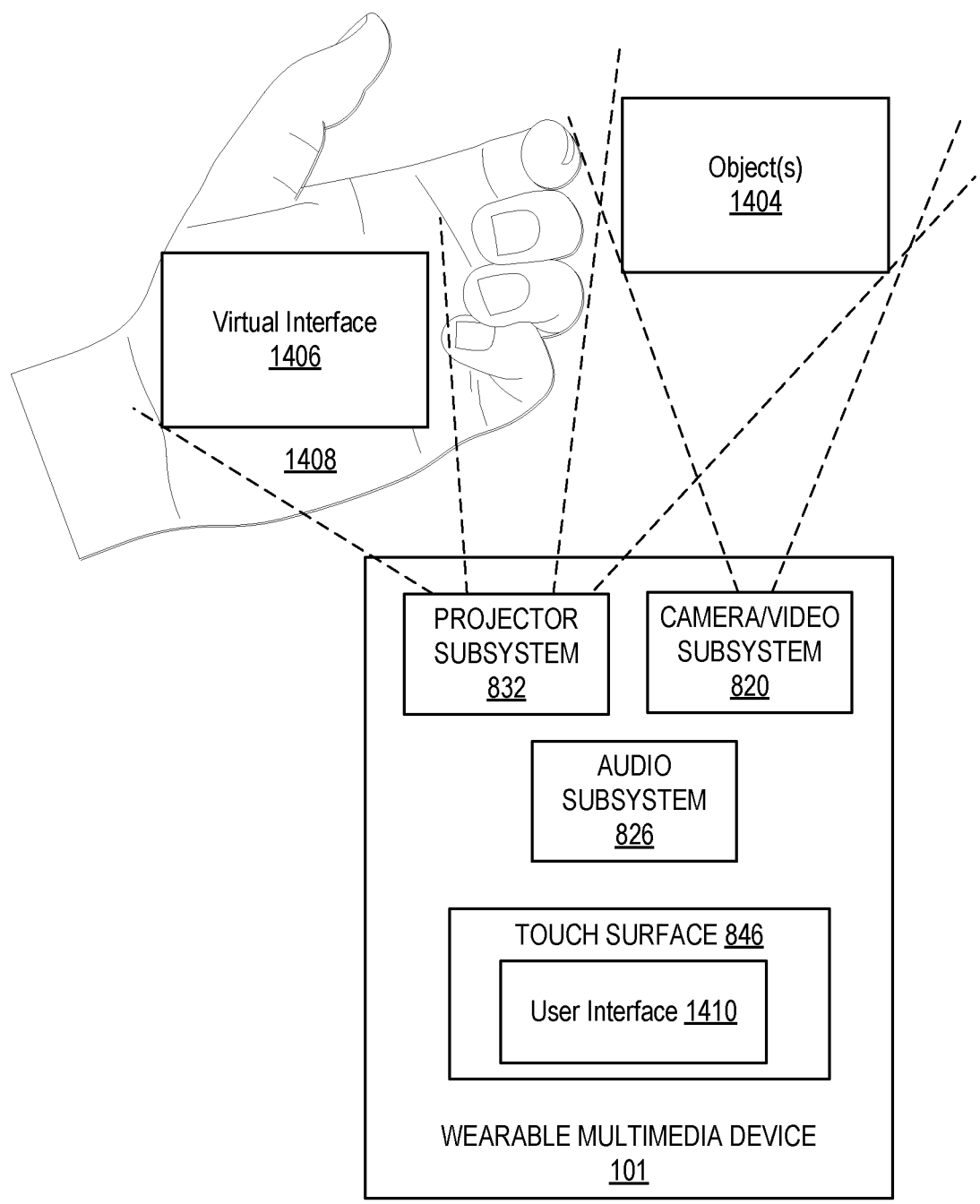
FIG. 14 is a diagram of example operation of a wearable multimedia device.

An example operation of the wearable multimedia device 101 is shown in FIG. 14 (e.g., to facilitate a user shopping for one or more objects).

Using the camera/video subsystem 820, the wearable multimedia device 101 can generate sensor data regarding a user's environment 1402, including one or more objects 1404 the user's environment 1402. In some implementations, at least some of the objects 1404 can be objects that are held the user's hand. In some implementations, at least some of the objects 1404 can be objects that are not being held in the user's hand (e.g., objects resting on a table, shelf, floor, etc.). In some implementations, at least some of the objects 1404 can be objects that are being held by another person (e.g., a person that is not directly using or wearing the wearable multimedia device 101).

Further, using the camera/video subsystem 820, the wearable multimedia device 101 can also generate sensor data regarding gestures, movements, and/or actions performed by the user.

Further, using the audio subsystem 826, the wearable multimedia device 101 can generate sensor data regarding speech uttered by the user and/or audio in the user's environment 1400. Example sensor data includes recordings of speech uttered by the user and/or other people, music, ambient noise, or any other sound such as crying, laughing, coughing, sneezing, wheezing, etc.

Based on the sensor data generated by the camera/video subsystem 820 and/or the audio subsystem 826, the wearable multimedia device 101 performs one or more actions with respect to the objects 1404. For example, the wearable multimedia device 101 can identify the objects 1404, and perform actions to facilitate the user purchasing those objects 1404 and/or other related objects (e.g., as described above and below). In some implementations, at least some of the operations can be performed automatically by the wearable multimedia device 101 (e.g., without express instructions from the user). In some implementations, at least some of the operations can be performed in response to a user's commands (e.g., spoken commands, gestures, touch inputs, and/or other inputs from the user).

Further, the wearable multimedia device 101 can present information graphically or visually to the user. In some implementations, the wearable multimedia device 101 can project a virtual interface 1406 onto a surface 1408 (e.g., a surface of the user's hand or palm) using the projector subsystem 832. For example, the projector subsystem 832 can project light onto the surface 1408 according to a particular spatial and/or temporal pattern, such that the user perceives text, images, videos, colors, patterns, and/or any other graphical information on the surface 1408. In some implementations, the virtual interface 1406 can include one or more user interface elements with which the user can interact (e.g., buttons, dials, sliders, scroll bars, text input boxes, etc.).

In some implementations, the wearable multimedia device 101 can present a user interface 1410 using the display screen (e.g., a touch sensitive display screen of the touch surface 846). For example, the wearable multimedia device 101 can render text, images, videos, colors, patterns, and/or any other graphical information on the display screen. In some implementations, the user interface 1410 can include one or more user interface elements with which the user can interact (e.g., buttons, dials, sliders, scroll bars, text input boxes, etc.).

In some implementations, the wearable multimedia device 101 can present information by projecting light onto one or more of the objects 1404. For example, the wearable multimedia device 101 can render text, images, videos, colors, patterns, and/or any other graphical information on one or more of the objects 1404 (e.g., to present information on and/or alongside the objections 1404). In some implementations, the wearable multimedia device 101 can project light in such a way to emphasize or accentuate one or more objects from other objects (e.g., by selectively highlighting a subset of the objects with light).

In some implementations, the wearable multimedia device 101 can present information to a user by outputting sound. For example, using the speaker 828, the wearable multimedia device 101 can output sound that includes speech, sound effects, tones, alerts, and/or any other sound to represent any of the information described herein.

In some implementations, the wearable multimedia device 101 can present information to a user by performing each of: projecting light onto the surface 1408 (e.g., to generate the virtual interface 1406), projecting light onto the object 1004, rendering a graphical user interface 1410 (e.g., using the touch surface 846), and outputting sound using the speaker 828. In some implementations, the wearable multimedia device 101 can present information to a user by performing a subset of: projecting light onto the surface 1408 (e.g., to generate the virtual interface 1406), projecting light onto the object 1404, rendering a graphical user interface 1410 (e.g., using the touch surface 846), and/or outputting sound using the speaker 828.

In some implementations, a wearable multimedia device can capture sensor data regarding an object (e.g., images, videos, audio, etc.) at a particular time, and perform at least some of the operations described herein sometime in the future. For example, the user can use the wearable multimedia device to capture an image or video of an object. Based the image or video, the wearable multimedia device can retrieve information regarding the object, identify alternative objects, identify additional objects, and/or perform any of the other operations described herein. Further, the wearable multimedia device can present results or outputs of the operations to the user in the future. For example, the wearable multimedia device can present results or outputs of the operations to the user the next time that the user interacts with the wearable multimedia device. As another example, the wearable multimedia device can present results or outputs of the operations to the user the next time that the wearable multimedia device detects that the user is interacting with, handling, or is otherwise in the presence of the object. As another example, the wearable multimedia device can present results or outputs of the operations to the user in the form of a notification (e.g., an alert message, sound, etc.) sometime in the future. As another example, the wearable multimedia device can present results or outputs of the operations to the user the next time that the user interacts with, handles, or otherwise in the presence of the object. As another example, the wearable multimedia device can present results or outputs of the operations to the user on a web page, which can be accessed retrieved using the wearable multimedia device or some other electronic device (e.g., using a web browser or some other suitable application).

Although several example operations are described herein in the context of object detection, in some implementations, a wearable multimedia device can perform at least some operations, regardless of whether the wearable multimedia device detects an object. For instance, in some implementations, a wearable multimedia device can function as a personal assistant for a user to aid in the user in organizing and reviewing messages and events.

As an example, a wearable multimedia device can access data regarding a user's communications with other users. Further, a wearable multimedia device can access data regarding a user's past, present, and/or planned events. The user can request that the wearable multimedia device summarize those communications and/or events, such that the user can be brought up to speed (e.g., by uttering the command "catch me up"). In response, the wearable multimedia device can generate a summary of those communications and/or events, and present at least a portion of the summary to the user (e.g., by outputting synthesized speech, presenting information graphically using a projector subsystem 832 and/or display screen, etc.).

In some implementations, the wearable multimedia device can access data regarding a user's past, present, and/or planned events by retrieving information from the user's calendars (e.g., a calendar stored on the wearable multimedia device and/or a calendar stored on a remote server). For instance, the wearable multimedia device can access data regarding the events that the user previously attended, the events that the user is currently attending, and/or the events that a user plans on attending the future.

In some implementations, the wearable multimedia device can access data regarding a user's communications between the user and one or more other users. For instance, the wearable multimedia device can access content such as the user's emails, text messages, chat messages, social media posts, call transcripts, call recordings, voicemails, call logs, and/or any other record of a user's communications with others.

Further, the wearable multimedia device can generate a summary of the user's communications and/or events. For instance, the wearable multimedia device can determine that the user has been in a meeting, and can identify events that occurred while the user was in the meeting. Further, the wearable multimedia device can identify messages that the user received while he was in the meeting (e.g., messages that the user was unable to review while he was in the meeting). Further, the wearable multimedia device can identify upcoming events that the user is planning on attending. The wearable multimedia device can notify the user of these events and/or messages (e.g., using synthesized speech, a graphical user interface, etc.).

As an example, while a user was in a meeting, the user received a first message from her partner Bob suggesting that they reschedule their upcoming dinner plans, and a second message from her child Cindy asking about a planned soccer match this weekend. Further, wearable multimedia device determines that the user has a second meeting scheduled for tomorrow with her coworker Dan. Upon exiting the meeting, the user asks the wearable multimedia device to "catch me up." In response, the wearable multimedia device generates and outputs a summary of these messages and events. For example, the wearable multimedia device can generate synthesized speech indicating that "You have a meeting tomorrow morning at 9 AM with Dan, Bob would like to reschedule your upcoming dinner plans, and Cindy is asking about this weekend's soccer match." As another example, the wearable multimedia device can display a graphical user interface (e.g., using the projector subsystem 832 and/or a display) that includes a summary of the messages and events (e.g., by presenting an order list of text, icons, etc. to represent the messages, the events, the user's contacts, etc.).

In some implementations, the wearable multimedia device can identify and prioritize information based on machine learning. For example, the wearable multimedia device can receive feedback from the user regarding the user's preferences (e.g., the types of information that the user would like to prioritize in particular contexts). Based on this information, the wearable multimedia device can use machine learning to identify patterns, trends, or characteristics that indicate that a user would prefer to prioritize certain types of information, given a particular context. Further, the wearable multimedia device can present and prioritize information to the user in future based on these determinations.

Example contexts include the types of messages that were received by the user, the contents of those messages, and/or the sender of those messages. Further example contexts include the time of day, day of week, and/or date. Further example contexts include the past, present, and/or planned future locations of the user. Further example contexts include the weather at the user's past, present, and/or future locations. Further example contexts include the types of activities that were previously performed by the user, the types of activities that are currently being performed by the user, and/or the types of activities that the user is planning on performing in the future.

In some implementations, the wearable multimedia device can use machine learning adapt to the user's preferences over time. For example, based on the user's feedback, the wearable multimedia device can determine the types of information that the user would like to prioritize in a summary, and continuously adjust its operations to account for changes in the user's preferences over time.

In some implementations, the wearable multimedia device can filter the messages that are sent to a user by others, and present a subset of the messages to the user for review. For example, the wearable multimedia device can present message that are more likely to be important to the user, and refrain from presenting other messages to the user by default. This can be beneficial, for example, in focusing the user's attention on messages that are more likely to be important to the user, without overwhelming the user with a large number of unimportant messages. The filter can be implemented using machine learning (e.g., to adapt to the user's preferences over time based on user feedback).

In some implementations, a user can instruct the wearable multimedia device to always present messages from a particular contact, such as a spouse, a work colleague, or a close friend. This can be beneficial, for example, in reducing the likelihood that the user will miss an important message.

Although several example operations are described herein primarily with respect to a wearable multimedia device, in practice, some or all of the operations described herein can be performed by a smart phone, tablet computer, laptop, or any other electronic device, either instead of or in conjunction with the wearable multimedia device. Further, at least some of the operations can be performed at least in part by a remote system (e.g., a cloud computing system, remote server, etc.), and data regarding the performance of the operations can be transmitted to a wearable multimedia device, smart phone, tablet computer, laptop, and/or any other electronic device for further processing and/or presentation to a user.

In some implementations, the wearable multimedia device 101 can perform at least some of the operations described herein using one or more machine learning processes. As an example, the wearable multimedia device 101 can include one or more neural networks that are trained to identify objects based on particular combinations of sensor data. As an example, the wearable multimedia device 101 can include one or more neural networks that are trained to identify and prioritize messages and events based on particular contexts of use.

Figure 15:
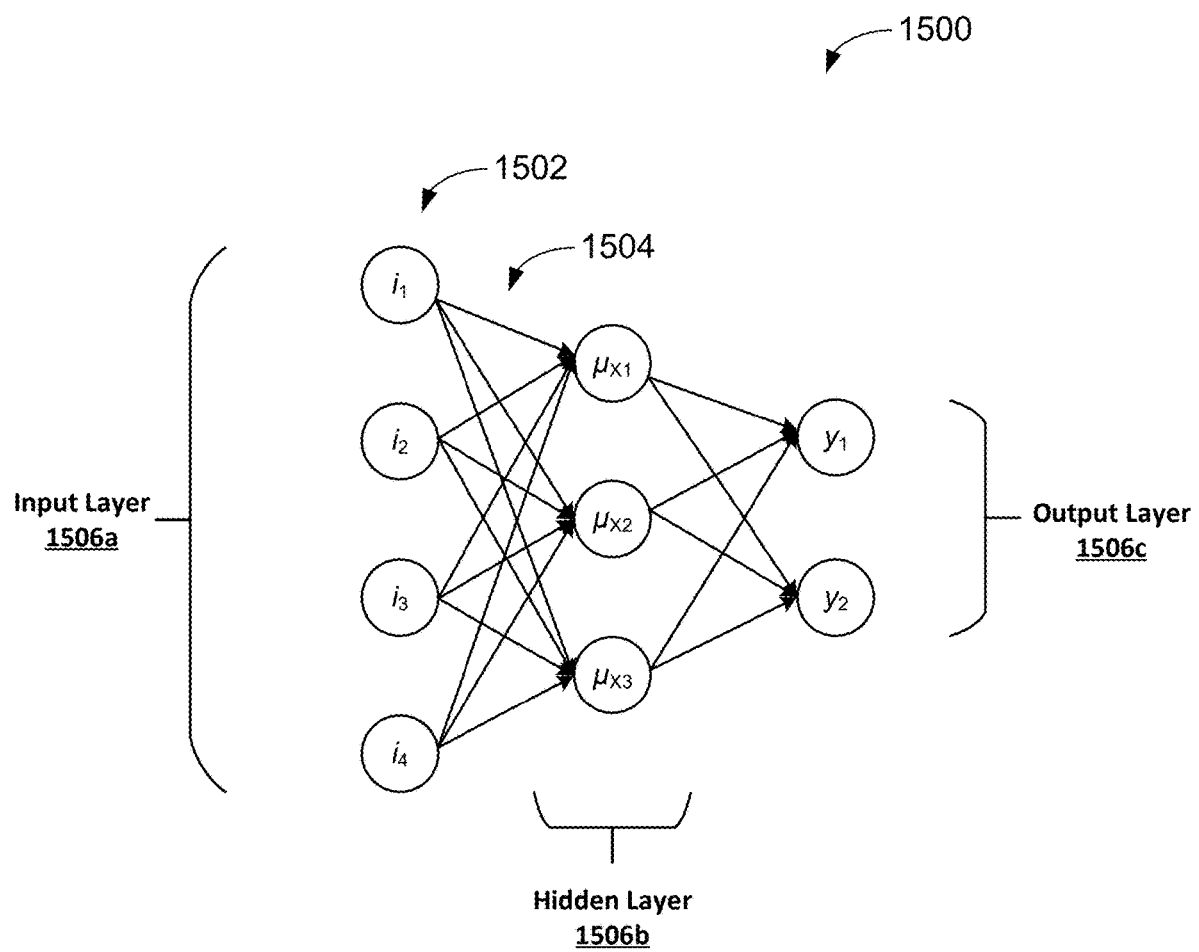
FIG. 15 is a diagram of an example neural network.

A simplified example of a neural network 1500 is shown in FIG. 15.

The neural network 1500 includes several nodes 1502 (often called "neurons") interconnected with another by interconnections 1504. Further, the nodes 1502 are arranged according to multiple layers, including an input layer 1506a, a hidden layer 1506b, and an output layer 1506c. The arrangement of the nodes 1502 and the interconnections 1504 between them represent a mathematical transformation of input data (e.g., as received by the nodes of the input layer 1506a) into corresponding output data (e.g., as output by the nodes of the output layer 1506c). In some implementations, the input data can represent one or more data points obtained by the wearable multimedia device 101 (e.g., sensor data, event data, message data, contextual data, etc.), and the output data can represent corresponding objects detected by the wearable multimedia device 101 and/or a prioritization of information for presentation to a user.

The nodes 1502 of the input layer 1506a receive input values and output the received input values to respective nodes of the next layer of the neural network 1500. In this example, the neural network 1500 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 1504).

In some implementations, at least some of the sensor data, message data, event data, and/or contextual data described herein can be used as inputs for the nodes of the input layer 1506a. For example, at least some of this data can be expressed numerically, and input into the nodes of the input layer 1506a.

The nodes of the hidden layer 1506b receive input values (e.g., from the nodes of the input layer 1506a or nodes of other hidden layers), applies particular transformations to the received values, and outputs the transformed values to respective nodes of the next layer of the neural network 1500 (e.g., as indicated by the interconnections 1504). In this example, the neural network 1500 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 1506b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n}(\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 1506c receive input values (e.g., from the nodes of the hidden layer 1506b) and output the received values. In some implementations, nodes of the output layer 1506c can also receive one or more input values, and transform the one or more received values according to a mathematical transfer function (e.g., in a similar manner as the nodes of the hidden layer 1506b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, at least some of the nodes of the output layer 1506c can correspond to a likelihood that a particular object was detected. For example, one of the nodes of the output layer 1506c can correspond to a likelihood that a first object was detected (e.g., based on the input data), another one of the nodes of the output layer 1206c can correspond to a likelihood that a second object was detected has occurred (e.g., based on the input data), and so forth.

In some implementations, at least some of the nodes of the output layer 1506c can correspond to a likelihood that a particular event or message is important to a user and/or a relative importance of that event or message. For example, one of the nodes of the output layer 1506c can correspond to a likelihood that a first message or event is important to a user and/or a relative importance of that first message or event (e.g., based on the input data), another one of the nodes of the output layer 1206c can correspond to a likelihood that a second message or event is important to a user and/or a relative importance of that second message or event (e.g., based on the input data), and so forth.

In this example, the neural network 1500 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 1500.

Although FIG. 15 shows example nodes and example interconnections between them, this is merely an illustrative example. In practice, a neural network can include any number of nodes that are interconnected according to any arrangement. Further, although FIG. 15 shows a neural network 1500 having a single hidden layer 1506*b*, in practice, a neural network can include any number of hidden layers (e.g., one, two, three, four, or more), or none at all.

Figure 16:
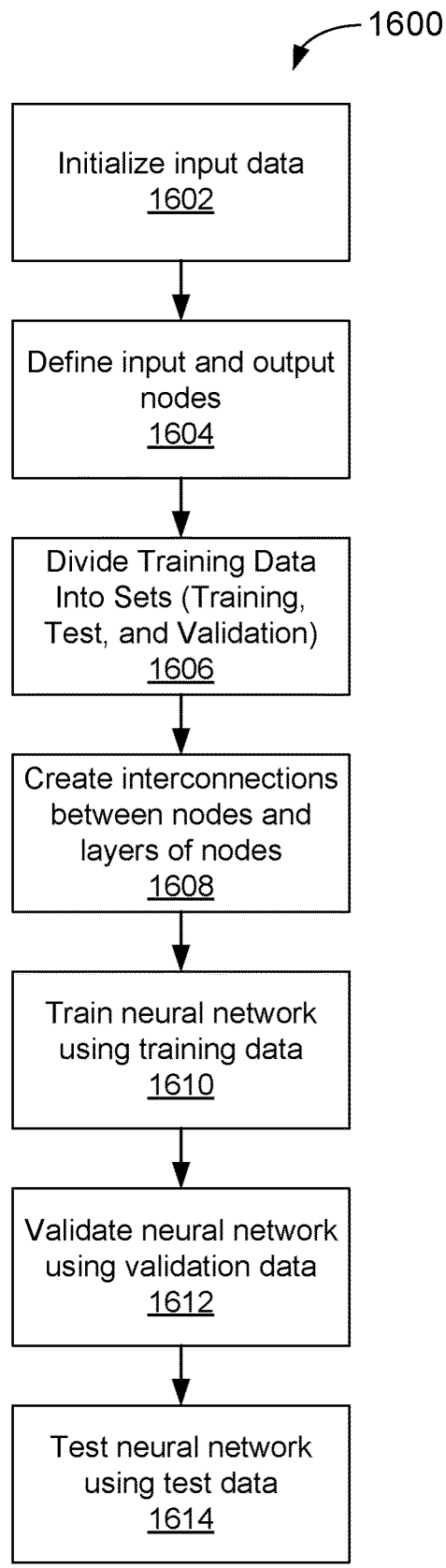
FIG. 16 is a diagram of an example process for training a neural network.

In some implementations, the neural network 1500 can be trained based on training data. An example process 1600 for training the neural network 1500 is shown in FIG. 16.

According to the process 1600, the system 1100 initializes the input data that is used to train the neural network 1500 (block 1602). As an example, the system 1100 can retrieve one or more sets input data regarding the user, the wearable multimedia device 101, an environment of the wearable multimedia device, the user's events, and/or that user's messages. Further, the system 1100 can retrieve data indicating the objects that were present during the time that the input data was acquired. Further, the system 1100 can retrieve data indicating the priority and/or importance of the events and messages to the user. In some implementations, the training data may be referred to as "ground truth" data (e.g., sets of input data and corresponding object, event, and message data that are known to be accurate).

Further, the system 1100 defines the input and the output nodes of the neural network 1500 (block 1604). For example, the system 1100 can select one or more of the types of data included in the training data, and specify that they be used as respective input nodes in the neural network 1500 (e.g., as inputs for respective nodes of the input layer 1506*a*). As another example, the system 1100 can specify each of the outputs of the neural network 1500 (e.g., the outputs of each of the nodes of the output layer 1506*c*).

The system 1100 divides the training data into different sets (block 1606). For example, the training data can be divided into a training set, a validation set, and a test set.

The training set can be used to train the neural network 1500. For example, the training set can be used to identify patterns, trends, or correlations between the inputs and the outputs of the neural network 1500, and to express those relationships using the nodes and interconnections between them.

The validation set can be used to tune the performance of the trained neural network 1500. For example, the validation set can be used to determine a difference between the output of the neural network 1500 given certain inputs, and an expected output. The configuration of the neural network can be modified based on the different (e.g., such that the output of the neural network 1500 better matches the expected result).

The test set can be used to evaluate the performance of the trained neural network 1500 (e.g., after it has been tuned based on the validation set). For example, the test set can be used to determine a difference between the output of the neural network 1500 given certain inputs, and an expected output. This difference can indicate the ability of the neural network 1500 to accurately predict a particular outcome (e.g., the detection of a particular event that is occurring) given particular inputs (e.g., particular input data).

Further, the system 1100 creates interconnections between the nodes and layers of nodes in of the neural network 1500 (block 1608). In some implementations, an interconnection between two or more nodes can be in the forward direction (e.g., data can be passed between nodes in the direction of the input to the output of the neural network 1500). This may be referred to as a "feed forward" interconnection. In some implementations, an interconnection between two or more nodes can be in the backward direction (e.g., data can be passed between nodes in the direction of the output to the input of the neural network 1500). This may be referred to as a "back propagation" interconnection.

Further, the system 1100 creates layers of nodes. For example, the system 1100 can specify that the neural network include N layers of nodes, such as one input layer, one output layer, and N−2 hidden layers. Other arrangements of layers are also possible, depending on the implementation.

Further, the system 1100 trains the neural network 1500 using the training set (block 1610). In some implementations, the system 1100 can perform the training based on a supervised learning method. As an example, the training set can include example input data and output data. Based on the arrangement of the nodes and the interconnections between them, the system 1100 can identify transfer functions for each of the nodes that would result in the output of the neural network 1500 matching or otherwise being similar to the output data in the training set, given the same input data. In some implementations, the system 1100 can select particular weights or biases for each of the transfer functions. In some implementations, this can be performed iteratively (e.g., using successive sets of training data).

After training the neural network 1500, the system 1100 validates the neural network 1500 using the validation set (block 1615). As an example, the validation set can include example input data and output data. The system 1100 can input the input data into the neural network 1500, and compare the output of the neural network 1500 to the output data of the validation set. In some implementations, the system 1100 can calculate an "error" of the neural network 1500, such as the difference between the output data of the validation set and the output of the neural network 1500.

In some implementations, the system 1100 can tune the neural network 1500 based on the validation set. For example, the system 1100 can modify the arrangement of the nodes, the interconnections between them, and/or the transfer functions (e.g., the weights and biases) such that the error of the neural network 1500 is reduced.

In some implementations, this can be performed iteratively (e.g., using successive sets of validation data) until particular criteria are met. For example, in some implementations, the system 1100 can iteratively tune the neural network 1500 until the error of the neural network 1500 is less than a particular threshold value. As another example, the system 1100 can iteratively tune the neural network 1500 until the neural network 1500 exhibits a sufficiently low false positive rate and/or a sufficiently low false negative rate.

After training and tuning the neural network 1500, the system 1100 tests the neural network 1500 using the test set (block 1614). As an example, the test set can include example input data and output data. The system 1100 can input the input data into the neural network 1500, and compare the output of the neural network 1500 to the output data of the test set. In some implementations, the system 1100 can calculate an "error" of the neural network 1500, such as the difference between the output data of the test set and the output of the neural network 1500. This error can represent the predictive performance of the neural network 1500. For example, a high error can indicate that the neural network 1500 is not likely to predict an outcome accurately, given certain input data. Conversely, lower error can indicate that the neural network 1500 is likely to predict an outcome accurately, given certain input data.

Although example neural networks are provided, other types of machine learning system can be used to implement some or all of the techniques described herein, either instead of our in addition to neural networks. Example machine learning systems include decision tree systems, support-vector machines, regression analysis systems, Bayesian networks, and genetic algorithms, among others.

Example Generative AI Engines

In some implementations, the wearable multimedia device 101 can perform at least some of the operations described herein using a machine learning system that includes a generative artificial intelligence (AI) engine (e.g., an AI engine implementing a large language model). In general, the generative AI engine is a deep learning model that operates according to the principle of self-attention (e.g., a computer-specific technique that mimics cognitive attention). For example, the generative AI engine differentially weighs the significance of each part of an input (which includes the recursive output) data, and uses one or more attention mechanism to provide context for any position in the input sequence.

A generalized architecture of a generative AI engine is described below.

Input:

In general, input data strings are parsed into tokens (e.g., by a byte pair encoding tokenizer). Further, each token is converted via a word embedding into a vector. In some implementations, positional information of the token can be added to the word embedding.

Encoder/Decoder Architecture:

In general, a generative AI engine includes a decoder. Further, in some implementations, the generative AI engine can also include an encoder. An encoder includes one or more encoding layers that process the input iteratively one layer after another, while the decoder includes one or more decoding layers that perform a similar operation with respect to the encoder's output.

Each encoder layer is configured to generate encodings that contain information about which parts of the inputs are relevant to each other and passes these encodings to the next encoder layer as inputs. Each decoder layer performs the functional opposite, by taking all the encodings and using their incorporated contextual information to generate an output sequence. To achieve this, each encoder and decoder layer can make use of an attention mechanism.

For each part of the input, an attention mechanism weights the relevance of every other part and draws from them to produce the output. Each decoder layer has an additional attention mechanism that draws information from the outputs of previous decoders, before the decoder layer draws information from the encodings.

Further, the encoder and/or decoder layers can have a feed-forward neural network for additional processing of the outputs and contain residual connections and layer normalization steps.

As an example, one or more attention mechanism can be configured to implement scaled dot-product attention. For instance, when an input data string is passed into the generative AI engine, attention weights can be calculated between every token simultaneously. An attention mechanism can produce embeddings for every token in context that contain information about the token itself along with a weighted combination of other relevant tokens each weighted by its attention weight.

For each attention unit, the generative AI engine learns three weight matrices; the query weights $W_Q$, the key weights $W_K$, and the value weights $W_V$. For each token i, the input word embedding $x_1$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training, and passed through a softmax which normalizes the weights. The fact that $W_Q$ and $W_K$ are different matrices allows attention to be non-symmetric: if token j (e.g., $q_i \cdot k_j$ is large), this does not necessarily mean that token j will attend to token i (e.g., $q_j \cdot k_i$ could be small). The output of the attention unit for token i is the weighted sum of the value vectors of all tokens, weighted by $a_{ij}$, the attention from token i to each token.

The attention calculation for all tokens can be expressed as one large matrix calculation using the softmax function, which is useful for training due to computational matrix operation optimizations that quickly compute matrix operations. The matrices Q, K, and V are defined as the matrices where the ith rows are vectors $q_i$, $k_i$, and $v_i$, respectively. Accordingly, attention can be presented as:

$$\text{Attention}(Q, K, V) = \text{softmax}\left(\frac{QK^T}{\sqrt{d_k}}\right)V$$

where softmax is taken over the horizontal axis.

In general, one set of ($W_Q$, $W_K$, $W_V$) matrices may be referred to as an attention head, and each layer in a generative AI engine can have multiple attention heads. While each attention head attends to the tokens that are relevant to each token, with multiple attention heads the model can do this for different definitions of "relevance."

In addition, the influence field representing relevance can become progressively dilated in successive layers. Further, the computations for each attention head can be performed in parallel, which allows for fast processing. The outputs for the attention layer are concatenated to pass into the feed-forward neural network layers.

Encoder:

In general, encoder can include two major components: a self-attention mechanism and a feed-forward neural network. The self-attention mechanism accepts input encodings from the previous encoder and weights their relevance to each other to generate output encodings. The feed-forward neural network further processes each output encoding individually. These output encodings are then passed to the next encoder as its input, as well as to the decoders.

The first encoder takes positional information and embeddings of the input sequence as its input, rather than encodings.

The encoder is bidirectional. Attention can be placed on tokens before and after the current token.

A positional encoding is a fixed-size vector representation that encapsulates the relative positions of tokens within a target sequence.

The positional encoding is defined as a function of type $f$: $\mathbb{R} \to \mathbb{R}^d$; $d \in \mathbb{Z}$, $d>0$, where d is a positive even integer. The full position encoding can be represented as follows:

$$(f(t)_{2k}, f(t)_{2k}+1) = (\sin(\theta), \cos(\theta)) \forall\, k \in \{0, 1, \ldots, d/2-1\}$$

$$\text{where } \theta = \frac{t}{r_k},\, r = N^{2/d}.$$

Here, N is a free parameter that is significantly larger than the biggest k that would be input into the positional encoding function.

This positional encoding function allows the generative transformation model to perform shifts as linear transformations:

$$f(t+\Delta t) = \mathrm{diag}(f\Delta t))f(t)$$

where $\Delta t \in \mathbb{R}$ is the distance one wishes to shift. This allows the transformer to take any encoded position, and find the encoding of the position n-steps-ahead or n-steps-behind, by a matrix multiplication.

By taking a linear sum, any convolution can also be implemented as linear transformations:

$$\sum_j c_j f(t + \Delta t_j) = \left(\sum_j c_j \mathrm{diag}(f(\Delta t_j))\right) f(t)$$

for any constants $c_j$. This allows the transformer to take any encoded position and find a linear sum of the encoded locations of its neighbors. This sum of encoded positions, when fed into the attention mechanism, would create attention weights on its neighbors, much like what happens in a convolutional neural network language model.

Although an example positional encoding technique is described above, in practice, other positional encoding techniques can also be performed, either instead or in addition to those described above. Further, in some implementations, the generative AI engine need not perform positional encoding.

Decoder:

Each decoder includes three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention.

Like the first encoder, the first decoder takes positional information and embeddings of the output sequence as its input, rather than encodings. The transformer does not use the current or future output to predict an output, so the output sequence is partially masked to prevent this reverse information flow. This allows for autoregressive text generation. For all attention heads, attention cannot be placed on following tokens. The last decoder is followed by a final linear transformation and softmax layer, to produce the output probabilities.

Additional information regarding generative AI engines can be found in "Attention Is All You Need," arXiv: 1706.03762 by Vaswani, et al., the contents of which are incorporated herein in their entirely.

Additional Example Uses of Object Recognition

In some implementations, a user can hold an object and instruct an electronic device (e.g., wearable multimedia device, smartphone, tablet, etc.) to identify the object and to perform one or more operations, such as:

Immediately purchase the object.
  For example, the user can say "buy this and send it to my home address using my visa credit card.
    The user can also specify another address, such as a friend's address.
    The user can also specify a different card.
    The electronic device can use a default address and card (e.g., if none are specified in the speech).
  The electronic device can identify the object (e.g., by itself and/or using a third party computer vision object recognition provider).
    The electronic device can find similar objects or the exact make/model, and can conduct a transaction to purchase the object (e.g., through an online retailer).
    The electronic device can compare prices for the item between different retailers
Add an object to an existing shopping cart of an online retailer (e.g., such that the user can manually purchase the object).
Add the object to a wish list of an online retailer.
Generate an access link (e.g., a Uniform Resource Locator, URL) to access the object on an online retailer's website, and sending the access link to another user.
Assist the user with shopping:
  The user can point the camera of the electronic device towards a piece of clothing, and ask for similar pieces of clothes and/or add to a curation for an outfit
  The user can ask the electronic device for similar pieces of clothing (e.g., a better price, or to explore other options).
  The user could hold a piece of clothing in front of the electronic device, and ask the electronic device other pieces of clothing that could complete an outfit (e.g., by holding a shirt, and asking for matching pants).
  The user can point the camera of the electronic device had any object, including clothing, furniture, vehicles, personal items, wares, or any other physical goods.
  The user can specify criteria (e.g., criteria regarding price, shipping time, eco-friendly rating, and/or any other criteria), and instruct the electronic device to find products satisfying the criteria (e.g., "find a couch similar to this one that fits within my budget.")
  The user can specify a similar style, but different attributes (e.g., "find me this in red.")
  The user can ask for a product having a different size (e.g., "Do they have this in any other sizes?")
  The user can ask whether the object will fit in a particular space or other context having a known sizing (e.g., "will this table fit in my dining room?")
    The electronic device can use a three-dimensional camera to obtain volumetric information about the space and the object itself).
  The electronic device can identify that a product is subject to a recall or service alert, and proactively notify the user regarding the recall or service alert (e.g., even if the user did not expressly request this information).
Enable a user to interrogate an object by simply asking questions, and without requiring that the user expressly specify the object.
  For example, a user can ask the electronic device for a price comparison of an object.
    "How much is this at Store A?"
    "Can I find better deals for this anywhere?"

As another example, the user can ask the electronic for a shipping estimation.

"How long would it take for Store A to send this to me?"

As another example, the user can ask the electronic device whether to purchase the object at an online retailer (if the user is in a physical store).

"Should I just get this at Store A?"

As an example, the electric device can compare the in store price at the physical store to the price at the online retailer, determine the shipping time for obtaining the object at the online retailer, compare the quality of the product at the physical store to the quality of the product at the online retailer, etc.

As another example, the user can ask the electronic device to perform a review analysis of the object.

"Do people like this?"

"What are people saying?"

As another example, the user can ask the electronic device for product comparison.

For example, the electronic device can show two objects and indicate which object is better for the user.

Enable a user to obtain further information regarding an object.

For example, the user can hold an object in front of the electronic device and/or direct the electronic device towards the object, and ask "what color is this object?" The electronic device can determine the color of the object based on sensor data, and indicate the color to the user.

As another example, the user can hold two objects in front of the electronic device (e.g., articles of clothing), and "do these objects go together?" The electronic device can determine whether the objects match (e.g., have colors that complement or otherwise match each other), and indicate the answer the user.

As another example, the user can hold an object in front of the electronic device and/or direct the electronic device towards the object, and ask "what material is this object?" The electronic device can determine the material of the object based on sensor data and indicate the material to the user. In some implementations, the electronic device can determine the material of the object based on the appearance of the object (e.g., by determining a texture of the object, and determining a material having that texture). In some implementations, the electronic device can determine the material of the object by identifying the object based on the sensor data, and retrieving information (e.g., from the Internet or other network) regarding the composition of that object.

As another example, the user can hold an object in front of the electronic device and/or direct the electronic device towards the object, such as a picture frame, and ask "is this object straight?" or "is this object aligned? Or "is this object level?" Based on the sensor data, the electronic device can determine the straightness, alignment, or levelness of the object (e.g., relative to the floor and/or the direction of gravity), and indicate the answer to the user.

Enable a user to compare two or more products.

As an example, the user can hold multiple objects in front of the electronic device and/or direct the electronic device towards multiple objects, and ask "which of these objects is better for X?" or "which object should I use for X?" (where "X" is a particular task). The electronic device can determine which of the objects is the most suitable for the specified task, and indicate the answer to the user. In some implementations, the electronic device can make this determination by identify each of the objects (e.g., using the sensor data), determine the purpose of each of the objects (e.g., based on data retrieved from the Internet or other network regarding each of the objects), and identify the object that is more suitable for the specified task. In some implementations, the electronic device can retrieve product reviews regarding each of the products (e.g., product reviews stored on the Internet or other network), and identify the product with the best reviews.

As another example, the user can hold multiple objects in front of the electronic device and/or direct the electronic device towards multiple objects, and ask "which of these object is newer?" or "which of these objects is older?" or "which of these objects is fresher?" The electronic device can determine which of the objects is the newest, oldest, or freshest, and indicate the answer to the user. In some implementations, the electronic device can make this determination by identifying date information on each of the objects (e.g., a date printed or written on the object, such as a manufacturing date, expiration date, "best by" date, or other data information), and selecting the newest, oldest, or freshest object based on the date information. In some implementations, the electronic device can make this determination based on an analysis of the sensor data (e.g., identifying the object that has particular visual characteristics, such as a particular color, texture, or shape) that indicates the age or freshness of the object.

Enable a user to obtain information regarding a business.

For example, the user can direct the electronic device towards the sign of a business (e.g., a store, restaurant, etc.), and ask "is this business open?" The electronic device can determine which of the objects is the newest, oldest, or freshest, and indicate the answer to the user. Using the sensor data, the electronic device can identify the business associated with the sign (e.g., based on optical character recognition, image recognition, etc.). Further, the electronic device can retrieve the operating hours of the business (e.g., from the Internet or other network) and present the answer to the user.

Assist the user in understanding a scene.

For example, the user can direct the electronic device towards a sign, and ask "what does this say?" Using the sensor data, the electronic device can determine the contents of the sign (e.g., based on optical character recognition, image recognition, etc.), and present the contents to the user.

As another example, the user can direct the electronic device towards a particular scene, and say "describe the scene in front of me." Using the sensor data, the electronic device can determine information regarding the scene, and present the information to the user. For instance, the electronic device can determine one or more objects, people, and/or animals in the scene. As another example, the electronic device can determine one or more activities being performed in the scene (e.g., by the people and/or animals). As another example, the electronic device can determine a location of the scene. As another example, the electronic device can determine the weather in the scene.

As another example, the user can direct the electronic device towards a particular scene, and ask "did I clean up the mess completely?" or "did I pick up all of the objects?" Using the sensor data, the electronic device can determine whether any stains, misplaced objects, spills, etc. are in the scene, and present the information to the user (e.g., whether any stains, misplaced objects, spills, etc. are present, and if so, the location of those stains, misplaced objects, or spills). In some implementations, the electronic device can make this determination by analyzing the sensor data, and using image recognition to identify stains, misplaced, objects, spills, etc. in the scene.

As another example, the user can direct the electronic device towards a particular scene, and ask "how many of object X are there?" Using the sensor data, the electronic device can determine the number of objects X in the scene (e.g., using image recognition), and indicate the answer to the user. In some implementations, the user can ask the electronic device to count objects in a particular area or location (e.g., on a table), and the electronic device can limit the detection and counting of objects to the specific area or location.

Assist the user in generating content.

For example, the user can direct the electronic device towards a particular scene, and ask the electronic device to generate text (e.g., text description, a poem, etc.), image content, video content, and/or audio content regarding the scene. Using the sensor data, the electronic device can determine characteristics of the scene (e.g., via image recognition), and generate content based on those characteristics. In some implementations, the electronic device can generate content using a generative AI system, such as a large language model.

As another example, the user can direct the electronic device towards a painting, and ask the electronic device to generate a vivid description of the painting. Using the sensor data, the electronic device can determine characteristics of the painting (e.g., via image recognition), and generate a description based on those characteristics. In some implementations, the electronic device can generate the description using a generative AI system, such as a large language model.

As another example, the user can direct the electronic device towards an object, and ask the electronic device to generate a story regarding that object. Using the sensor data, the electronic device can determine characteristics of the object (e.g., via image recognition), and generate a story based on those characteristics. In some implementations, the electronic device can generate the story using a generative AI system, such as a large language model.

In some implementations, an electronic device can obtain health data regarding a user (e.g., health of the user, nutrition goals, etc.), and recommend food products to the user and/or answer questions from the user. For example, the electronic device can detect a food item, and answer questions such as:

"Does this fit my diet plan?"

"Will this put me over my budget?"

"Am I allergic to this?"

In some implementations, the electronic device can facilitate a user checking out at a grocery store. For example:

An electronic device can detect and identify all of the items that the user has placed in her shopping cart, ask the user to confirm that she retrieved all of her desired items, and automatically complete a transaction for the items. The user can leave the store without manually conducting a transaction (e.g., without manually providing a payment information, interacting with a store clerk, etc.).

An electronic device can facilitate transaction in a physical retailer that does not include any store clerks to manually process transactions.

Eventually we want to be your checkout experience at grocery stores (whole foods)

In some implementations, an electronic device can identify product that are examined and/or purchased by a user over time, detect patterns or trends, and suggest products for purchase by the user based on the patterns or trends.

For example, an electronic device can obtain sensor information regarding each time that a user brushes her teeth, and suggest to the user that she purchase additional toothpaste when her supply is running low. In some implementations, the electronic device can estimate when her supply of toothpaste is running low (e.g., based on historical usage data).

As another example, the electronic device can determine what kinds of clothing are in the user's possession. If the user has a trip to a location with weather for which her clothing may be unsuitable, the electronic device can suggest that the user purchase additional clothing that is more suitable for the weather. For instance, if the user is travelling to Florida, but did not pack for a rainstorm, the electronic device can suggest that the user purchase a raincoat).

In some implementations, some or all of the operations described herein can be performed by the electronic device while the user is interacting with an object (e.g., by holding the object in front of the electronic device).

In some implementations, the user can speak to the electronic device (e.g., ask the user spoken questions and/or issue spoken commands), and receive audio feedback from the electronic device (e.g., natural language feedback). In some implementations, the electronic device can provide the user with feedback using a projector (e.g., the projection subsystem 832).

In some implementations, some or all of the operations described herein can be performed by the electronic device while the user is no longer interacting with an object. For example, the user can obtain sensor data (e.g., images, videos, etc.) of an object using the electronic device, and save the sensor data on the electronic device for future interpretation. Subsequently, the user can instruct the electronic device to perform one or more of the operations described herein with respect the object (e.g., using the saved sensor data), even if the user is no longer presently holding the object.

In some implementations, an electronic device can detect and identify food that is consumed by a user, and track the nutrition provided by that food. For example, the electronic device can perform:

Passive food intake tracking

For example, the electronic device can track the nutritional value of the food consumed by the user and present a summary to the user.

The electronic device can break nutritional value into several categories, such as:
  Fibers
  Nutrients
  Vitamins
  Carbs
  Proteins
  Sugars
  Fats
  Calories
The electronic device can tag unhealthy intake, such as:
  Toxins
  Chemicals
Dietary restriction interrogation
  For example, the electronic device can help to prevent the user from eating things that she should not eat (e.g., for health or dietary reasons).
Eating goal tracking
  For example, the electronic device can track what the user is eating, determining whether the user is meeting certain eating goals (e.g., with respect to nutritional value), and assist a user in achieving those goals by suggesting that the user eat certain foods and/or amounts of those foods.
  In some implementations, the eating goals can be curated based on expert feedback.
Food intake logging and reporting
  For example, an electronic device can generate logs or reports of the food eaten by a user over time.
  Logs or reports can be categories by types of food.
  A user's progress towards eating goals can be tracked visually (e.g., using charts, graphs, rings, etc.).
  A user's progress can be tracked audibly (e.g., by outputting synthesized speech), such as in response to a user's request for such information.
  A user's progress can be tracked through a GUI on the device's projection display.
  A user's progress can be tracked on a webpage and retrieved using the electronic device or some other electronic device (e.g., using a web browser or some other suitable application).

Additional Health Operations:

In some implementations, the user can point an electronic device towards a food item, and provide spoken questions and/or commands to the electronic device with respect to the good item. Example use cases are outlined below:

"Can I eat this?" In response, the electronic device can tell the user if the item she is hold contains any allergens, recalled ingredients, or is inadvisable considering her eating goals.

"Remind me to avoid salt next time I'm out for dinner." In response, the electronic device can capture the goal, and add a contextual reminder (e.g., a reminder that notifies the user when she's at dinner and provides relevant information when she scans their food using the electronic device).

"I'm eating this." In response, the electronic device can keep a nutritional intake account for the user. Further, the electronic device can tell the user the effect of consumption on their dietary goals.

"What do I need to buy?" If the user has taken a picture of her refrigerator, the electronic device can suggest items that are missing or on short supply, or alternatives that encourage the user to meet her dietary goals.

"What ingredients are harmful?" In response, the electronic device can retrieve information regarding the ingredients of the food item, and search the ingredients for harmful substances.

"How many calories, ingredient, sugars?" In response, the electronic device can retrieve the requested information regarding the food item.

"What are some alternatives that I can eat?" In response, the electronic device can search for similar products that fit the user's dietary needs.

"Which one is better for me?" In response, the electronic device can detect multiple food items, and suggest the food item that is more consistent with the user's food goals. In some implementations, the electronic device can project light (e.g., using a projector subsystem 832) to visually identify the suggested food item.

"Why does my stomach hurt?" In response, the electronic device can cross reference the user's intake history with dietary restrictions, health conditions and general knowledge.

"What did I eat yesterday while I was at Sam's house?" In response, the electronic device can reference the user's eating intake inventory to provide an answer and use additional context information such as location or other data streams.

"You were more out of breath during your run today, here's why?" The electronic device can reference information from an activity stream such as breathing information and running pace, and compare the information to other known information such as sleep quality, air quality, nutritional intake, etc.

"What foods make me feel better?" The electronic device can use data on user activity, emotion, health reporting, feeling reporting, doctor visits, etc., and information regarding food intake, to calculate what foods affect the user more positively or negatively and propose suggestions through audio or visual feedback (e.g., laser projection).

"How much sodium is in this lemon?" Because the user has said "in this lemon" the device can be biased to increase recognition scores of lemons. If someone holds a tomato and say, "in this lemon," and the device is confident it is not a lemon, the device can say, "that's not a lemon, that's a tomato."

"Can I eat this?" The device will reference the user's AI profile to obtain their religious preferences and compare those preferences to certain holidays and time of day for dietary restrictions. For example, during Ramadan, if a user says, "can I eat this?", the device responds, "No, the sun has not set yet."

Manual Tracking

In some embodiments, the user specifically tells the electronic device that the user is going to ingest some food, medicine, liquid, etc. The user can tell the electronic device what they are eating and how much they are eating. The electronic device can also open the camera upon such a request to automatically recognize what the user is eating, how much, how quickly, etc. To gather all the information, it may also be a combination of all of the foregoing. The electronic device may also ask the user to complete more information if some information is left out. For example, this can happen in inflight, or via a notification, or next time the user opens a health application or other application on the electronic device. The user can also use the camera after the user has finished ingesting to let the electronic device know how much the user has consumed. This can also all happen when the user takes a photo, and the information is collected automatically via object recognition and/or manually questions asked by the electronic device.

Automatic Tracking

In some embodiments, using the 3D camera, hand tracking processing, 2D RGB camera, object recognition, microphones, accelerometers, etc., the electronic device can automatically detect the motion of a person picking up a cup, fork with food, medication, etc., and bringing the item to their mouth. During this process, the electronic device will use the sensors, e.g., the camera, to identify the type of food and object the user is consuming, how much they are consuming, how frequently, and any other metrics. The electronic device can potentially prevent a user from consuming items that are harmful to them by warning them before they consume the item. For example, if the user is about to eat a food item with an allergen, or if the device learns or detects that the food or drink is hot because it came out of, e.g., a microwave, the device can warn the user. The electronic device can also use the microphone to identify and capture the sound of swallowing to use as input to the tracking model and confirm that the user has ingested something. Additionally, if the user is about to eat dairy the device can warn the user before the user consumes that the user has not taking their Lactaid®.

Additional Sensor Information

In some embodiments, the 3D camera and other sensors can be used to calculate the size of the item a user is about to ingest and calculate other heuristics based on other information about the item. For example, knowing the density of an item, the weight can be calculated since the 3D camera can calculate the size and volume. The device can use caloric information to determine the number of calories consumed based on the size of the item.

In some embodiments, the device can use a microphone and accelerometer to capture other behaviors such as laughing, crying, wheezing, sneezing, coughing, and other respiratory behaviors. This information can later be used in conjunction with the rest to develop more insights.

For example, if a user asks, "why am I sneezing so much", the device could use context from weather services to determine that the pollen count is high. Or the device could use the user's photo history to determine that the user was around an animal (e.g., a cat), a plant, a food substance, an air born substance, etc., which the person is allergic to.

In some embodiments, other input can include how the user is controlling their volume, and the ambient noise in the environment. If over time the device notices a pattern of the user turning their volume up, but the ambient noise is not loud. The device can analyze the pattern to determine that the user's hearing may be deteriorating. This includes if the user is wearing headphones as well.

Additional Information Ingest

In some embodiments, the user at any time can tell the electronic device either via mic input on the device, or on a website, or any modality information about themselves. The device will automatically interpret the information and organize it for future reference. Such information could be "I'm not feeling well", "It hurts when I bend, I can't be bending anymore", "My head doesn't scratch anymore", "I prefer hip hop music", "I'm getting kind of tired of talking to Samantha", etc.

Connected Device and Services Information

In some embodiments, other third-party devices and services may connect to the device, an AI Bus (in the cloud), and other services to input more information. For example, a glucose monitor coupled to the device may input blood sugar levels. The data from such a glucose monitor can be used in conjunction with the food ingest tracking to help the user understand how different foods affect their metabolic system. Other connected devices and services could include heart rate monitors, activity trackers, workout equipment (treadmills at gyms), running social networks, etc.

Information from other devices and services can also be input manually by the user, Web site or other input mechanisms. For example, the user could take a picture of their scale, and the device automatically detects what the reading of their weight is and tracks the reading over time.

A user could also track height in a similar manner. If the user stands in front of the mirror and takes a photo, the device automatically measures their height. A height measurement can also be tracked using a sensor on the device such as the 3D camera, or altimeter/barometer, and the device can use that information in conjunction with other sensors such as the microphone, speaking volume, the accelerometers, gait walking analysis, etc., to calculate height.

Gait and Posture

In some embodiments, the device could also use the inertial measurement unit and other sensors on the device to measure the gait of a user, posture, etc., and alert the user either on the device, website, or another modality, to any changes, abnormalities, or corrections needed.

Emotion

In some embodiments, the device infers sentiment and emotion, specifically emotional wellbeing based on messages that the user is receiving, how they respond (or don't respond), how they view the messages (how long they review a message), what messages they send out, what they search online for, what text the are speaking into the device, etc. The device can also use the microphones to run tone analysis on the speech input of a user. The microphone can also be used to detect laughter, crying, and other non-speech sounds.

User Background Information

In some embodiments, the user may have previously input information about themselves that the device can reference in the future either by cloud services, device requests, system requests, or explicit user request. This information can include but is not limited to health information such as height, weight, allergies, etc. Other information can include, e.g., music and entertainment preferences, family information, writing style, any information the user wants the device to know about themselves, and any information the device may have inferred via data collection. For example, if the user runs once a day, the device may infer that the user is a runner and is an active person.

Sharing

In some embodiments, the user can elect to share their personal information, or a selected portion of the information can be shared with other services on a platform, or with other individuals such as healthcare professionals, family members etc. The user can also allow others to add information to the profile. For example, doctors can include specific health information, or the profile can be managed by another family member. One person could create an AI profile for someone else as well. For example, parents could create (and share) an AI profile for their children where they could be tracking food intake, medical intake, breastfeeding, activity, etc. Such a profile, or a subset of the profile information could later on be handed off to the child if the parents choose to do so.

Balance

The general goal of the health system is to give a user an understanding of how balanced their health is. At a high level this is done by looking at what the user is putting into their body versus what is being output. Inputs could include food intake, medication intake, television time, phone screen time, what emotional messages their receiving, etc. Outputs could include fitness, walking, running, what messages the user is sending, what the user is speaking into the device, what the user is searching etc. The user is then presented with visuals that portray their overall balance, and they can then learn more about each individual input/output, which themselves may be composed of sub balances/inputs/outputs.

Example Health Operations Use Case

FIGS. 17-32 illustrate an example health operation use case, according to some embodiments. In a first example, the user speaks "how much protein have I had today?"

Figure 17:
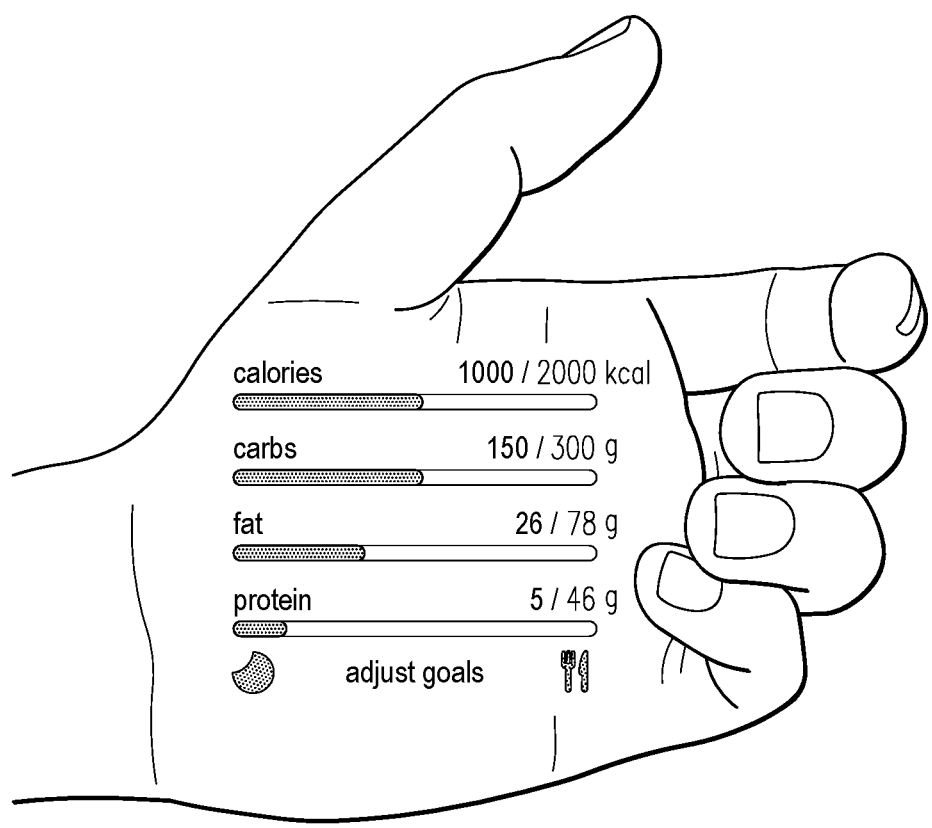
FIGS. 17-32 illustrate an example health assistance use case.

FIG. 17 shows a laser projection on the user's palm that shows calories, carbs fat and protein consumed. There is also an affordance the use can touch to adjust goals. The device determines this information based on a historical record of the user's consumption during the day, as described in detail above.

Figure 18:
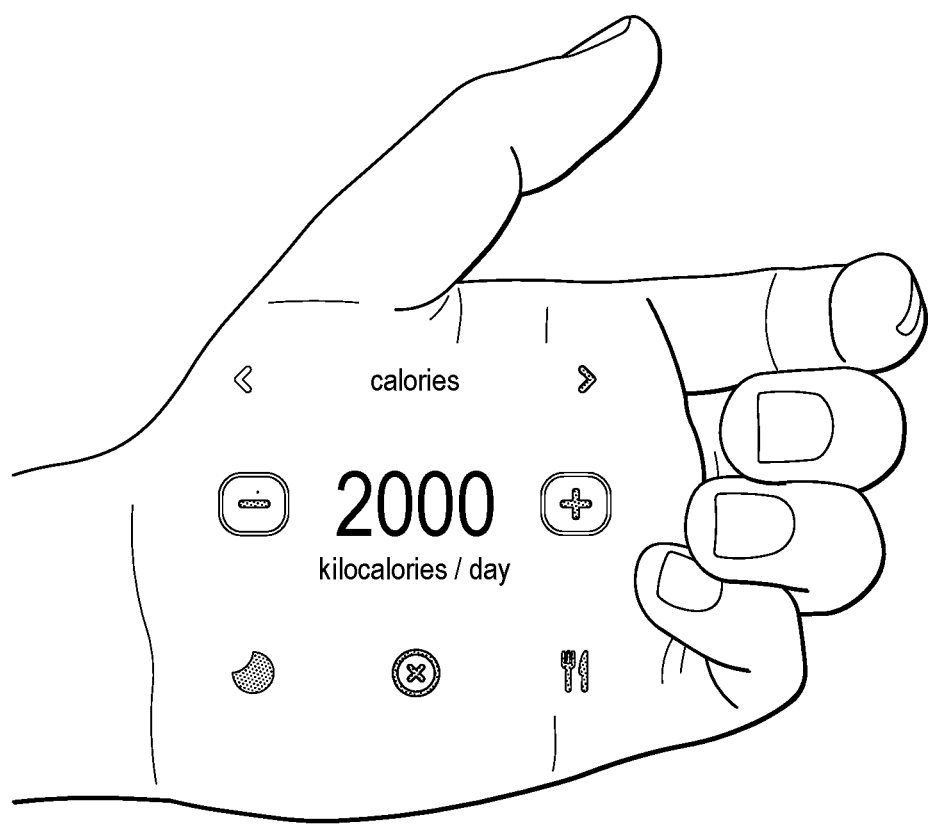
Figure 19:
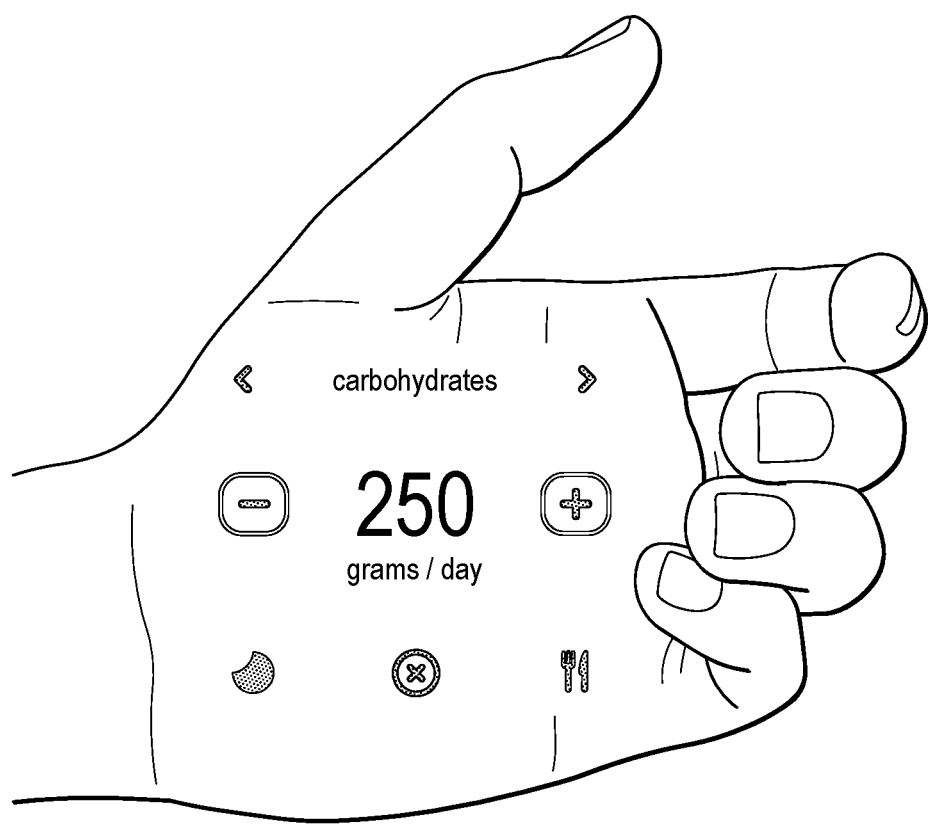
Figure 20:
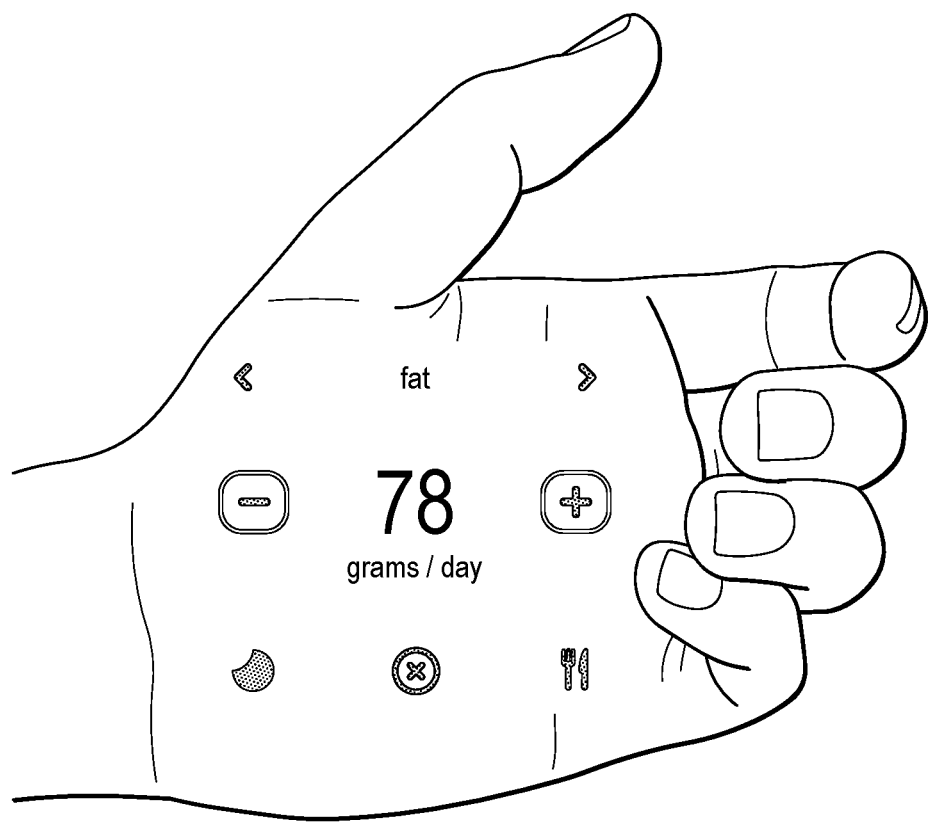
Figure 21:
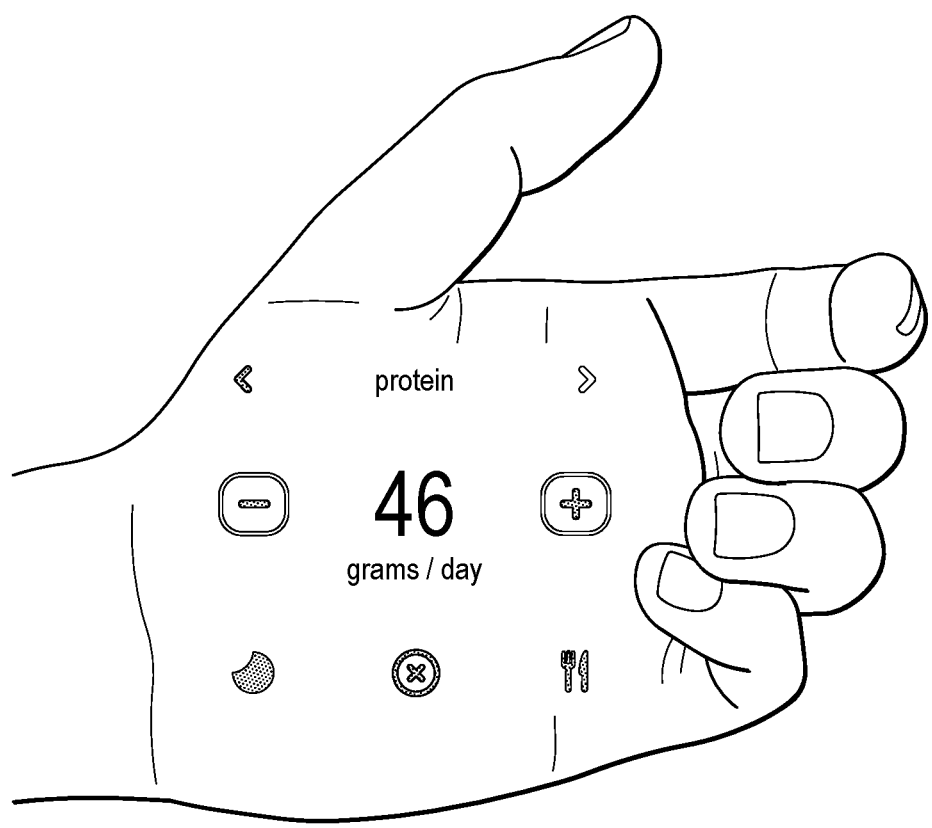
Figure 22:
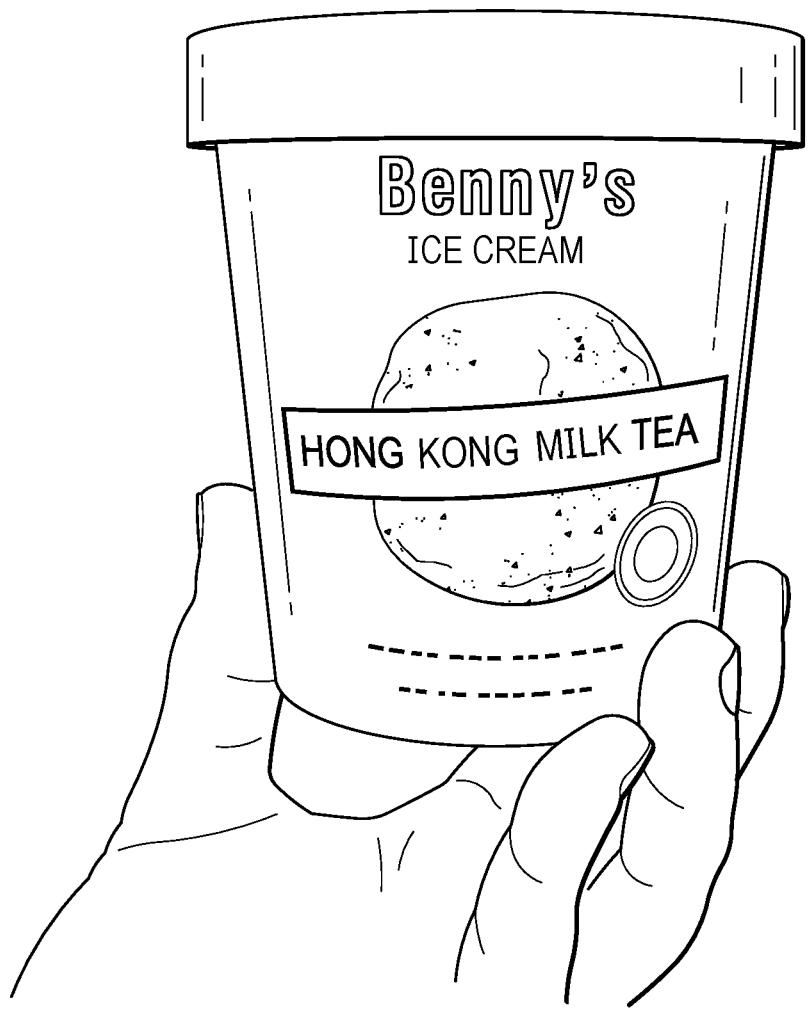
Figure 23:
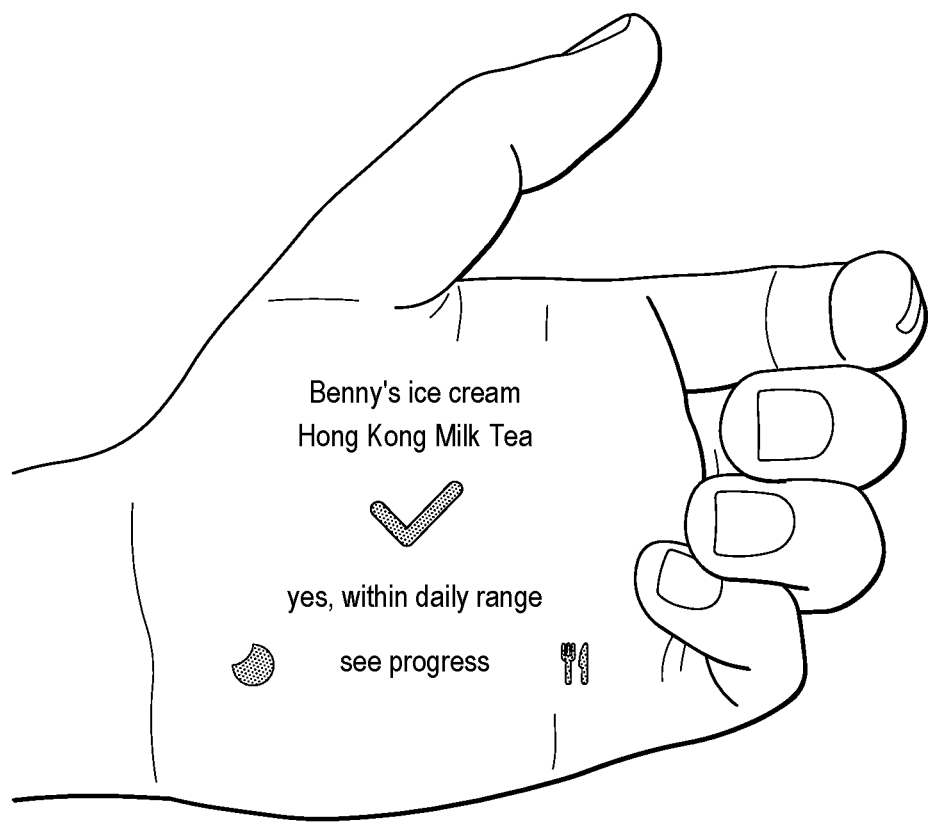
Figure 24:
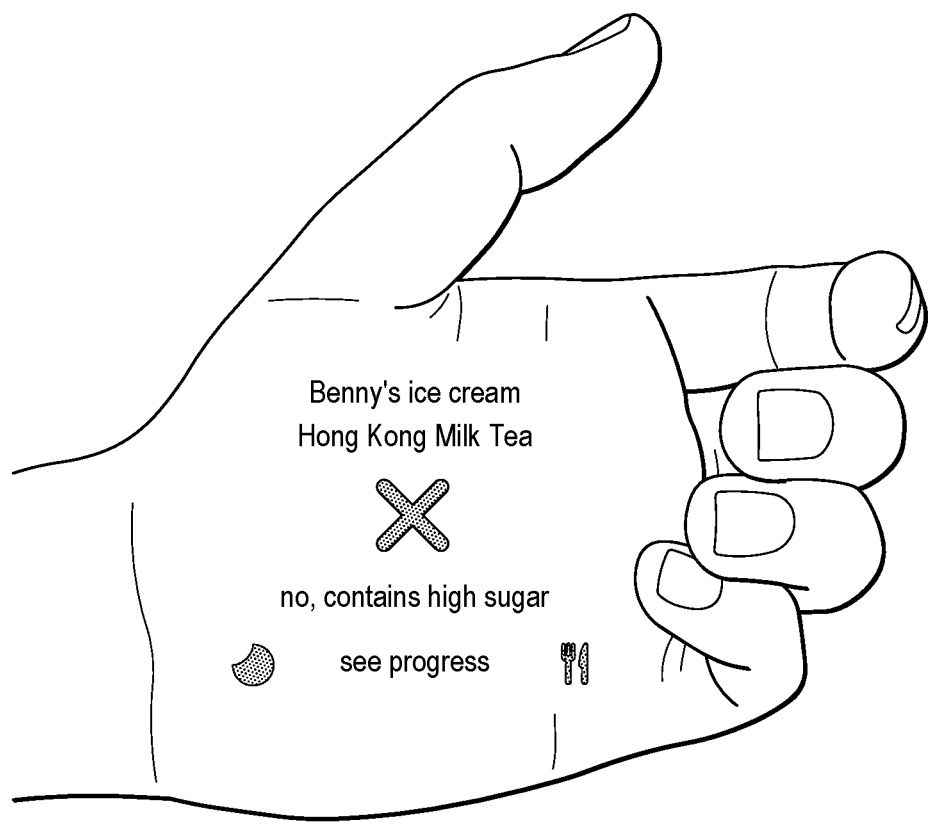

If the user selections the "adjust goals" affordance, then the laser projection shown in FIG. 18 is shown, where the user can, e.g., raise or lower a calorie goal using the plus and minus buttons. FIG. 19 illustrates the setting of a carbohydrate goal. FIG. 20 illustrates the setting of a fat goal. FIG. 21 illustrates the setting of a protein goal. FIG. 22 illustrates a second example use case where the user holds up a pint of ice cream and speaks "can I eat this?" The 2D/3D cameras on the device capture the object, and the device performs object recognition, or the images are sent to an online server where object recognition is performed. Once the object is identified, the ingredients and nutritional information is collected from online resources. The user's personal health profile is compared to the ingredients and nutritional information to determine an answer, which in this example, is "yes, withing daily range" of sugar intake, as shown in FIG. 23. FIG. 24 shows a different answer: "no, contains high sugar."

Figure 25:
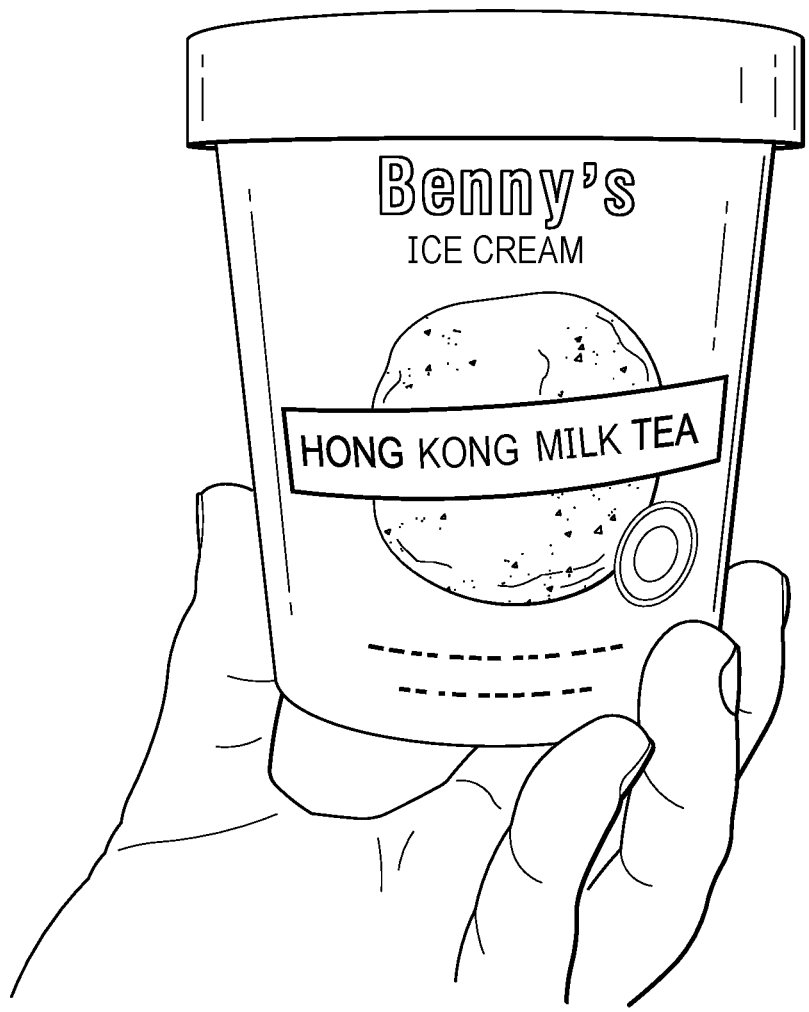
Figure 26:
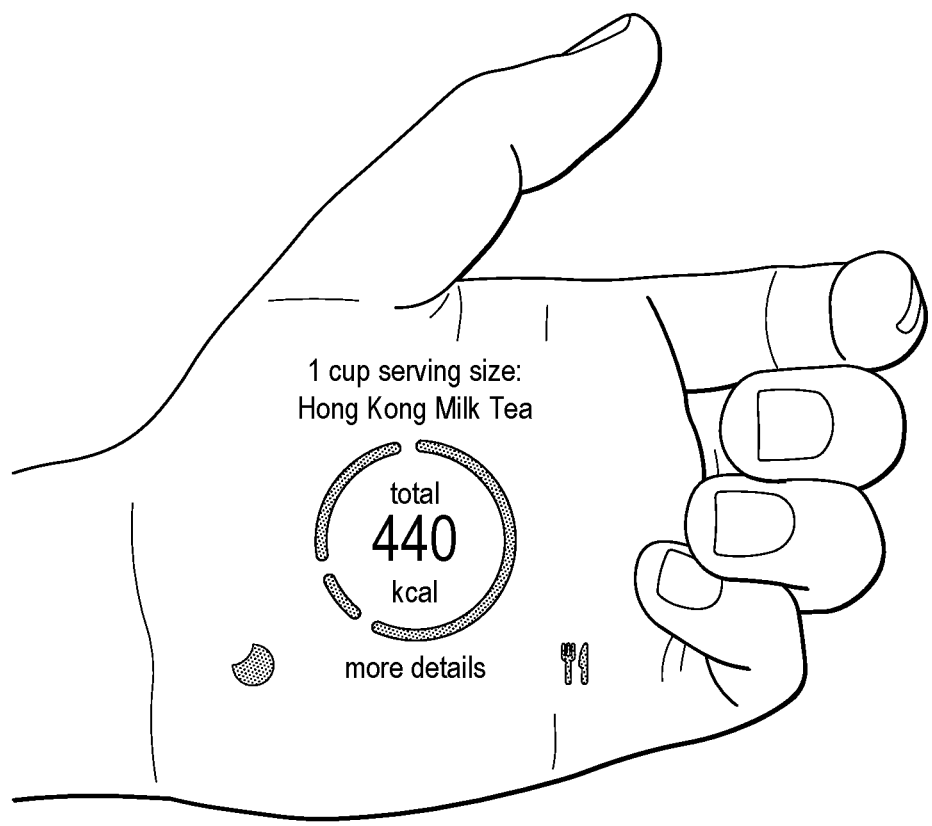
Figure 27:
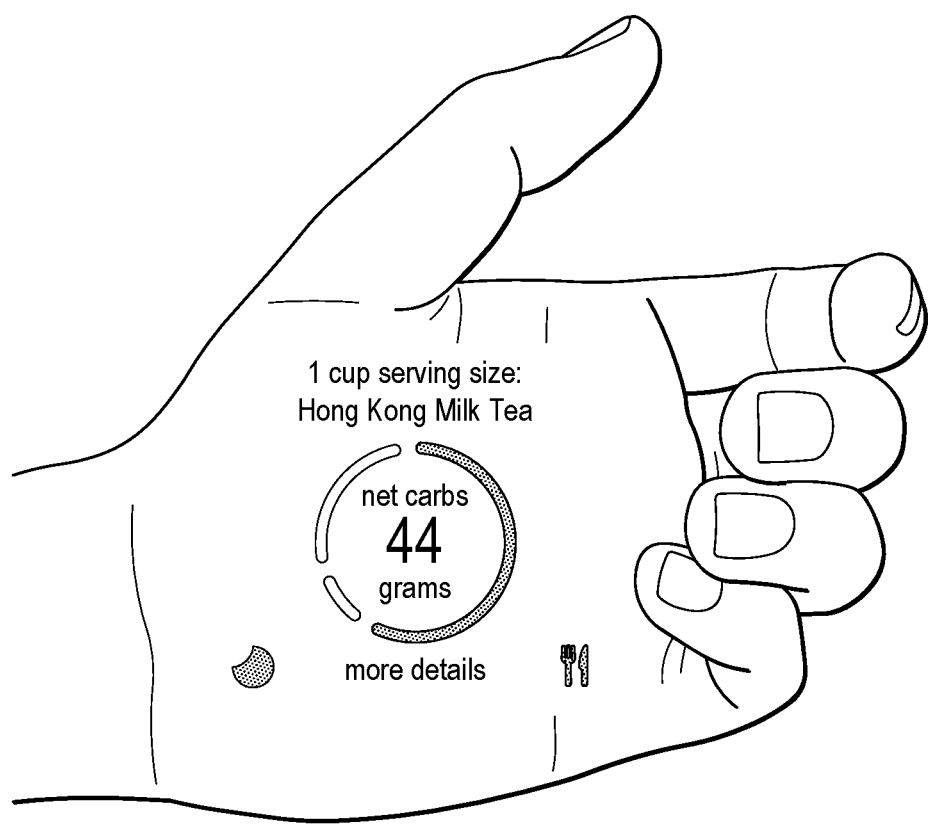
Figure 28:
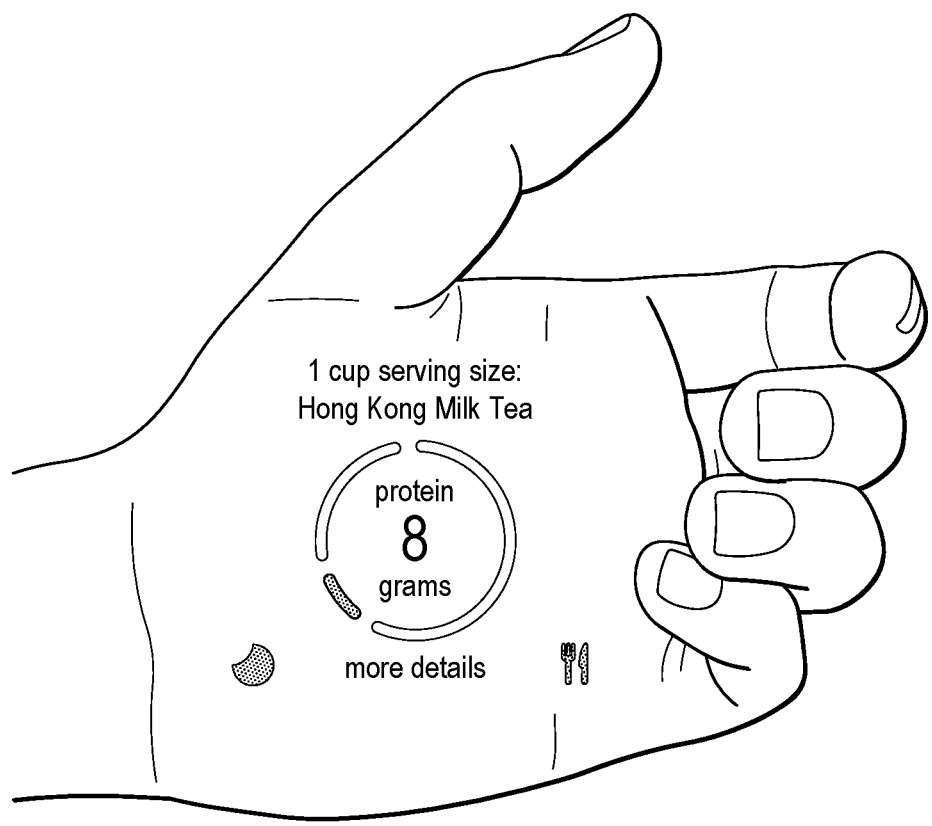
Figure 29:
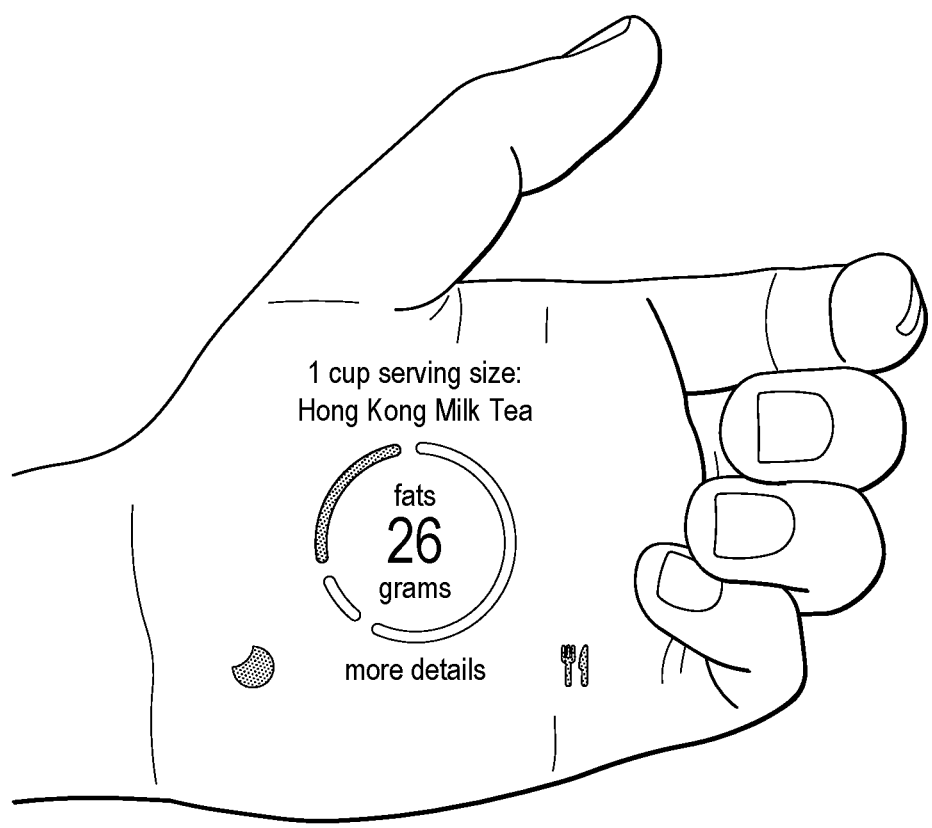
Figure 30:
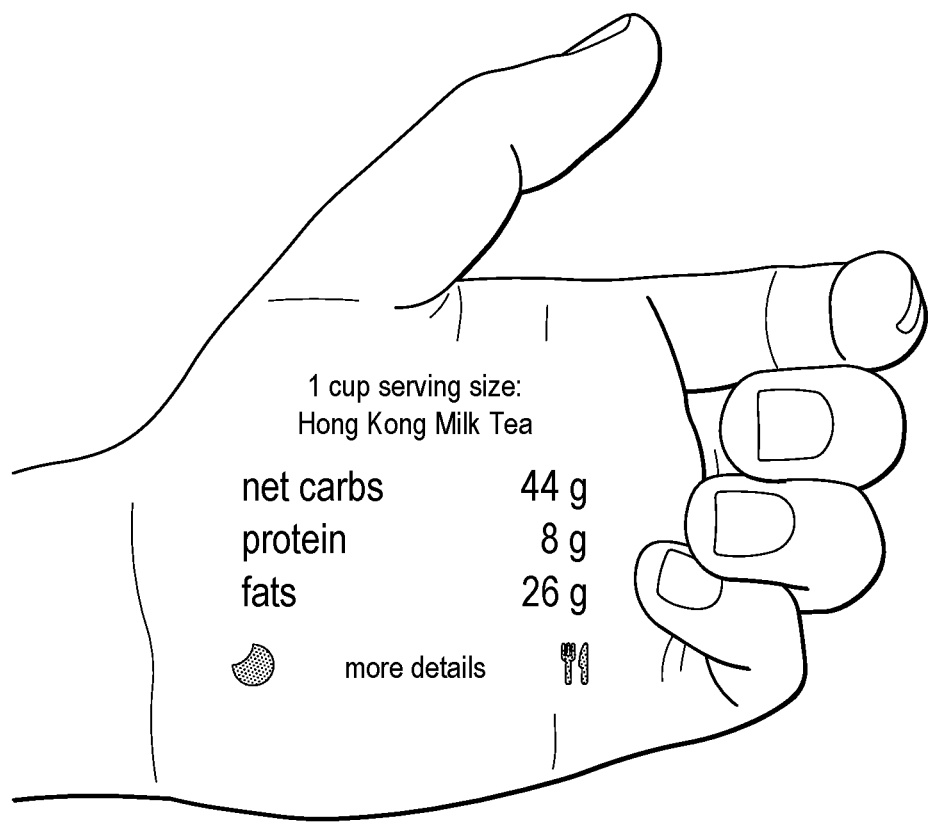
Figure 31:
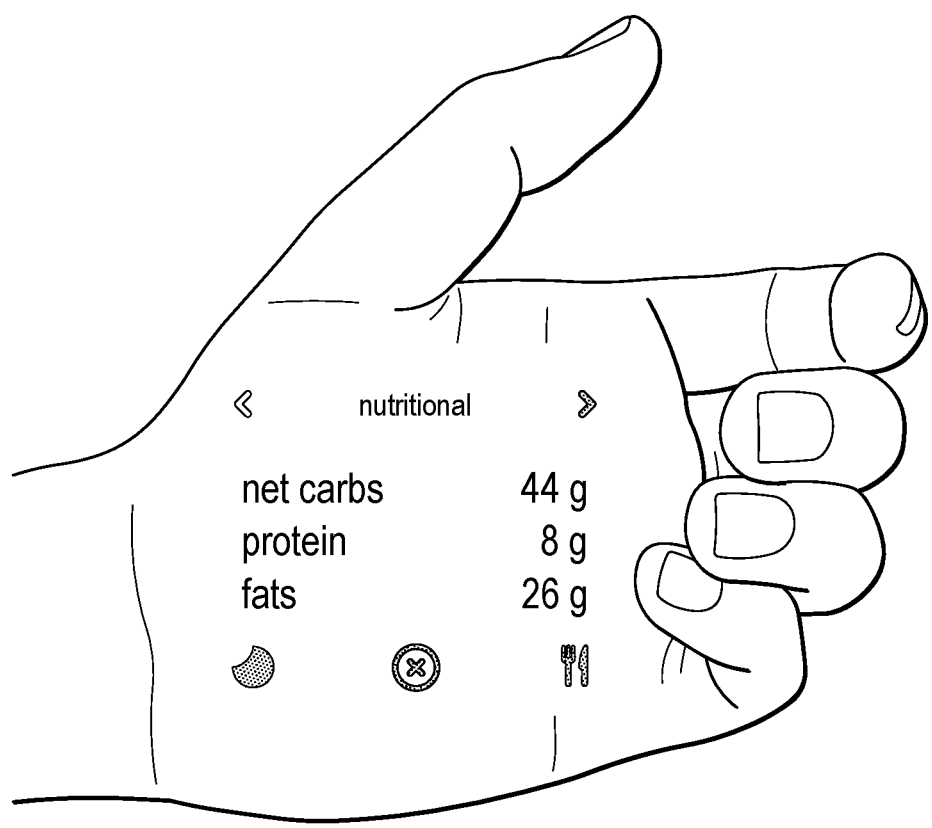
Figure 32:
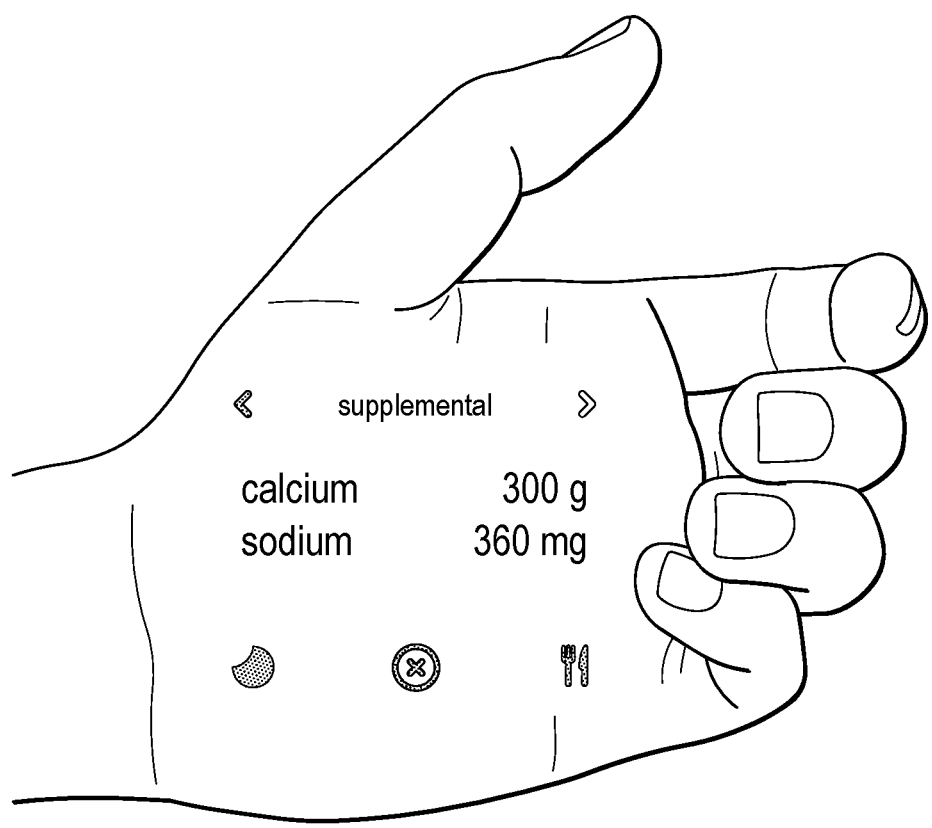

FIG. 25 illustrates a third example use case where the user holds up a pint of ice cream and speaks "I'm going to eat this." FIG. 26 shows a laser projection that provide total calories per serving, with an option for more details. FIG. 27 shows a laser projection that provides net carbs per serving. FIG. 28 shows a laser projection that provides proteins per serving. FIG. 29 shows a laser projection that provides fats per serving. FIG. 30 shows a laser projection that provides calories, carbohydrates, proteins and fats per serving. FIG. 31 shows a laser projection in response to the user speaking "more details." The laser projection allows the user to review nutritional details. FIG. 32 shows a laser projection that allows the user to review supplemental nutritional information such as calcium and sodium.

Figure 33:
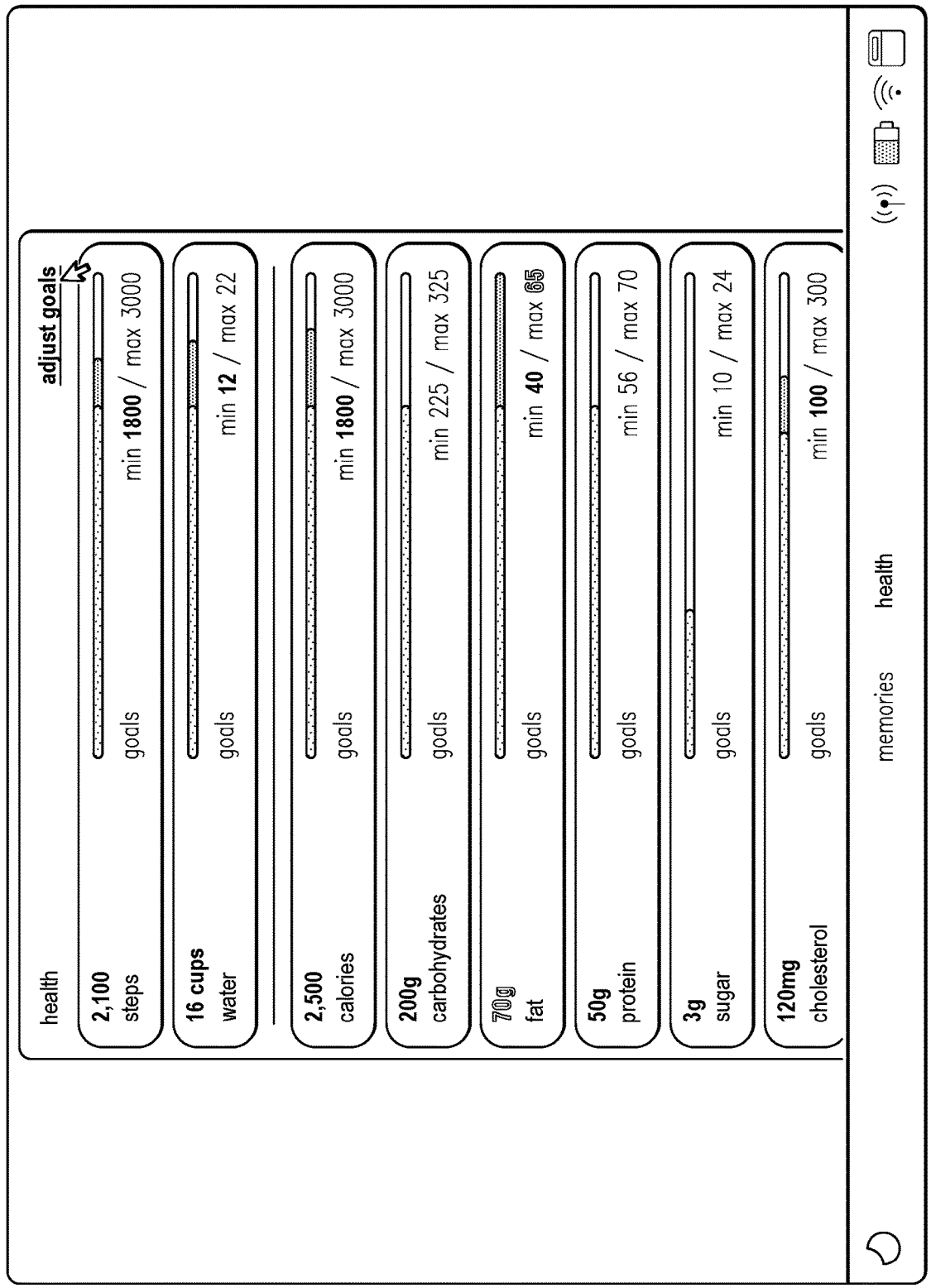
FIG. 33 illustrates a "health center" user interface that can be presented on, for example, a website that allows the user to adjust their health/nutritional/consumption goals.
Figure 34:
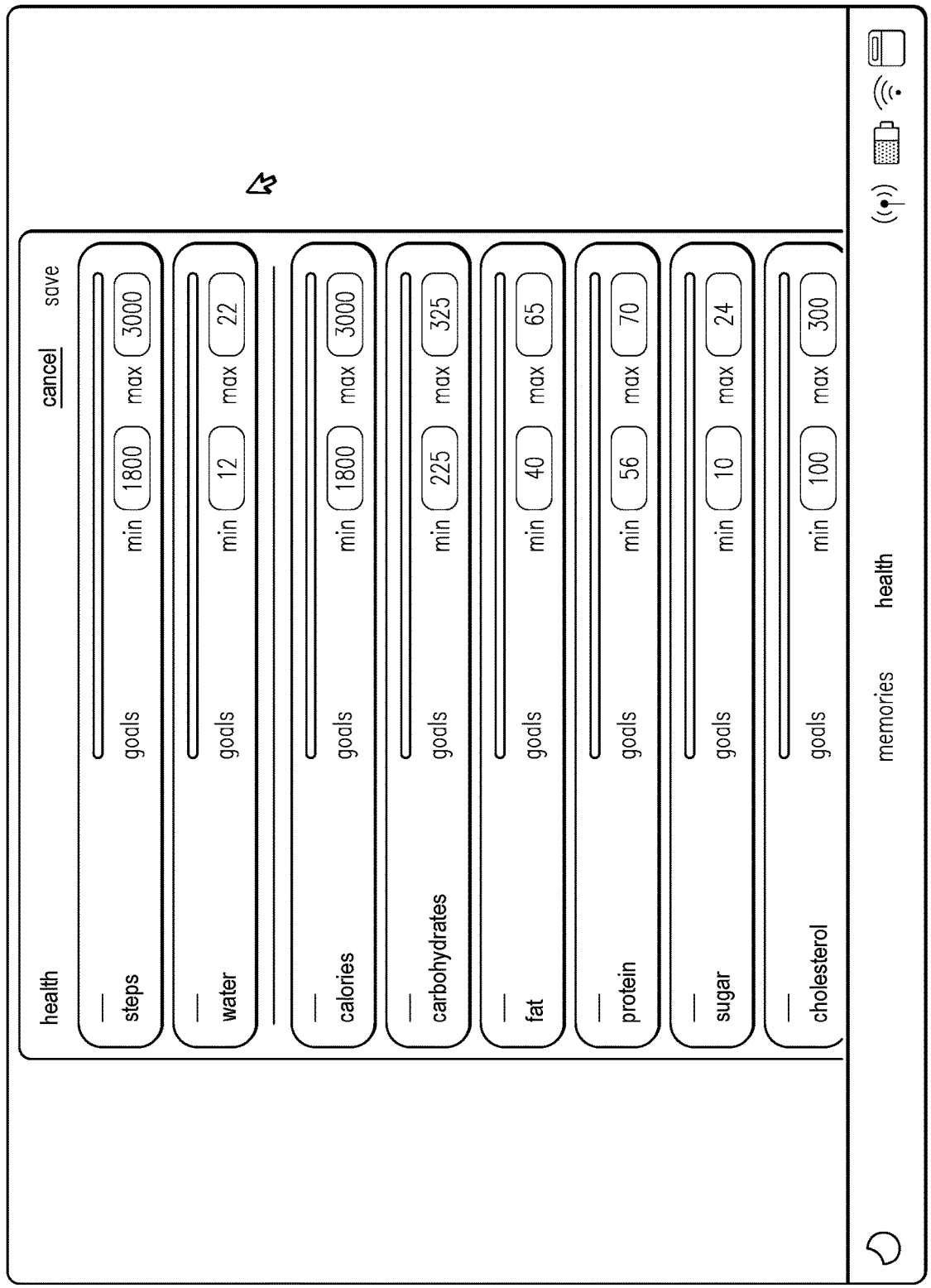
Figure 35:
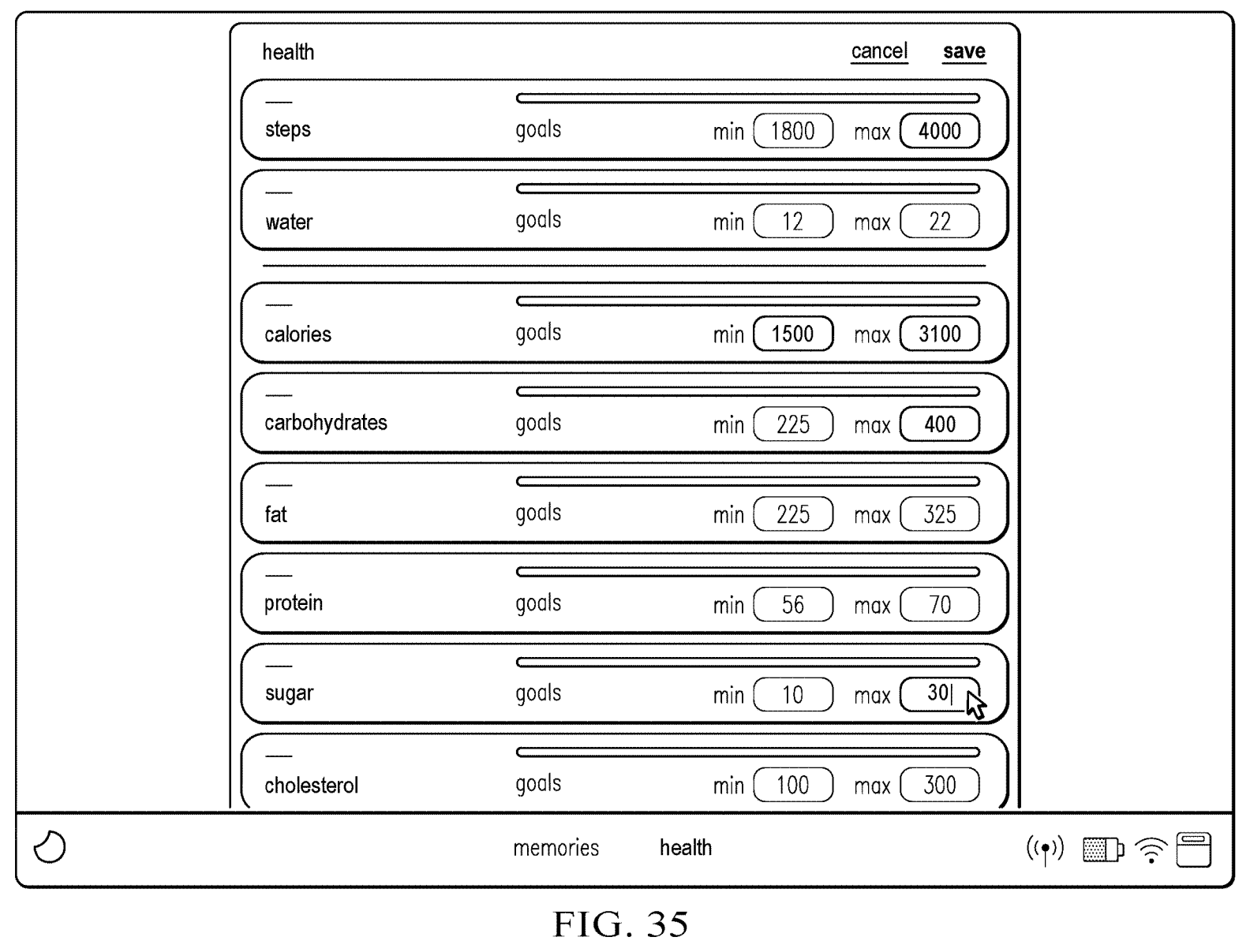
Figure 36:
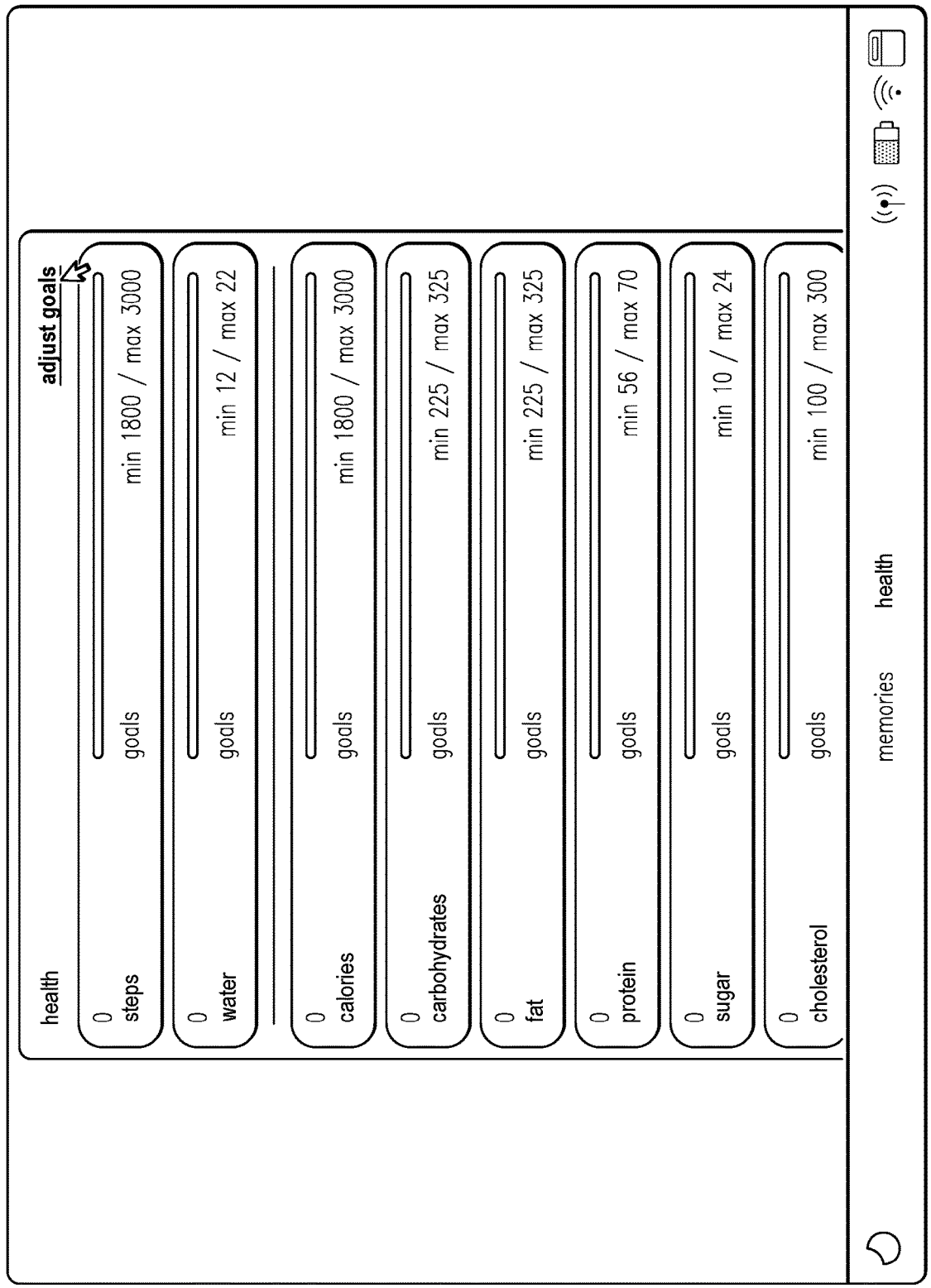

FIG. 33 illustrates a "health center" user interface that can be presented on, for example, a website that allows the user to adjust their health/nutritional/consumption goals. In particular, a health pane is selected showing various user goals (e.g., steps, water consumption, calorie consumption, carb consumption, fat consumption, protein consumption). Selecting the adjust goals affordance allows the user to adjust the goals as shown in FIGS. 34-36. For example, in FIG. 35, the user can set a minimum and maximum for each of the goals. In the example shown, the user set a minimum calorie goal of 1500 and a maximum calorie goal of 3100.

Building User AI Profile

In some embodiments, the user can use a website, or application to build their own personal AI profile that can be used by the electronic device and third-party services to deliver relevant information to the user for various AI scenarios. In an embodiment, a dialogue can be presented to the user as a series of UIs asking for information, such as height, birth date, description of diet (e.g., vegetarian, gluten-free), favorite books, known allergies, place of birth, dietary modifications (goals for calories, fat, carbs, protein, sodium, sugar), identifying important people (e.g., parents, partner, kids), health conditions (high cholesterol, migraines), emergency contacts, weight, health goals (e.g., lose weight, manage stress), languages, favorite movie genres.

Proactive Insights

Based on all the information the device knows about the user, in some embodiment the device may consult other third-party services, or its own services to generate insights for the user and proactively serve them to the user. For example, the device may tell the user that a certain type of food makes the user more tired or out of breath throughout the day. Another insight could be that exercising before bed makes their sleep quality worse. Another insight could be that speaking to a certain contact makes them happier.

Additional Shopping Operations:

In some implementations, the user can point an electronic device towards a product, and provide spoken questions and/or commands to the electronic device with respect to the product. Example use cases are outlined below:

"Order a copy to my house": In response, the electronic device can purchase the detected object and send the object to the user's specified address with the specified card information. In some implementations, different vendors can bid on the sale.

"Save this for later . . . Add this to my cart": In response, the electronic device can put the item in a curated list (e.g., with an online retailer), but does not purchase it.

"You're running low!": The electronic device can track item usage by a user, and suggest repurchase of that item.

"Find me something similar": In response, the electronic device can searches for and present the user with items that are similar to the object.

"Find me an alternative that fits my budget": In response, the electronic device can limit the search to the specified criteria (e.g., budget criteria). Criteria can be determined based on context and/or historical data.

"Find me something that matches this." In response, the electronic device can find an alternative item that complements the item.

"Where can I buy this?" In response, the electronic device can finds online retailers and nearby physical retailers that sell the item.

"Do people like it?" In response, the electronic device can retrieve review information regarding the item, aggregate results, and present the aggregated results to the user.

"How expensive is it . . . Who makes this?" In response, the electronic device can retrieve the requested information regarding the item, and present the information to the user.

"How do I assemble it?" In response, the electronic device can retrieve assembly information (e.g., from a vendor and/or other users), and present aggregated results to the user.

"Which one of these has better reviews?" In response, the electronic device can compare the reviews of recognized objects and present the comparison to the user. In some implementations, the electronic device can project light (e.g., using a projector subsystem 832) to visually identify the recommended item.

"Where have I seen this before?" In response, the electronic device can search through historical data (e.g., photos, videos, audio, etc.) captured by the electronic device, and identify when the same (or similar) item was previously seen by the user.

"Will this fit in my living room?" In response, the electronic device can use a three-dimensional camera and dimension information regarding the user's room to determine whether the detected object can fit into the user's room.

"What is the quickest way to get this?" In response, the electronic device compares shipping estimates between retailers, and suggests a retailer having the quickest shipping time.

The electronic device can also determine answers for other user questions, and present answers to those questions to the user. Example additional user questions include:

"Who invented this?"
"What can I make with these ingredients?"
"How long should I cook this?"
"What's the summary?"
"How is this made?"
"What does [Product Reviewer or Publication] have to say about it?"
"How high would this bounce when dropped from 5 meters?"

The electronic device and determine answers based on a web search and/or an interpretation of data (e.g., from a database, web search, etc.) using artificial intelligence.

Additional Processes

Figure 37A:
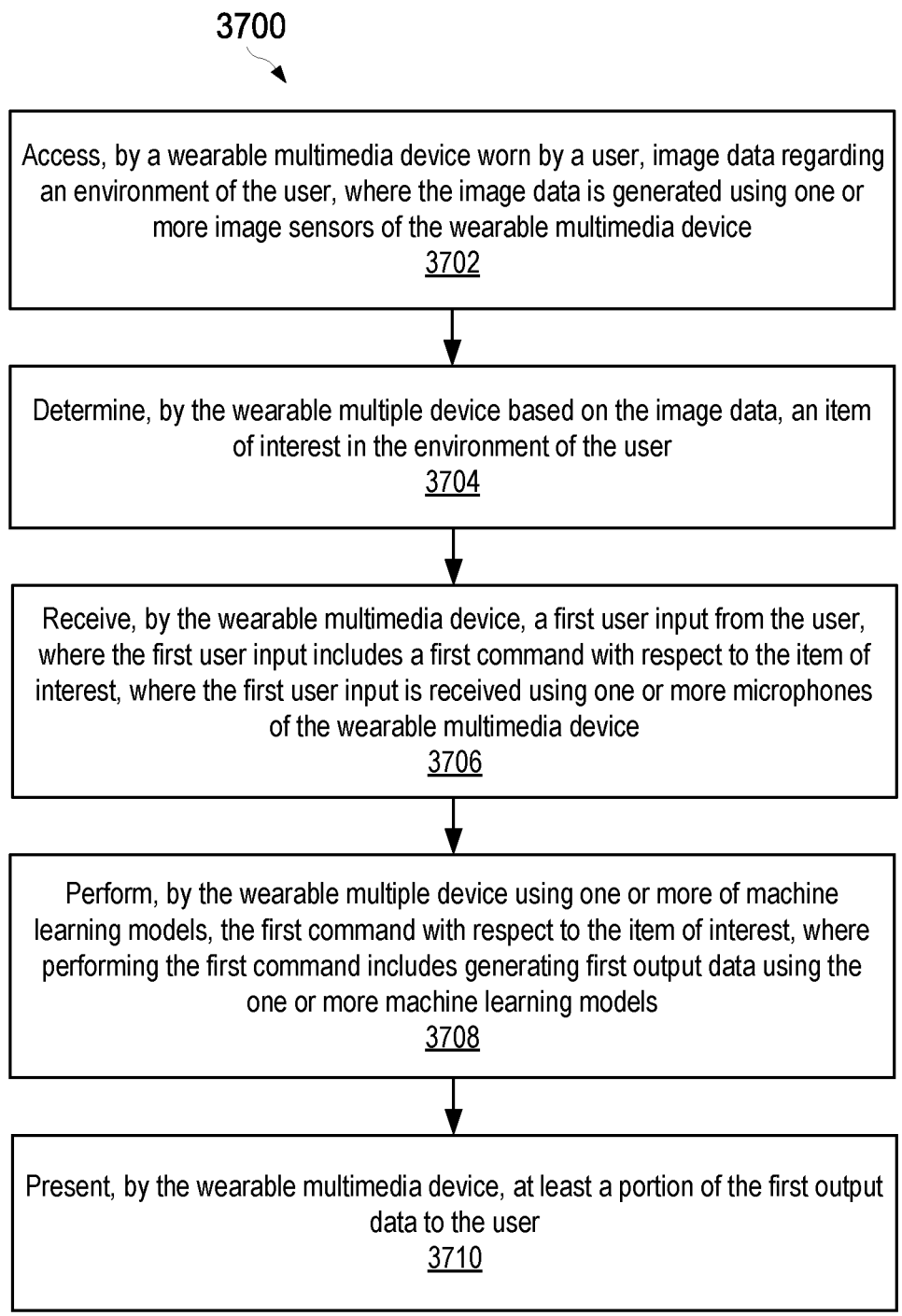
FIGS. 37A-37C are diagrams of example process for using object recognition and/or voice recognition to provide personal assistance to users.

FIG. 37A is a flow diagram of an example process 3700 for using object recognition and/or voice recognition to provide personal assistance to users, according to an embodiment. Process 3700 can be implemented using wearable multimedia devices 101 described in reference to FIGS. 1-36.

According to the process 3700, a wearable device is worn by a user. Further, the device accesses image data regarding an environment of the user (3702). The image data is generated using one or more image sensors of the wearable multimedia device.

The device determines, based on the image data, an item of interest in the environment of the user (3704).

The device receives a first user input from the user (3706). The first user input includes a first command with respect to the item of interest. The first user input is received using one or more microphones of the wearable multimedia device.

The device performs, using one or more of machine learning models, the first command with respect to the item of interest (3708). Performing the first command includes generating first output data using the one or more machine learning models.

The device presents at least a portion of the first output data to the user (3710).

In some implementations, the first command can include a request for information regarding the item of interest. Further, the first output data include an identity of the item of interest and/or at least one of a make or a model of the item of interest.

In some implementations, the item of interest can include an article of clothing, and the first command can include a request for information regarding the article of clothing. Further, the first output data can include at least one of a size or a fit of the article of clothing, at least one of a color or a style of the article of clothing, and/or an indication of a least one additional article of clothing to complement the article of clothing.

In some implementations, the item of interest can include a food item, and the first command can include a request for information regarding the food item. Further, the first output data can include a nutritional value of the food item, one or more ingredients of the food item, one or more allergens of the food item, one or more serving sizes of the food item, at least one of a place of origin or a place of production of the food item, a recipe having the food item as an ingredient, and/or an indication of a least one additional food item to complement the food item.

In some implementations, the process 3700 can include determining, based on the image data, that the user consumed the food item, and storing, in a database, an indication that the user consumed the food item and the nutritional value of the food item. The database can represent a plurality of food items consumed by the user over a period of time.

In some implementations, the process 3700 can include determining, based on the image data, a portion size of the food item, and determining the nutritional value of the food item based on the portion size.

In some implementations, the first command can include a request for information regarding a purchase of the item of interest. Further, the first output data can include an indication of one or more retailers offering the item of interest for purchase.

In some implementations, the first output data can include, for each of the one or more retailers, a distance of the retailer from the user, a purchase price associated with the item of interest at that retailer, an availability of the item of interest at the retailer, and/or a shipping item associated with the item of interest by the retailer.

In some implementations, the process 3700 can include receiving a second user input include a second command with respect to the item of interest, where the second user input includes an indication to purchase the item of interest, and initiating a purchase of the item of interest.

In some implementations, initiating the purchase of the item of interest can include determining a payment method associated with the user, selecting a retailer from among the one or more retailers, and initiating the purchase of the item at the selected retailer using the payment method.

In some implementations, the one or more machine learning models can include one or more computerized neural networks.

In some implementations, the image sensors can include one or more cameras and/or one or more depth sensors.

In some implementations, presenting at least the portion of the first output data to the user can include projecting, using a laser projector of the wearable multimedia device, a user interface on a surface of the user. The user interface can include at least the portion of the first output data.

In some implementations, the surface can be a surface of a hand of a user. In some implementations, the surface can be a surface of a palm of a user.

In some implementations, presenting at least the portion of the first output data to the user can include projecting, using a laser projector of the wearable multimedia device, at least a portion of the first output data on a surface of the item of interest.

In some implementations, presenting at least the portion of the first output data to the user can include projecting, using a laser projector of the wearable multimedia device, at least a portion of the first output data on a surface in a proximity of the item of interest.

In some implementations, presenting at least the portion of the first output data to the user can include generating, using one or more audio speakers of the wearable multimedia device, audio output comprising at least the portion of the first output data.

In some implementations, the process 3700 can include (i) receiving a second user input from the user, where the second user input includes a second command with respect to the environment, and where the second user input is received using the one or more microphones of the wearable multimedia device, (ii) performing using the one or more of machine learning models, the second command with respect to the environment, where performing the second command includes generating second output data using the one or more machine learning models, and (iii) presenting at least a portion of the second output data to the user.

In some implementations, the second command can include a request for a description of the environment. The second output data can include the description of the environment.

In some implementations, the second command can include a request for contents of a sign in the environment. The second output data can include the contents of the sign.

In some implementations, the second command can include a request for information regarding a business in the environment. The second output data can include the information regarding the business.

In some implementations, the information regarding the business can include operating hours of the business.

Figure 37B:
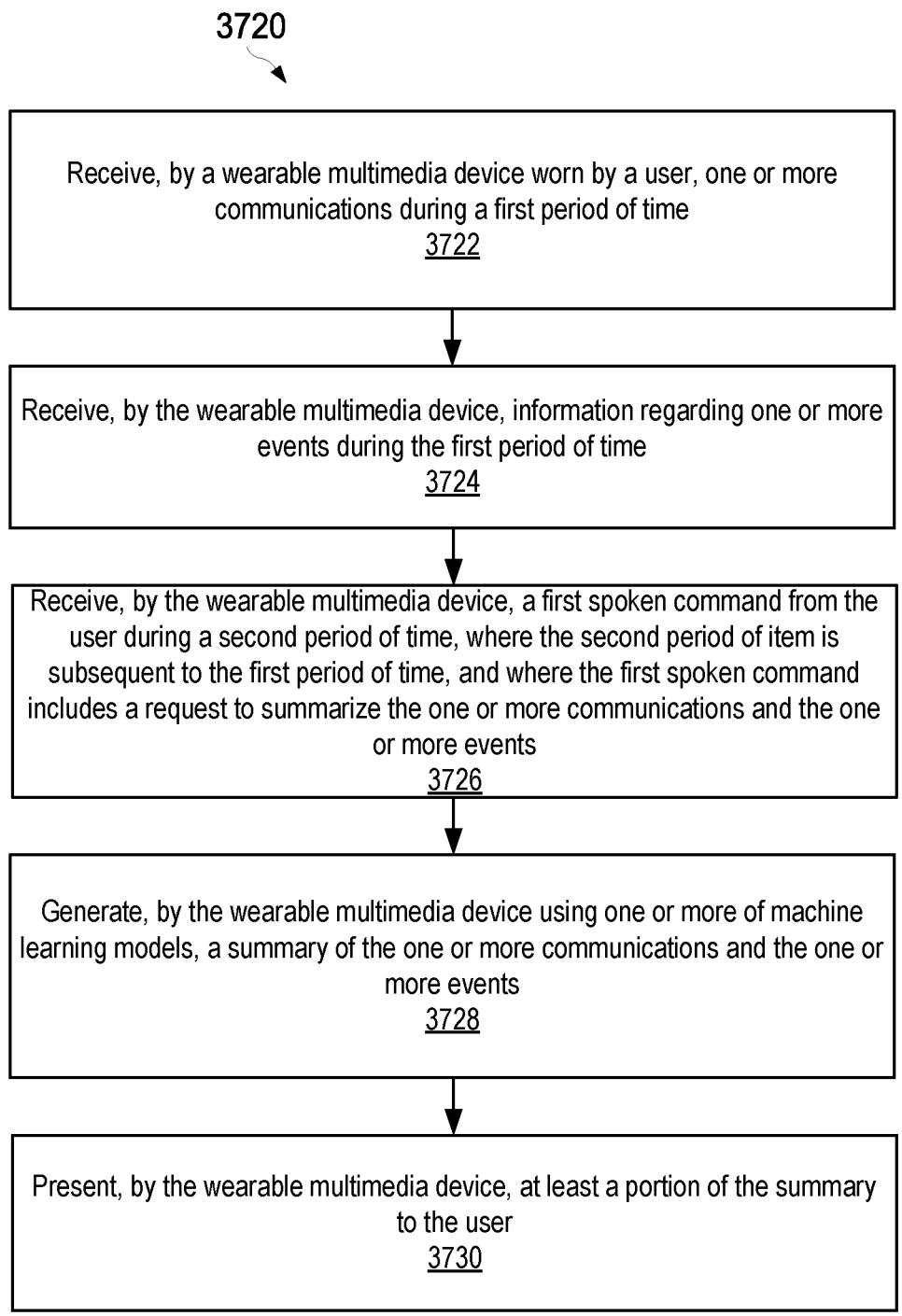

FIG. 37B is a flow diagram of an example process 3720 for using object recognition and/or voice recognition to provide personal assistance to users, according to an embodiment. Process 3720 can be implemented using wearable multimedia devices 101 described in reference to FIGS. 1-36.

According to the process 3720, a wearable multimedia device is worn by a user. Further, the device receives one or more communications during a first period of time (3722).

The device receives information regarding one or more events during the first period of time (3724).

The device receives a first spoken command from the user during a second period of time (3726). The second period of item is subsequent to the first period of time, and the first spoken command includes a request to summarize the one or more communications and the one or more events.

The device generates, using one or more of machine learning models, a summary of the one or more communications and the one or more events (3728).

The device presents at least a portion of the summary to the user (3730).

In some implementations, the first period of time can be determined by determining, based on calendar data from a calendar application of the wearable multimedia device, that the user is busy during the first period of time.

In some implementations, presenting at least the portion of the summary to the user can include projecting, using a laser projector of the wearable multimedia device, a user interface on a surface of the user. The user interface can include at least the portion of the summary.

In some implementations, the surface can be a surface of a hand of a user.

In some implementations, the surface can be a surface of a palm of a user.

In some implementations, presenting at least the portion of the summary to the user can include generating, using one or more audio speakers of the wearable multimedia device, audio output including at least the portion of the summary.

In some implementations, the one or more communications can include an email message, a text message, a chat message, a social media post, a voicemail, and/or a telephone call.

In some implementations, the information regarding the one or more events can include an invitation of at least one event of the one or more events, a modification to at least one event of the one or more events, and/or a cancelation of at least one event of the one or more events.

In some implementations, the process 3740 can include refraining from presenting the or more communications and the information regarding one or more events to the user during the first period of time.

In some implementations, at least some of the information regarding the one or more events can be retrieved from a calendar application of the wearable multimedia device.

In some implementations, generating the summary of the one or more communications and the one or more events can include estimating, using the one or more machine learning models, an importance of each of the one or more communications and the one or more events to the user.

In some implementations, the process 3740 can include filtering items in the summary based on the estimated importance of each of the one or more communications and the one or more events to the user.

In some implementations, the process 3740 can include determining a priority of items in the summary based on the estimated importance of each of the one or more communications and the one or more events to the user.

In some implementations, the importance can be estimated based on contextual information regarding the one or more communications and the one or more events.

In some implementations, the contextual information can include a sender of each of the one or more communications, contents of each of the one or more communications, and/or a message type associated with each of the one or more communications.

In some implementations, the contextual information can include a time associated with each of the one or more events, a location associated with each of the one or more events, one or more first activities previous performed by the user, and/or one or more second activities scheduled to be performed by the user.

In some implementations, the importance can be estimated based on preference data received from the user.

In some implementations, the importance can be estimated based on user feedback received from the user regarding a previous summary presented to the user prior to the first period of time.

Figure 37C:
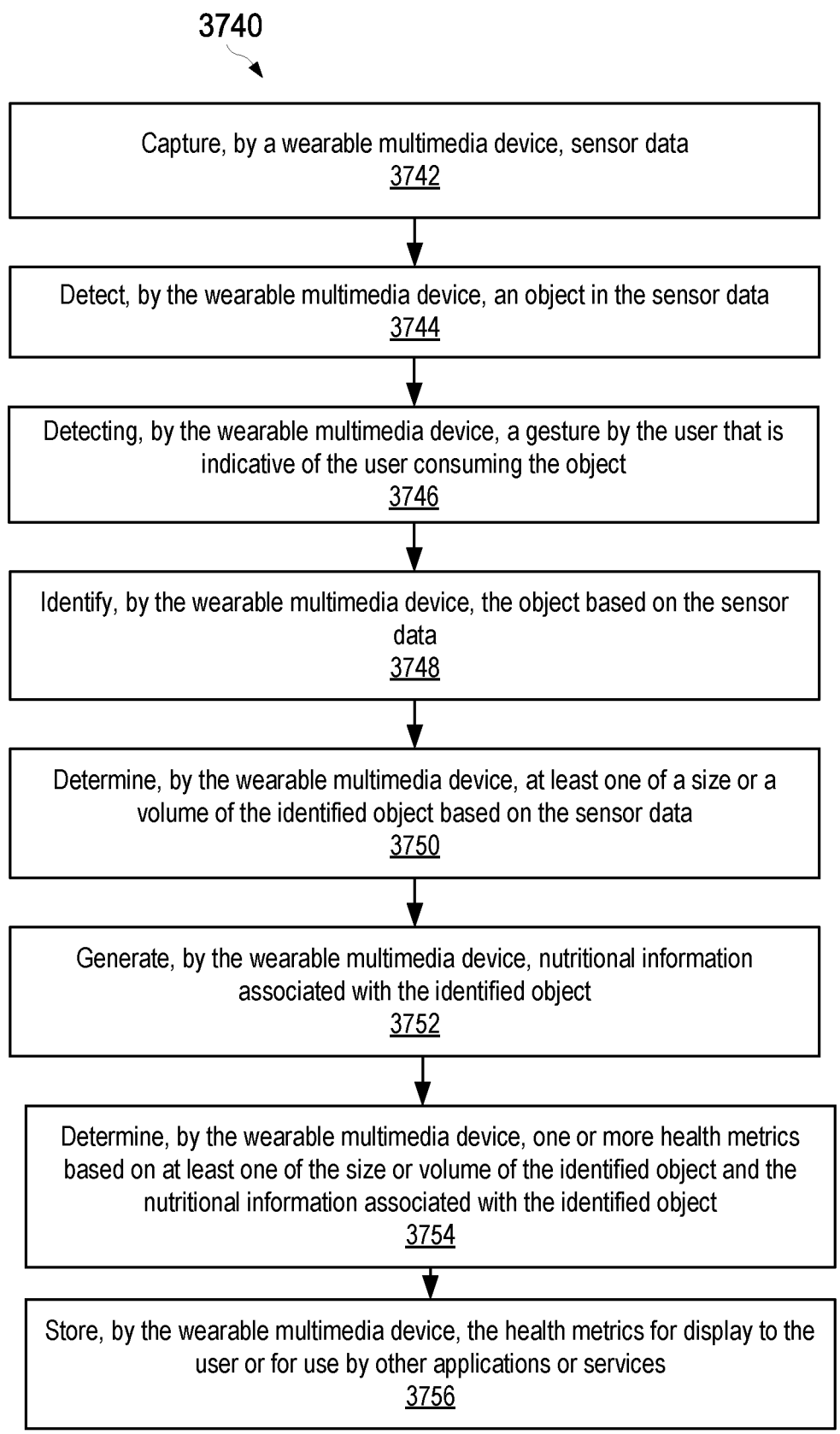

FIG. 37C is a flow diagram of an example process 3740 for using object recognition and/or voice recognition to provide personal assistance to users, according to an embodiment. Process 3740 can be implemented using wearable multimedia devices 101 described in reference to FIGS. 1-36.

According to the process 3740, a wearable device captures sensor data (3722).

The device detects an object in the sensor data (3724).

The device detects a gesture by the user that is indicative of the user consuming the object (3726).

The device identifies the object based on the sensor data (3728).

The device determines at least one of a size or a volume of the identified object based on the sensor data (3730).

The device gathers nutritional information associated with the identified object (3732).

The device determines one or more health metrics based on at least one of the size or volume of the identified object and the nutritional information associated with the identified object (3734).

The device stores the health metrics for display to the user or for use by other applications or services (3736).

In some implementations, the sensor data can be captured using one or more cameras, and/or one or more depth sensors.

In some implementations, the gesture by the user that is indicative of the user consuming the object can include a grasping of the object by a hand of the user and a movement of the object towards as mouth of the user.

In some implementations, the gesture by the user that is indicative of the user consuming the object can include a grasping of the object by a hand of the user and a spoken command by a user.

In some implementations, the object can be a food item.

In some implementations, the nutritional information can be determined based on at least one of the size or the volume of the object.

In some implementations, the nutritional information of the object can include a number of calories in the food item, an amount of protein in the food item, an amount of fat in the food item, an amount of carbohydrates in the food item, an amount of vitamins in the food item, and/or an amount of minerals in the food item.

In some implementations, the nutritional information of the object can include one or more ingredients of the food item, one or more allergens of the food item, one or more serving sizes of the food item, and/or at least one of a place of origin or a place of production of the food item.

In some implementations, the health metrics can include historical nutrition information associated with one or more objects that the user has consumed during a period of time.

In some implementations, the health metrics can include a minimal goal associated with the historical nutrition information and/or a maximum goal associated with the historical nutrition information.

In some implementations, at least one of the minimal goal or the maximum goal can be determined based on input from the user.

In some implementations, the process 3740 can include presenting at least a portion of the nutrition information or the health metrics to the user.

In some implementations, presenting at least the portion of the nutrition information or the health metrics to the user can include projecting, using a laser projector of the wearable multimedia device, a user interface on a surface of the user. The user interface can include at least the portion of the nutrition information or the health metrics.

In some implementations, the surface can be a surface of a hand of a user. In some implementations, the surface can be a surface of a palm of a user.

In some implementations, presenting at least the portion of the nutrition information or the health metrics to the user can include projecting, using a laser projector of the wearable multimedia device, at least a portion of the nutrition information or on a surface of the item of interest.

In some implementations, presenting at least the portion of the nutrition information or the health metrics to the user can include projecting, using a laser projector of the wearable multimedia device, at least a portion of the nutrition information on a surface in a proximity of the item of interest.

In some implementations, presenting at least the portion of the nutrition information or the health metrics to the user can include generating, using one or more audio speakers of the wearable multimedia device, audio output comprising at least the portion of the nutrition information or the health metrics.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method comprising:
accessing, by a wearable multimedia device worn by a user, image data regarding an environment of the user, wherein the image data is generated using one or more image sensors of the wearable multimedia device;
determining, by the wearable multimedia device based on the image data, an item of interest in the environment of the user;
receiving, by the wearable multimedia device, a first user input from the user, wherein the first user input comprises a first command with respect to the item of interest, wherein the first user input is received using one or more microphones of the wearable multimedia device, and wherein the first command comprises a request for feedback regarding the item of interest;
performing, by the wearable multimedia device using one or more of machine learning models, the first command with respect to the item of interest, wherein performing the first command comprises generating first output data using the one or more machine learning models, and wherein generating the first output data comprises retrieving and aggregating product review information regarding the item of interest;
receiving, by the wearable multimedia device, a second user input from the user, wherein the second user input comprises a second command with respect to the item of interest, wherein the second user input is received using the one or more microphones of the wearable multimedia device, and wherein the second command comprises a request for information regarding the item of interest;
performing, by the wearable multimedia device using the one or more of machine learning models, the second command with respect to the item of interest, wherein performing the second command comprises generating second output data using the one or more machine learning models, and wherein the second output data comprises at least one of:
an identity of the item of interest, or
at least one of a make or a model of the item of interest; and
presenting, by the wearable multimedia device, at least a portion of the first output data and at least a portion of the second output data to the user.

2. A method comprising:
accessing, by a wearable multimedia device worn by a user, image data regarding an environment of the user, wherein the image data is generated using one or more image sensors of the wearable multimedia device;
determining, by the wearable multimedia device based on the image data, an item of interest in the environment of the user;
receiving, by the wearable multimedia device, a first user input from the user, wherein the first user input comprises a first command with respect to the item of interest, wherein the first user input is received using one or more microphones of the wearable multimedia device, and wherein the first command comprises a request for feedback regarding the item of interest;
performing, by the wearable multimedia device using one or more of machine learning models, the first command with respect to the item of interest, wherein performing the first command comprises generating first output data using the one or more machine learning models, and wherein generating the first output data comprises retrieving and aggregating product review information regarding the item of interest;
receiving, by the wearable multimedia device, a second user input from the user, wherein the second user input comprises a second command with respect to the item of interest, wherein the second user input is received using the one or more microphones of the wearable multimedia device, wherein the item of interest comprises an article of clothing, and wherein the second command comprises a request for information regarding the article of clothing;
performing, by the wearable multimedia device using the one or more of machine learning models, the second command with respect to the item of interest, wherein performing the second command comprises generating second output data using the one or more machine learning models, and wherein the second output data comprises at least one of:
at least one of a size or a fit of the article of clothing,
at least one of a color of a style of the article of clothing, or
an indication of a least one additional article of clothing to complement the article of clothing; and
presenting, by the wearable multimedia device, at least a portion of the first output data to the user.

3. A method comprising:
accessing, by a wearable multimedia device worn by a user, image data regarding an environment of the user, wherein the image data is generated using one or more image sensors of the wearable multimedia device;
determining, by the wearable multimedia device based on the image data, an item of interest in the environment of the user;
receiving, by the wearable multimedia device, a first user input from the user, wherein the first user input comprises a first command with respect to the item of interest, wherein the first user input is received using one or more microphones of the wearable multimedia device, and wherein the first command comprises a request for feedback regarding the item of interest;
performing, by the wearable multimedia device using one or more of machine learning models, the first command with respect to the item of interest, wherein performing the first command comprises generating first output data using the one or more machine learning models, and wherein generating the first output data comprises retrieving and aggregating product review information regarding the item of interest;

receiving, by the wearable multimedia device, a second user input from the user, wherein the second user input comprises a second command with respect to the item of interest, wherein the second user input is received using the one or more microphones of the wearable multimedia device, wherein the item of interest comprises a food item, and wherein the second command comprises a request for information regarding the food item;

performing, by the wearable multimedia device using the one or more of machine learning models, the second command with respect to the item of interest, wherein performing the second command comprises generating second output data using the one or more machine learning models, and wherein the second output data comprises at least one of:
  a nutritional value of the food item,
  one or more ingredients of the food item,
  one or more allergens of the food item,
  one or more serving sizes of the food item,
  at least one of a place of origin or a place of production of the food item,
  a recipe having the food item as an ingredient, or
  an indication of a least one additional food item to complement the food item; and presenting, by the wearable multimedia device, at least a portion of the first output data to the user.

4. The method of claim 3, further comprising:
determining, based on the image data, that the user consumed the food item, and
storing, in a database, an indication that the user consumed the food item and the nutritional value of the food item, wherein the database represents a plurality of food items consumed by the user over a period of time.

5. The method of claim 4, further comprising:
determining, based on the image data, a portion size of the food item, and
determining the nutritional value of the food item based on the portion size.

6. A method comprising:
accessing, by a wearable multimedia device worn by a user, image data regarding an environment of the user, wherein the image data is generated using one or more image sensors of the wearable multimedia device;
determining, by the wearable multimedia device based on the image data, an item of interest in the environment of the user;
receiving, by the wearable multimedia device, a first user input from the user, wherein the first user input comprises a first command with respect to the item of interest, wherein the first user input is received using one or more microphones of the wearable multimedia device, and wherein the first command comprises a request for feedback regarding the item of interest;
performing, by the wearable multimedia device using one or more of machine learning models, the first command with respect to the item of interest, wherein performing the first command comprises generating first output data using the one or more machine learning models, and wherein generating the first output data comprises retrieving and aggregating product review information regarding the item of interest;

receiving, by the wearable multimedia device, a second user input from the user, wherein the second user input comprises a second command with respect to the item of interest, wherein the second user input is received using the one or more microphones of the wearable multimedia device, and wherein the second command comprises a request for information regarding a purchase of the item of interest;

performing, by the wearable multimedia device using the one or more of machine learning models, the second command with respect to the item of interest, wherein performing the second command comprises generating second output data using the one or more machine learning models, and wherein the second output data comprises an indication of one or more retailers offering the item of interest for purchase; and presenting, by the wearable multimedia device, at least a portion of the first output data to the user.

7. The method of claim 6, wherein the second output data further comprises, for each of the one or more retailers, at least one of:
  a distance of the retailer from the user,
  a purchase price associated with the item of interest at that retailer,
  an availability of the item of interest at the retailer, or
  a shipping item associated with the item of interest by the retailer.

8. The method of claim 6, further comprising:
receiving a third user input comprising a third command with respect to the item of interest, wherein the third user input comprises an indication to purchase the item of interest, and
initiating a purchase of the item of interest.

9. The method of claim 8, wherein initiating the purchase of the item of interest comprises:
determining a payment method associated with the user,
selecting a retailer from among the one or more retailers, and
initiating the purchase of the item at the selected retailer using the payment method.

10. The method of claim 1, wherein the one or more machine learning models comprise one or more computerized neural networks.

11. The method of claim 1, wherein the image sensors comprise at least one of:
  one or more cameras, or
  one or more depth sensors.

12. The method of claim 1, wherein presenting at least the portion of the first output data to the user comprises:
projecting, using a laser projector of the wearable multimedia device, a user interface on a surface of the user, wherein the user interface comprises at least the portion of the first output data.

13. The method of claim 12, wherein the surface is a surface of a hand of a user.

14. The method of claim 12, wherein the surface is a surface of a palm of a user.

15. The method of claim 1, wherein presenting at least the portion of the first output data to the user comprises:
projecting, using a laser projector of the wearable multimedia device, at least a portion of the first output data on a surface of the item of interest.

16. The method of claim 1, wherein presenting at least the portion of the first output data to the user comprises:
projecting, using a laser projector of the wearable multimedia device, at least a portion of the first output data on a surface in a proximity of the item of interest.

17. The method of claim 1, wherein presenting at least the portion of the first output data to the user comprises:
generating, using one or more audio speakers of the wearable multimedia device, audio output comprising at least the portion of the first output data.

18. The method of claim 1, further comprising:
receiving a third user input from the user, wherein the third user input comprises a third command with respect to the environment, wherein the third user input is received using the one or more microphones of the wearable multimedia device;
performing using the one or more of machine learning models, the third command with respect to the environment, wherein performing the third command comprises generating third output data using the one or more machine learning models; and
presenting at least a portion of the third output data to the user.

19. The method of claim 18, wherein the third command comprises a request for a description of the environment, and
wherein the third output data comprises the description of the environment.

20. The method of claim 18, wherein the third command comprises a request for contents of a sign in the environment, and
wherein the third output data comprises the contents of the sign.

21. The method of claim 18, wherein the third command comprises a request for information regarding a business in the environment, and
wherein the third output data comprises the information regarding the business.

22. The method of claim 21, wherein the information regarding the business comprises operating hours of the business.

23. A wearable multimedia device, comprising:
one or more image sensors;
one or more microphones;
an output device;
at least one processor; and
memory storing instructions that, when executed by the at least one processor, cause the at least one processor to perform operations comprising:
accessing image data regarding an environment of a user wearing the wearable multimedia device, wherein the image data is generated using the one or more image sensors;
determining, based on the image data, an item of interest in the environment of the user;
receiving a first user input from the user, wherein the first user input comprises a first command with respect to the item of interest, wherein the first user input is received using the one or more microphones, and wherein the first command comprises a request for feedback regarding the item of interest;
performing the first command with respect to the item of interest, wherein performing the first command comprises generating first output data, and wherein generating the first output data comprises retrieving and aggregating product review information regarding the item of interest;
receiving a second user input from the user, wherein the second user input comprises a second command with respect to the item of interest, wherein the second user input is received using the one or more microphones, and wherein the second command comprises a request for information regarding the item of interest;
performing, using the one or more of machine learning models, the second command with respect to the item of interest, wherein performing the second command comprises generating second output data using the one or more machine learning models, and wherein the second output data comprises at least one of:
an identity of the item of interest, or
at least one of a make or a model of the item of interest; and
presenting, using the output device, at least a portion of the first output data to the user.

24. One or more non-transitory computer-readable media storing instructions that, when executed by at least one processor, cause the at least one processor to perform operations comprising:
accessing, by a wearable multimedia device worn by a user, image data regarding an environment of the user, wherein the image data is generated using one or more image sensors of the wearable multimedia device;
determining, by the wearable multimedia device based on the image data, an item of interest in the environment of the user;
receiving, by the wearable multimedia device, a first user input from the user, wherein the first user input comprises a first command with respect to the item of interest, wherein the first user input is received using one or more microphones of the wearable multimedia device, and wherein the first command comprises a request for feedback regarding the item of interest;
performing, by the wearable multimedia device, the first command with respect to the item of interest, wherein performing the first command comprises generating first output data, and wherein generating the first output data comprises retrieving and aggregating product review information regarding the item of interest;
receiving a second user input from the user, wherein the second user input comprises a second command with respect to the item of interest, wherein the second user input is received using the one or more microphones of the wearable multimedia device, and wherein the second command comprises a request for information regarding the item of interest;
performing, using the one or more of machine learning models, the second command with respect to the item of interest, wherein performing the second command comprises generating second output data using the one or more machine learning models, and wherein the second output data comprises at least one of:
an identity of the item of interest, or
at least one of a make or a model of the item of interest; and
presenting, by the wearable multimedia device, at least a portion of the first output data to the user.

25. The method of claim 6, the second output data further comprising:
for each of the one or more retailers, at least one of:
a distance of the retailer from the user, or
a shipping time associated with the item of interest by the retailer.

26. The method of claim 2, wherein the article of clothing comprises a first type of clothing, and wherein the at least one additional article of clothing comprises a second type of clothing different from the first type of clothing.

\* \* \* \* \*